(12) United States Patent
Sudo

(10) Patent No.: US 8,335,311 B2
(45) Date of Patent: Dec. 18, 2012

(54) COMMUNICATION APPARATUS CAPABLE OF ECHO CANCELLATION

(75) Inventor: Takashi Sudo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1662 days.

(21) Appl. No.: 11/495,014

(22) Filed: Jul. 27, 2006

(65) Prior Publication Data

US 2007/0058799 A1    Mar. 15, 2007

(30) Foreign Application Priority Data

Jul. 28, 2005   (JP) ................................ 2005-219303

(51) Int. Cl.
H04M 9/08 (2006.01)
(52) U.S. Cl. ............... 379/406.08; 379/406.12; 370/286
(58) Field of Classification Search ............. 379/406.08, 379/406.09, 406.01, 406.12; 370/286, 290
See application file for complete search history.

(56) References Cited

U.S. PATENT DOCUMENTS

| | | | | |
|---|---|---|---|---|
| 5,699,423 A | * | 12/1997 | Yoshida et al. | 379/406.08 |
| 6,163,609 A | * | 12/2000 | Makinen et al. | 379/406.08 |
| 2004/0001450 A1 | * | 1/2004 | He et al. | 370/286 |

FOREIGN PATENT DOCUMENTS

| | | |
|---|---|---|
| JP | 63-43451 A | 2/1988 |
| JP | 9-116614 A | 5/1997 |
| JP | 11-331046 A | 11/1999 |
| JP | 3082898 | 6/2000 |
| JP | 2000-252891 A | 9/2000 |
| JP | 3420705 B2 | 4/2003 |
| JP | 2004-56453 A | 2/2004 |
| JP | 2004-274412 A | 9/2004 |
| JP | 2005-159753 A | 6/2005 |
| JP | 2005-159941 A | 6/2005 |

OTHER PUBLICATIONS

Japanese Office Action dated Mar. 15, 2011 (and English translation thereof) in counterpart Japanese Application No. 2006-203418.

* cited by examiner

*Primary Examiner* — Gerald Gauthier
*Assistant Examiner* — Simon King
(74) *Attorney, Agent, or Firm* — Holtz, Holtz, Goodman & Chick, PC

(57) ABSTRACT

A communication apparatus capable of echo cancellation is provided. The apparatus is configured to be provided with an input signal receiving interference. The input signal has a frequency range. The interference includes an echo component and a noise component. The apparatus has a first interference eliminator configured to reduce an echo component included in the input signal so as to produce an intermediate signal. The apparatus has a selector configured to select one of the input signal and the intermediate signal. The apparatus has a second interference eliminator configured to reduce at least one of a noise component and an echo component included in one of the input signal and the intermediate signal selected by the selector.

20 Claims, 37 Drawing Sheets

101: COMM. UNIT (COM)
102: DELAY UNIT (DL)
103: D/A CONVERTER (DAC)
104: RECEIVED AMPL. (RA)
105: SPEAKER (SP)
106: MICROPHONE (MP)
107: SENT AMPL. (SA)
108: A/D CONVERTER (ADC)
109: HIGH-PASS FILTER (HPF)
110: ECHO CANCELLER (EC)
111: ECHO REDUCTION UNIT (ER)

101: COMM. UNIT (COM)
102: DELAY UNIT (DL)
103: D/A CONVERTER (DAC)
104: RECEIVED AMPL. (RA)
105: SPEAKER (SP)
106: MICROPHONE (MP)
107: SENT AMPL. (SA)
108: A/D CONVERTER (ADC)
109: HIGH-PASS FILTER (HPF)
110: ECHO CANCELLER (EC)
111: ECHO REDUCTION UNIT (ER)

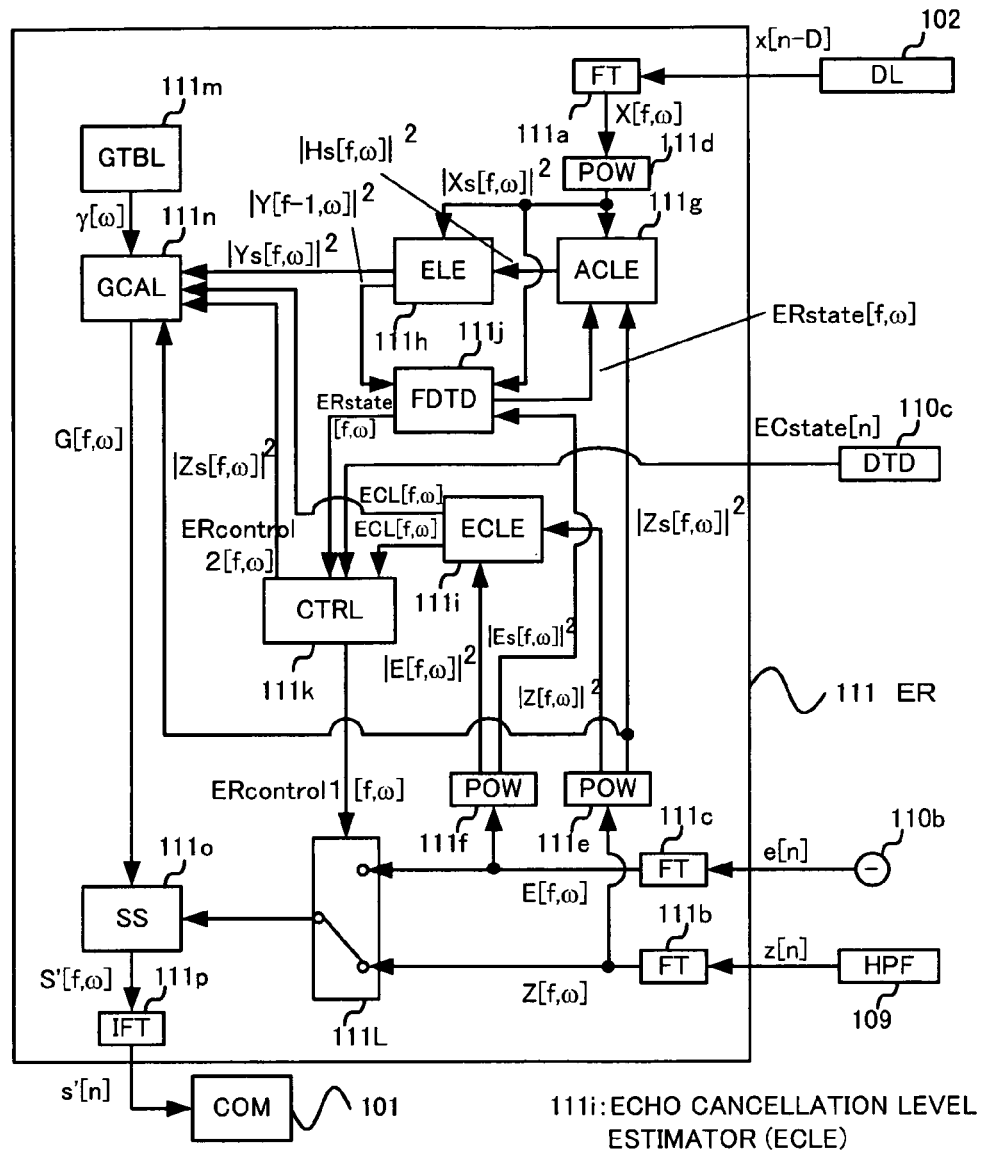

111: ECHO REDUCTION UNIT (ER)
111a: FREQ-DOMAIN TRANSFORMER (FT)
111b: FREQ-DOMAIN TRANSFORMER (FT)
111c: FREQ-DOMAIN TRANSFORMER (FT)
111d: RCVD PWR EVALUATION UNIT (POW)
111e: SENT PWR EVALUATION UNIT (POW)
111f: RESIDUAL PWR EVALUATION UNIT (POW)
111g: ACOUSTIC COUPLING LEVEL ESTIMATOR (ACLE)
111h: ECHO LEVEL ESTIMATOR (ELE)
111i: ECHO CANCELLATION LEVEL ESTIMATOR (ECLE)
111j: FREQ-DOMAIN DOUBLE TALK DETECTOR (FDTD)
111k: CONTROLLER (CTRL)
111L: SPECTRUM SELECTOR (SEL)
111m: MEMORY OF GAIN VALUE (GTBL)
111n: ECHO REDUCTION GAIN GENERATOR (GCAL)
111o: SIGNAL SUPPRESSOR (SS)
111p: FREQ-DOMAIN INVERSE TRANSFORMER (IFT)

FIG. 3

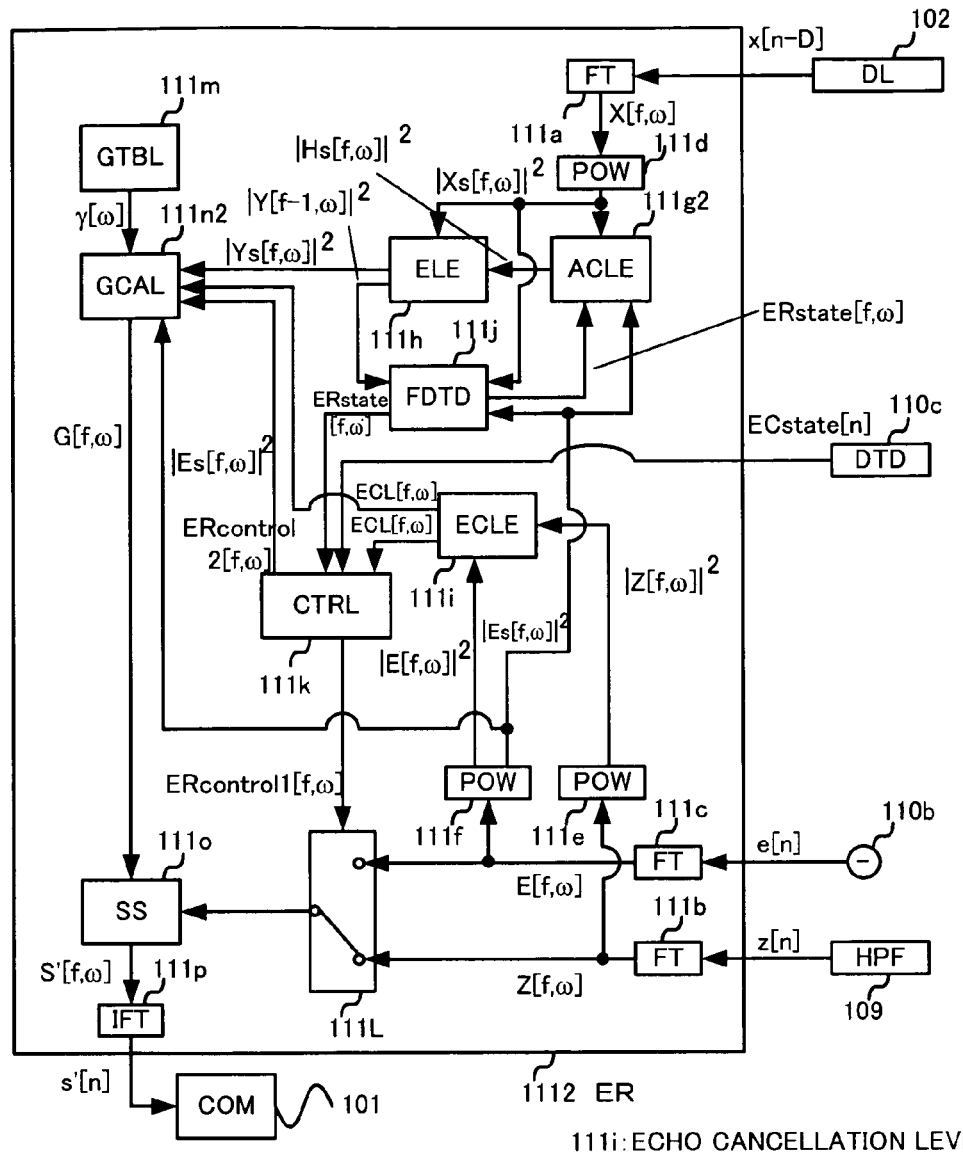

111: ECHO REDUCTION UNIT (ER)
111a: FREQ-DOMAIN TRANSFORMER (FT)
111b: FREQ-DOMAIN TRANSFORMER (FT)
111c: FREQ-DOMAIN TRANSFORMER (FT)
111d: RCVD PWR EVALUATION UNIT (POW)
111e: SENT PWR EVALUATION UNIT (POW)
111f: RESIDUAL PWR EVALUATION UNIT (POW)
111g2: ACOUSTIC COUPLING LEVEL ESTIMATOR (ACLE)
111h: ECHO LEVEL ESTIMATOR (ELE)
111i: ECHO CANCELLATION LEVEL ESTIMATOR (ECLE)
111j: FREQ-DOMAIN DOUBLE TALK DETECTOR (FDTD)
111k: CONTROLLER (CTRL)
111L: SPECTRUM SELECTOR (SEL)
111m: MEMORY OF GAIN VALUE (GTBL)
111n2: ECHO REDUCTION GAIN GENERATOR (GCAL)
111o: SIGNAL SUPPRESSOR (SS)
111p: FREQ-DOMAIN INVERSE TRANSFORMER (IFT)

FIG. 8

101: COMM. UNIT (COM)
102: DELAY UNIT (DL)
103: D/A CONVERTER (DAC)
104: RECEIVED AMPL. (RA)
105: SPEAKER (SP)
106: MICROPHONE (MP)
107: SENT AMPL. (SA)
108: A/D CONVERTER (ADC)
109: HIGH-PASS FILTER (HPF)
110: ECHO CANCELLER (EC)
211: NOISE REDUCTION UNIT (NR)

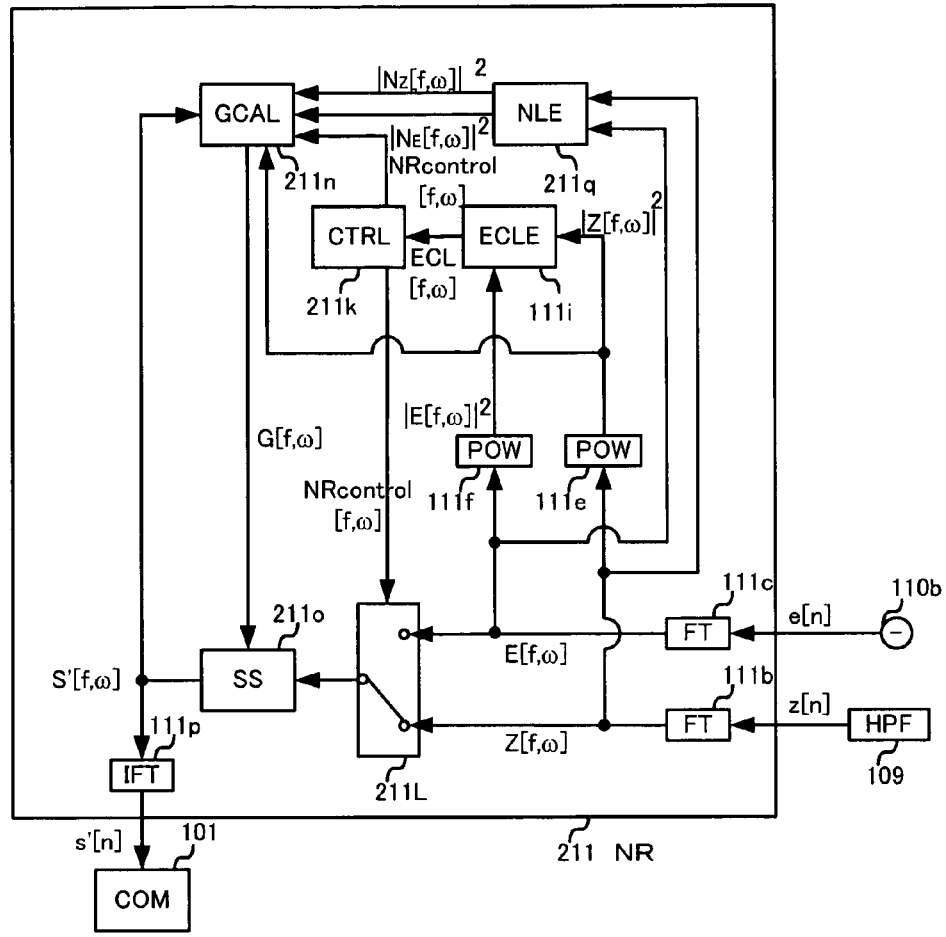

101: COMM. UNIT (COM)
109: HIGH-PASS FILTER (HPF)
110b: SIGNAL SUBTRACTOR (SS)
211: NOISE REDUCTION UNIT (NR)
111b: FREQ-DOMAIN TRANSFORMER (FT)
111c: FREQ-DOMAIN TRANSFORMER (FT)
111e: SENT PWR EVALUATION UNIT (POW)
111f: RESIDUAL PWR EVALUATION UNIT (POW)
111i: ECHO CANCELLATION LEVEL ESTIMATOR (ECLE)
211k: CONTROLLER (CTRL)
211L: SPECTRUM SELECTOR
211n: NOISE REDUCTION GAIN GENERATOR (GCAL)
111o: SIGNAL SUPPRESSOR (SS)
111p: FREQ-DOMAIN INVERSE TRANSFORMER (IFT)
211q: NOISE LEVEL ESTIMATOR (NLE)

FIG. 10

101: COMM. UNIT (COM)
102: DELAY UNIT (DL)
103: D/A CONVERTER (DAC)
104: RECEIVED AMPL. (RA)
105: SPEAKER (SP)
106: MICROPHONE (MP)

107: SENT AMPL. (SA)
108: A/D CONVERTER (ADC)
109: HIGH-PASS FILTER (HPF)
110: ECHO CANCELLER (EC)
311: ECHO & NOISE REDUCTION UNIT (ENR)

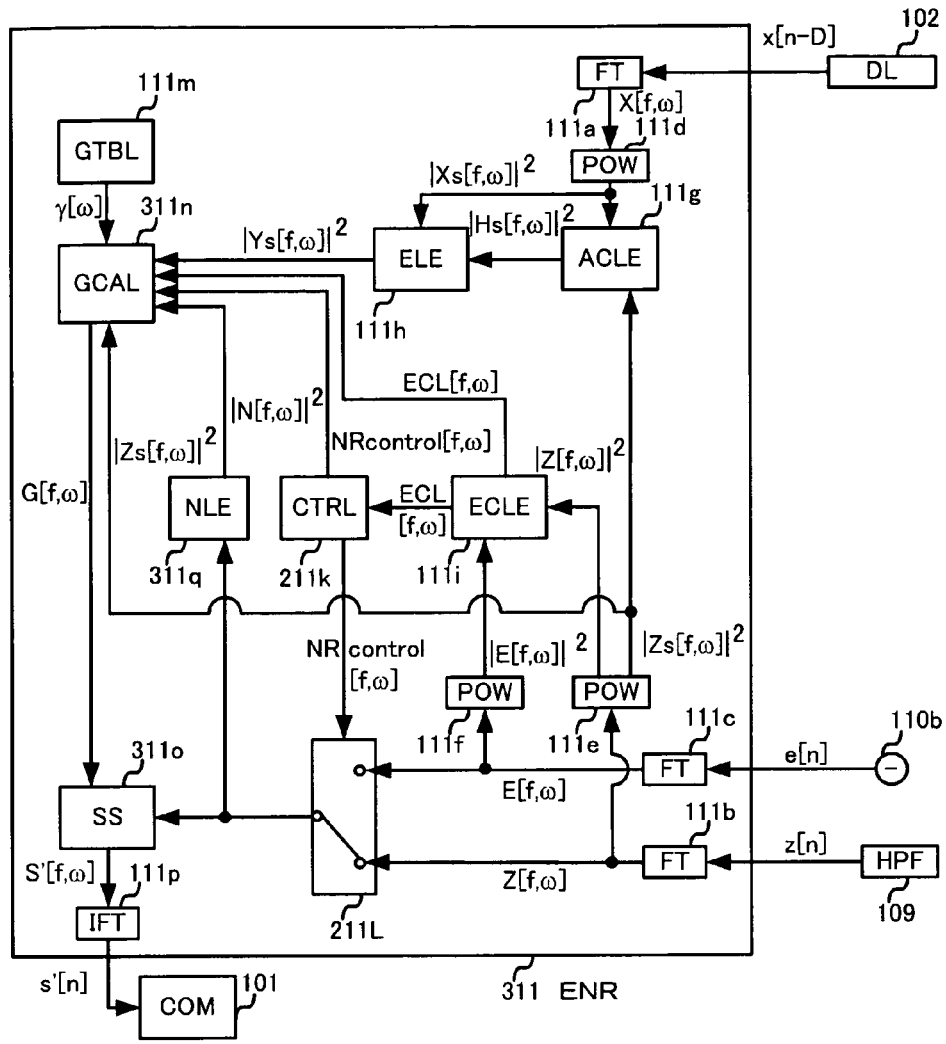

101: COMM. UNIT (COM)
109: HIGH-PASS FILTER (HPF)
110b: SIGNAL SUBTRACTOR (SS)
311: ECHO NOISE REDUCTION UNIT (ENR)
111a: FREQ-DOMAIN TRANSFORMER (FT)
111b: FREQ-DOMAIN TRANSFORMER (FT)
111c: FREQ-DOMAIN TRANSFORMER (FT)
111d: RCVD PWR EVALUATION UNIT (POW)
111e: SENT PWR EVALUATION UNIT (POW)
111f: RESIDUAL PWR EVALUATION UNIT (POW)
111g: ACOUSTIC COUPLING LEVEL ESTIMATOR (ACLE)
111h: ECHO LEVEL ESTIMATOR (ELE)
111i: ECHO CANCELLATION LEVEL ESTIMATOR (ECLE)
211k: CONTROLLER (CTRL)
211L: SPECTRUM SELECTOR (SEL)
111m: MEMORY OF GAIN VALUE (GTBL)
311n: ECHO/NOISE REDUCTION GAIN GENERATOR (GCAL)
311o: SIGNAL SUPPRESSOR (SS)
111p: FREQ-DOMAIN INVERSE TRANSFORMER (IFT)
311q: NOISE LEVEL ESTIMATOR (NLE)

FIG. 14

101: COMM. UNIT (COM)
402: DELAY UNIT (DL)
403: D/A CONVERTER (DAC)
104: RECEIVED AMPL. (RA)
105: SPEAKER (SP)
106: MICROPHONE (MP)

107: SENT AMPL. (SA)
108: A/D CONVERTER (ADC)
109: HIGH-PASS FILTER (HPF)
110: ECHO CANCELLER (EC)
411: ECHO SUPPRESSOR (ES)

411: ECHO SUPPRESSOR (ES)
411d: RCVD PWR EVALUATION UNIT (POW)
411e: SENT PWR EVALUATION UNIT (POW)
411f: RESIDUAL PWR EVALUATION UNIT (POW)
411i: ECHO CANCELING LEVEL ESTIMATOR (ECLE)
411k: CONTROLLER (CTRL)
411L: SIGNAL SELECTOR (SEL)
411m: MEMORY OF GAIN VALUE (GTBL)
411n: ECHO SUPPRESSION GAIN GENERATOR (GCAL)
411o: SENT SIGNAL ATTENUATOR (SS)
411r: RCVD SIGNAL ATTENUATOR (SS)

101: COMM. UNIT (COM)
102: DELAY UNIT (DL)
103: D/A CONVERTER (DAC)
104: RECEIVED AMPL. (RA)
105: SPEAKER (SP)
106: MICROPHONE (MP)
107: SENT AMPL. (SA)
108: A/D CONVERTER (ADC)
109: HIGH-PASS FILTER (HPF)
610: ECHO CANCELLER (EC)
611: ECHO REDUCTION UNIT (ER)
612: ECHO CANCELLATION LEVEL ESTIMATOR (ECLE)

610: ECHO CANCELLER (EC)
610d: FREQUENCY-DOMAIN TRANSFORMER (FT)
610e: FREQUENCY-DOMAIN ADAPTIVE FILTER (FDADF)
610f: FREQUENCY-DOMAIN INVERSE-TRANSFORMER (IFT)
610g: SIGNAL SUBTRACTOR (ST)
610h: FREQUENCY-DOMAIN TRANSFORMER (FT)
610i: FREQUENCY-DOMAIN DOUBLE TALK DETECTOR (FDDTD)

US 8,335,311 B2

COMMUNICATION APPARATUS CAPABLE OF ECHO CANCELLATION

CROSS REFERENCE TO RELATED APPLICATIONS

This application is based upon and claims the benefit of priority from the prior Japanese Patent Application No. 2005-219303 filed on Jul. 28, 2005, the entire contents of which are incorporated herein by reference.

FIELD OF THE INVENTION

The present invention relates to a communication apparatus capable of echo cancellation.

DESCRIPTION OF THE BACKGROUND

Various signal processing methods are known to improve quality of speech signals, e.g., by suppressing signals other than speech signals like acoustic echoes during a voice call. It is also known that these methods may attain higher performance if speech processing thereof is divided into a former stage and a latter stage.

A method of echo cancellation, called a first method, is disclosed in Japanese Patent Publication (Toroku), No. 3420705, which is divided into a former stage of processing and a latter stage of processing. According to the first method, residual signal is produced by canceling echo in the former stage, and output signal on send path is produced by suppressing echo included in the residual signal in the latter stage. A short-time spectral amplitude is estimated in the latter stage using the output signal on send path and the echoes are suppressed based on the above estimate.

According to the first method described above, in a case where linear echo cancellation (adaptive filtering) in the former stage and nonlinear echo cancellation in the latter stage are combined, a filter coefficient of the adaptive filter is diverted on an assumption that acoustic coupling level (echo path loss) of an echo path does not vary much upon a change of the echo path during a double talk. Therefore the echo may not be canceled adequately in a case where the adaptive filter shows poor estimating capability e.g., upon a change of the echo path during a double talk.

Another method of echo cancellation, called a second method, is disclosed in Japanese Patent Publication (Kokai), No. 2004-56453. In a former stage of processing of the second method, an adaptive filter cancels an echo component included in a sent speech input from a microphone. In a latter stage of processing of the second method, an echo or noise is suppressed based on an echo replica signal produced in the former stage.

According to the second method described above, capability to estimate an echo path depends upon capability of an adaptive filter of the former stage to estimate the echo path, as the second method always uses the echo replica signal. It is assumed that the adaptive filter can estimate an echo precisely in the former stage. If there is a steep change of the echo path or a change of echo path loss during a double talk, a residual echo is likely to remain in the output signal on send path, i.e., the output of the latter stage.

There may be a variation of echo path loss during double talk or a steep change of an echo path. Besides, performance of echo cancellation in a former stage of processing, whether linear processing or non-linear, may be inadequate. In such a case, according to the first and the second methods, accuracy of an echo level estimate or a noise level estimate in echo cancellation, noise suppression or a combination of them in a latter stage of processing may deteriorate due to a residual echo in an output signal of the former stage.

Due to the above deterioration, there may be a problem that performance of echo cancellation in the latter stage is inadequate, and so is performance of noise suppression in the latter stage. The above problem often occurs with echo suppression on a voice switch in the latter stage.

SUMMARY OF THE INVENTION

Accordingly, an advantage of the present invention is that a communication apparatus can improve echo cancellation performance or noise suppression performance, and that the apparatus can be robust against a variation of an echo path including variation of echo path loss.

To achieve the above advantage, one aspect of the present invention is to provide a communication apparatus capable of echo cancellation. The apparatus is configured to be provided with an input signal receiving interference. The input signal has a frequency range. The interference includes an echo component and a noise component. The apparatus has a first interference eliminator configured to reduce an echo component included in the input signal so as to produce an intermediate signal. The apparatus has a selector configured to select one of the input signal and the intermediate signal. The apparatus has a second interference eliminator configured to reduce at least one of a noise component and an echo component included in one of the input signal and the intermediate signal selected by the selector.

BRIEF DESCRIPTION OF THE DRAWINGS

FIG. 3 is a block diagram of an echo reduction unit included in the communication apparatus of the first embodiment.

FIG. 8 is a block diagram of an echo reduction unit included in a communication apparatus of a variation of the first embodiment.

FIG. 10 is a block diagram of a noise reduction unit included in the communication apparatus of the second embodiment.

FIG. 14 is a block diagram of an echo and noise reduction unit included in the communication apparatus of the third embodiment.

DETAILED DESCRIPTION OF THE INVENTION

1 First Embodiment of the Present Invention

Figure 1:
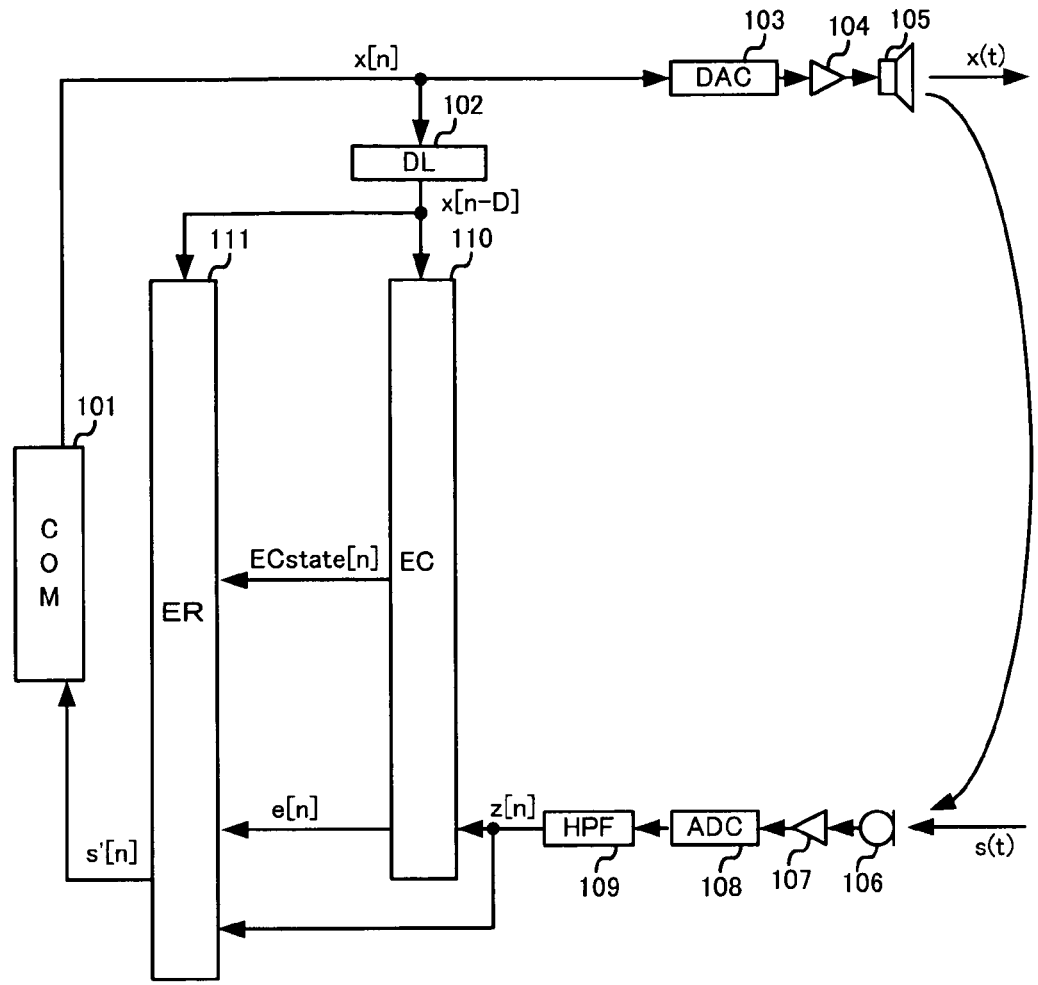
FIG. 1 is a block diagram of a communication apparatus of a first embodiment of the present invention.

A first embodiment of the present invention will be described with reference to FIGS. 1 to 7. FIG. 1 is a block diagram of a communication apparatus of the first embodiment of the present invention.

The apparatus of the first embodiment includes a communication unit 101 (hereinafter shortened as the COM 101), a delay unit 102 (hereinafter shortened as the DL 102), a digital-to-analog converter 103 (hereinafter shortened as the DAC 103), a received amplifier 104 (hereinafter shortened as the RA 104) and a speaker 105 (hereinafter shortened as the SP 105).

The apparatus of the first embodiment includes a microphone 106 (hereinafter shortened as the MP 106), a sent amplifier 107 (hereinafter shortened as the SA 107), an analog-to digital converter 108 (hereinafter shortened as the ADC 108) and a high-pass filter 109 (hereinafter shortened as the HPF 109). The apparatus of the first embodiment includes an echo canceller 110 (hereinafter shortened as the EC 110) and an echo reduction unit 111 (hereinafter shortened as the ER 111).

Figure 2:
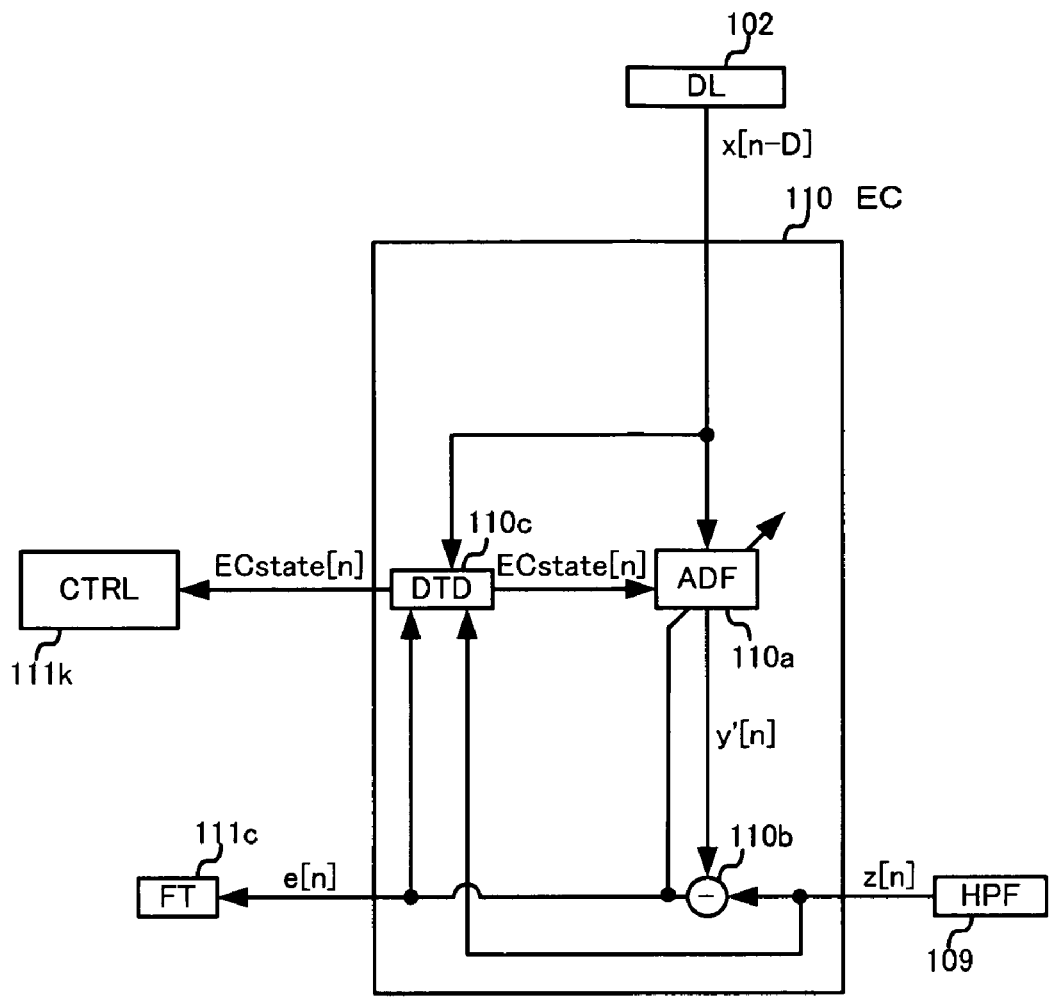
FIG. 2 is a block diagram of an echo canceller included in the communication apparatus of the first embodiment.

FIG. 2 is a block diagram of the EC 110 according to the first embodiment of the present invention. The EC 110 includes an adaptive filter 110a (hereinafter shortened as the ADF 110a), a subtractor 110b (hereinafter shortened as the ST 110b) and a double-talk detector 110c (hereinafter shortened as the DTD 110c).

The ADF 110a is coupled to the DL 102. The ST 110b is coupled to the HPF 109 and a frequency-domain transformer 111c (hereinafter shortened as the FT 111c) included in the ER 111. The DTD 110c is coupled to the FT 111c and a controller 111k (hereinafter shortened as the CTRL 111k) included in the ER 111. The FT 111c and the CTRL 111k will be explained later.

FIG. 3 is a block diagram of the ER 111 of the first embodiment of the present invention. The ER 111 includes a frequency-domain transformer 111a (hereinafter shortened as the FT 111a), a frequency-domain transformer 111b (hereinafter shortened as the FT 111b) and the FT 111c. The FT 111a is coupled to the DL 102. The FT 111b is coupled to the HPF 109. The FT 111c is coupled to the ST 110b.

The ER 111 includes a received power evaluation unit 111d (hereinafter shortened as the POW 111d), a sent power evaluation unit 111e (hereinafter shortened as the POW 111e), and a residual power evaluation unit 111f (hereinafter shortened as the POW 111f). The ER 111 includes an acoustic coupling level estimator 111g (hereinafter shortened as the ACLE 111g), an echo level estimator 111h (hereinafter shortened as the ELE 111h) and an echo cancellation level estimator 111i (hereinafter shortened as the ECLE 111i).

The ER 111 includes a frequency-domain double-talk detector 111j (hereinafter shortened as the FDTD 111j), the CTRL 111k and a spectrum selector 111L (hereinafter shortened as the SEL 111L). The CTRL 111k is coupled to the DTD 110c.

The ER 111 includes a memory of a gain value 111m (hereinafter shortened as the GTBL 111m), an echo reduction gain generator 111n (hereinafter shortened as the GCAL 111n), a signal suppressor 111o (hereinafter shortened as the SS 111o) and a frequency-domain inverse-transformer 111p (hereinafter shortened as the IFT 111p). The IFT 111p is coupled to the COM 101.

An operation of each portion of the apparatus of the first embodiment of the present invention will be described with reference to FIGS. 1 to 4.

Data received from an opposite end of a voice call are entered into the COM 101. The COM 101 decodes the received data and produces a digital signal in each frame, i.e., a determined period of time for processing. The COM 101 samples the digital signal with a sampling frequency $f_S$ [Hz] corresponding to N samples in one frame, where N is a positive integer. The COM 101 provides the DL 102 with the decoded digital signal as an input signal on received path (hereinafter shortened as the received input signal) x [n] (n=0, 1, ..., N−1) on a frame-by-frame basis.

The COM 101 encodes an output signal on send path (hereinafter shortened as the sent output signal) s' [n] (n=0, 1, ..., N−1) provided by the IFT 111p so as to send a resultant set of sent data to the opposite end of the voice call.

The DL 102 is provided by the COM 101 with the received input signal x [n] on a frame-by-frame basis. After buffering the received input signal x [n], the DL 102 digitally delays the received input signal x [n] by D samples corresponding to a period of time determined in advance so as to produce a delayed received input signal x [n-D].

The DAC 103 converts the received input signal x [n] provided by the COM 101 from digital to analog so as to produce a received analog signal. The RA 104 amplifies the received analog signal provided by the DAC 103. The SP 105 converts the received analog signal provided by the RA 104 into a received sound x (t) that is emitted into sound space.

The MP 106 is configured to pick up a raw sound s (t). Actually, the raw spoken sound s (t) is acoustically coupled to the received sound x (t) to produce a coupled sound z (t), which is consequently picked up by the MP 106. The MP 106 converts the coupled sound z (t) into a sent analog signal.

The SA 107 amplifies the sent analog signal provided by the MP 106. The ADC 108 converts the sent analog signal provided by the SA 107 from analog to digital so as to produce a sent digital signal on a frame-by-frame basis.

The HPF 109 removes a dc-offset from the sent digital signal provided by the ADC 108 so as to produce an input signal on send path (hereinafter shortened as the sent input signal) z [n] (n=0, 1, ..., N−1).

The EC 110 is provided by the HPF 109 with the sent input signal z [n] and provided by the DL 102 with the delayed received input signal x [n-D]. The EC 110 cancels an echo component from the sent input signal z [n] and produces a residual signal e [n] (n=0, 1, ..., N−1) as a result of canceling the echo component. The EC 110 produces a double talk flag ECstate [n].

The ADF 110a is a transversal filter having variable filter coefficients h [i] of a length L, a positive integer (i=0, 1, ..., L−1). The ADF 110a is provided by the DL 102 with the delayed received input signal x [n-D]. The ADF 110a is provided by the ST 110b with the residual signal one sample ago, e [n−1], the echo component of which has been canceled. The ADF 110a is provided by the DTD 110c with the double talk flag, ECstate [n].

Unless the double talk flag ECstate [n] indicates occurrence of double talk, the ADF 110a adaptively learns the filter coefficients h [i] for each sample n. If the double talk flag ECstate [n] indicates occurrence of double talk, the ADF 110a does not adaptively learn the filter coefficients h [i] for each sample n. The ADF 110a produces an echo replica signal y' [n] (n=0, 1, ..., N−1) by using the delayed received input signal x [n-D] and the filter coefficients h [i].

The ADF 110a controls a speed of learning the filter coefficients h [i] by using a variable or constant representing a value of step-size $\mu_T[n]$ (n=0, 1, ..., N−1).

The ADF 110a may be based on a linear adaptive algorithm like a least-mean-square (LMS) algorithm, a normalized least-mean-square (NLMS) algorithm, an Affine projection or a recursive-least-squares (RLS) algorithm. The ADF 110a may be based on a nonlinear adaptive algorithm like a gradient-limited normalized least-mean-square (GL-NLMS) algorithm or an adaptive Volterra filter.

The ADF 110a is a time-domain type adaptive filter in the first embodiment. The ADF 110a may be a sub-band (band-division) type adaptive filter, i.e., a frequency-domain type adaptive filter.

The ST 110b is provided by the HPF 109 with the sent input signal z [n], and provided by the ADF 110a with the echo replica signal y' [n]. The ST 110b cancels an echo component by subtracting the echo replica signal y' [n] from the sent input signal z [n] for each sample n, and produces the residual signal e [n] as a result of canceling the echo component.

The DTD 110c is provided by the HPF 109 with the sent input signal z [n], provided by the DL 102 with the delayed received input signal x [n-D], and provided by the ST 110b with the residual signal one sample ago, e [n−1]. The DTD 110c determines whether double talk occurs for each sample n.

Specifically speaking, the DTD 110c evaluates a power level, an average or a peak, $P_Z[n]$ of the sent input signal z [n], a power level $P_X[n]$ of the delayed received input signal x [n-D] and a power level $P_E[n]$ of the residual signal one sample ago e [n−1] for each sample n (n=0, 1, ..., N−1). The DTD 110c determines occurrence of double talk if one of following inequalities is true, i.e., $P_E[n] > \lambda[n] \cdot P_X[n]$ or $P_Z[n] > \delta \cdot P_X[n]$.

In the above inequalities, $\lambda[n]$ is a variable representing a value of echo path loss estimated for each sample n for which the ADF 110a has adaptively learned the filter coefficients h [i] (i=0, 1, ..., L−1). The variable $\lambda[n]$ decreases as a process of adaptive learning advances but increases if the process of adaptive learning is wrong. In addition, $\delta$ is a fixed value which may be preset from outside before the communication apparatus starts working.

The DTD 110c produces the double talk flag ECstate [n] indicating whether double talk occurs.

In this case, the EC 110 stores the filter coefficients h [i] (i=0, 1, ..., L−1), the value of step-size $\mu_T[n]$, the value of echo path loss estimated $\lambda[n]$, the double talk flag ECstate [n], the power level $P_X[n]$, the power level $P_Z[n]$, and the power level $P_E[n]$ (n=0, 1, ..., N−1) in memory as an internal condition.

The EC 110 may not include the DTD 110c. In that event, the ADF 110a operates in an assumption that the double talk flag ECstate [n] indicates no occurrence of double talk, and so does the CTRL 111k.

The ER 111 is provided by the DL 102 with the delayed received input signal x [n-D], provided by the HPF 109 with the sent input signal z [n], provided by the ST 110b with the residual signal e [n] and provided by the DTD 110c with the double talk flag ECstate [n]. The ER 111 performs an echo reduction process, i.e., cancels an echo component of at least one of the sent input signal z [n] and the residual signal e [n] so as to produce the sent output signal s' [n] (n=0, 1, ..., N−1) on a frame-by-frame basis as a result of the echo reduction.

The FT 111a converts the delayed received input signal x [n-D] provided by the DL 102 into a frequency domain representation by using a method of fast Fourier transform (FFT), etc., to produce a frequency spectrum of the received input signal, X [f, ω].

The FT 111b converts the sent input signal z [n] provided by the HPF 109 into a frequency domain representation by using a method of FFT, etc., to produce a frequency spectrum of the sent input signal, Z [f, ω]. The FT 111c converts the residual signal e [n] into a frequency domain representation by using a method of FFT, etc., to produce a frequency spectrum of the residual signal, E [f, ω].

Each of the FT 111a, the FT 111b and the FT 111c may use a method of Hamming windowing, a method of using a past frame, a method of zero padding or a method of overlapping as necessary. For instance, the FT 111a (or the FT 111b, the FT 111c) may gather a needed number of signal values for an FFT from a past frame and a present frame so as to window them with a Hamming window and perform the FFT.

The POW 111d is provided by the FT 111a with the frequency spectrum of the received input signal, $X[f, \omega]$, to produce a received power spectrum $|X[f, \omega]|^2$. As changing gradually with time, an acoustic coupling level can be estimated more accurately by using a smoothed value thereof than by using an instantaneous value thereof. Hence, the POW 111d produces a smoothed received power spectrum $|X_S[f, \omega]|^2$ by using a value thereof one frame ago, $|X_S[f-1, \omega]|^2$, e.g., according to Eq. 1. In Eq. 1, $\alpha_X[\omega]$ is preferably from 0.75 to 0.999.

$$|X_S[f,\omega]|^2 = \alpha_X[\omega] \cdot |X[f,\omega]|^2 + (1-\alpha_X[\omega]) \cdot |X_S[f-1,\omega]|^2 \quad \text{(Eq. 1)}$$

The POW 111e is provided by the FT 111b with the frequency spectrum of the sent input signal, $Z[f, \omega]$, to produce a sent power spectrum $|Z[f, \omega]|^2$. As changing gradually with time, an acoustic coupling level can be estimated more accurately by using a smoothed value thereof than by using an instantaneous value thereof. Hence, the POW 111e produces a smoothed sent power spectrum $|Z_S[f, \omega]|^2$ using a value thereof one frame ago, $|Z_S[f-1, \omega]|^2$, e.g., according to Eq. 2. In Eq. 2, $\alpha_Z[\omega]$ is preferably from 0.75 to 0.999.

$$|Z_S[f,\omega]|^2 = \alpha_Z[\omega] \cdot |Z[f,\omega]|^2 + (1-\alpha_Z[\omega]) \cdot |Z_S[f-1,\omega]|^2 \quad \text{(Eq. 2)}$$

The POW 111f is provided by the FT 111c with the frequency spectrum of the residual signal, $E[f, \omega]$, to produce a residual power spectrum $|E[f, \omega]|^2$. As changing gradually with time, an acoustic coupling level can be estimated more accurately by using a smoothed value thereof than by using an instantaneous value thereof. Hence, the POW 111f produces a smoothed residual power spectrum $|E_S[f, \omega]|^2$ by using a value thereof one frame ago, $|E_S[f-1, \omega]|^2$, e.g., according to Eq. 3. In Eq. 3, $\alpha_E[\omega]$ is preferably from 0.75 to 0.999.

$$|E_S[f,\omega]|^2 = \alpha_E[\omega] \cdot |E[f,\omega]|^2 + (1-\alpha_E[\omega]) \cdot |E_S[f-1,\omega]|^2 \quad \text{(Eq. 3)}$$

The ACLE 111g is provided by the POW 111d with the smoothed received power spectrum $|X_S[f, \omega]|^2$, provided by the POW 111e with the smoothed sent power spectrum $|Z_S[f, \omega]|^2$, and provided by the FDTD 111j with a frequency-domain double talk flag ERstate $[f, \omega]$.

The ACLE 111g produces an acoustic coupling level $|H[f, \omega]|^2$ for each frequency bin $\omega$, e.g., according to Eq. 4. As shown in Eq. 4, the ACLE 111g does not use $|E_S[f, \omega]|^2$ based on the residual signal but does use $|Z_S[f, \omega]|^2$ based on the sent input signal so as to avoid being affected by echo canceling performance of the EC 110. The communication apparatus of the first embodiment can thus reduce a load of operation and a memory size needed for storing related parameters in comparison with another communication apparatus described later (see fifth embodiment of the present invention).

$$|H[f,\omega]|^2 = \frac{|Z_S[f,\omega]|^2}{|X_S[f,\omega]|^2} \quad \text{(Eq. 4)}$$

The ACLE 111g produces an acoustic coupling level $|H_S[f, \omega]|^2$ smoothed by using a value thereof one frame ago according to Eq. 5, where $\alpha_H[\omega]$ is preferably from 0.03 to 0.99.

$$|H_S[f,\omega]|^2 = \alpha_H[\omega] \cdot |H[f,\omega]|^2 + (1-\alpha_H[\omega]) \cdot |H_S[f-1,\omega]|^2 \quad \text{(Eq. 5)}$$

A relatively large value is given to $\alpha_H[\omega]$, e.g. for five seconds after a voice call begins so that the acoustic coupling level $|H_S[f, \omega]|^2$ may be quickly updated for that while. As the acoustic coupling level is thus initialized, the communication apparatus can prevent its echo cancellation level from decreasing for that while.

If the frequency-domain double talk flag ERstate $[f, \omega]$ provided by the FDTD 111j indicates occurrence of double talk, however, the ACLE 111g uses a value of the acoustic coupling level one frame ago, $|H_S[f-1, \omega]|^2$, without updating the acoustic coupling level so as to maintain ability to track variation of an echo path quickly and to avoid producing the acoustic coupling level for a frequency bin where the double talk occurs.

So does the ACLE 111g if the acoustic coupling level steeply changes, i.e., $|H_S[f, \omega]|^2 > \beta_H[\omega] \cdot |H_S[f-1, \omega]|^2$, or if amplitude of the received input signal is not great enough, i.e., $|X_S[f, \omega]|^2 < \beta_X[\omega]$, where $\beta_H[\omega]$ is preferably from 0.9 to 30, and $\beta_X[\omega]$ is preferably from 30 to 40 dB.

As occurrence of double talk may cause a very steep change of the acoustic coupling level, the communication apparatus can avoid producing a sent speech signal (interference eliminator a speech signal on send path) of low quality by not updating the acoustic coupling level.

The ELE 111h is provided by the POW 111d with the smoothed received power spectrum $|X_S[f, \omega]|^2$, and provided by the ACLE 111g with the smoothed acoustic coupling level $|H_S[f, \omega]|^2$. According to Eq. 6, the ELE 111h estimates a level of an echo included in the frequency spectrum of the sent input signal, $Z[f, \omega]$, for each frequency bin $\omega$. In Eq. 6, let $|Y[f, \omega]|^2$ be the echo level estimated by the ELE 111h.

$$|Y[f,\omega]|^2 = |H_S[f,\omega]|^2 \cdot |X_S[f,\omega]|^2 \quad \text{(Eq. 6)}$$

A signal as a result of echo reduction using an instantaneous echo level like $|Y[f, \omega]|^2$ is not as natural to hear as a signal as a result of echo reduction using a smoothed value of the echo level. Hence, the ELE 111h produces an echo level $|Y_S[f, \omega]|^2$ smoothed by using a value thereof one frame ago according to Eq. 7, where $\alpha_Y[\omega]$ is preferably from 0.7 to 0.99

$$|Y_S[f,\omega]|^2 = \alpha_Y[\omega] \cdot |Y[f,\omega]|^2 + (1-\alpha_Y[\omega]) \cdot |Y_S[f-1,\omega]|^2 \quad \text{(Eq. 7)}$$

The ECLE 111i is provided by the POW 111e with the sent power spectrum $|Z[f, \omega]|^2$, and provided by the POW 111f with the residual power spectrum $|E[f, \omega]|^2$. The ECLE 111i produces an echo cancellation level of the EC 110 for each frequency bin $\omega$ by comparing those power spectra, e.g., according to Eq. 8. In Eq. 8, let $ECL[f, \omega]$ be the echo cancellation level of the EC 110. The ECLE 111i may use a difference between the sent power spectrum and the residual power spectrum.

$$ECL[f,\omega] = \frac{|E[f,\omega]|^2}{|Z[f,\omega]|^2} \quad \text{(Eq. 8)}$$

The FDTD 111j is provided by the POW 111d with the smoothed received power spectrum $|X_S[f, \omega]|^2$, provided by the POW 111f with the smoothed residual power spectrum $|E_S[f, \omega]|^2$, and provided by the ELE 111h with an echo level one frame ago, $|Y[f-1, \omega]|^2$. The FDTD 111j determines for each frequency bin $\omega$ whether an inequality in Eq. 9 is true.

In Eq. 9, a distance between the residual power spectrum and the echo level substitutes a power spectrum obtained after echo reduction by the ER 111. The FDTD 111j determines whether the above distance is less enough than the received power spectrum.

If a value on a left-hand side of Eq. 9 is greater than a threshold $\beta_Y[\omega]$ on a right-hand side of Eq. 9, i.e., Eq. 9 is true, the FDTD 111j determines occurrence of double talk. Unless Eq. 9 is true, the FDTD 111j determines no occurrence of double talk. The FDTD 111j produces the frequency-domain double talk flag ERstate [f, ω] indicating whether double talk occurs.

The communication apparatus can thus detect double talk in the frequency domain with a reduced load of operation. The ER 111 may not include the FDTD 111j as a matter of course. In that case, the ACLE 111g operates in an assumption that the frequency-domain double talk flag ERstate [f, ω] indicates no occurrence of double talk, and so does the CTRL 111k. In Eq. 9, $\beta_Y[\omega]$ is preferably from 1.0 to 20.

$$\frac{||E_S[f, \omega]|^2 - |Y[f-1, \omega]|^2|}{|X_S[f, \omega]|^2} > \beta_Y[\omega] \quad \text{(Eq. 9)}$$

The CTRL 111k is provided by the ECLE 111i with the echo cancellation level ECL [f, ω], provided by the DTD 110c with the double talk flag ECstate [n], and provided by the FDTD 111j with the frequency-domain double talk flag ERstate [f, ω]. For each frequency bin ω, the CTRL 111k determines whether double talk occurs and whether the echo cancellation level of the EC 110 is inadequate. For each frequency bin ω, the CTRL 111k produces a control flag ERcontrol1 [f, ω] indicating whether double talk occurs and whether the echo cancellation level of the EC 110 is inadequate. For each frequency bin ω, the CTRL 111k produces a control flag ERcontrol2 [f, ω] indicating whether double talk occurs and whether the echo cancellation level of the EC 110 is inadequate.

The CTRL 111k determines whether double talk occurs for each frequency bin ω by checking whether the frequency-domain double talk flag ERstate [f, ω] provided by the FDTD 111j indicates occurrence of double talk, and by checking whether the double talk flag ECstate [n] provided by the DTD 110c indicates at least one sample of double talk for a present frame. The CTRL 111k determines occurrence of double talk for each frequency bin ω if one of the frequency-domain double talk flag ERstate [f, ω] and the double talk flag ECstate [n] indicates occurrence of double talk.

As the echo cancellation level of the EC 110 is likely to be inadequate caused by variation of an echo path, the CTRL 111k can precisely detect a frequency bin where double talk occurs and the echo cancellation level of the EC 110 is inadequate by checking the double talk flag ECstate [n] provided by the DTD 110c included in the EC 110.

The CTRL 111k determines that the echo cancellation level of the EC 110 is inadequate for each frequency bin ω if a following inequality is true, i.e., ECL [f, ω]>$\beta_{Z1}$ [ω], where $\beta_{Z1}$ [ω] is preferably from −15 dB to 8 dB. In the first embodiment, $\beta_{Z1}$ [ω] is assumed to be 0 dB hereafter.

It is unlikely that the echo cancellation level of the EC 110 is inadequate in a single frequency bin, i.e., variance of the echo cancellation performance of the EC 110 is time-dependent rather than being frequency-dependent. Hence, the CTRL 111k takes a parameter count into account so as to precisely detect a frequency bin where the echo cancellation level of the EC 110 is inadequate. The parameter count represents for how many frequency bins per one frame a following inequality is true, i.e., ECL [f, ω]>$\beta_{Z1}$ [ω].

The CTRL 111k thus determines that the echo cancellation level of the EC 110 is inadequate if both of following inequalities are true, i.e., ECL [f, ω]>$\beta_{Z1}$ [ω] and count>$\beta_{C1}$, where $\beta_{C1}$ is preferably from 10 to 40 percent as many as all frequency bins. Such a way of determination can be more robust against a difference of loudness between the received input signal and the sent input signal than a way of determination on a band-by-band basis only. The CTRL 111k can precisely detect a frame where the echo cancellation level is inadequate.

Combining the determination of occurrence of double talk for each frequency bin ω, the CTRL 111k may detect a frequency bin where double talk occurs and the echo cancellation level of the EC 110 is inadequate so as to produce the control flag ERcontrol1 [f, ω].

Taking a parameter count into account that represents for how many frequency bins per one frame a following inequality is true, i.e., ECL [f, ω]>$\beta_{Z2}$ [ω], the CTRL 111k determines that the echo cancellation level is inadequate if following inequalities are true, i.e., ECL [f, ω]>$\beta_{Z2}$ [ω] and count>$\beta_{C2}$. In the above inequalities, $\beta_{Z2}$ [ω] is preferably from −15 dB to 8 dB, and $\beta_{C2}$ is preferably from 10 to 40 percent as many as all frequency bins.

In the same way, combining the determination of occurrence of double talk for each frequency bin ω, the CTRL 111k may detect a frequency bin where double talk occurs and the echo cancellation level of the EC 110 is inadequate so as to produce the control flag ERcontrol2 [f, ω].

The SEL 111L is provided by the FT 111b with the frequency spectrum Z [f, ω] of the sent input signal, provided by the FT 111c with the frequency spectrum E [f, ω] of the residual signal, and provided by the CTRL 111k with the control flag ERcontrol1 [f, ω] indicating whether double talk occurs and whether the echo cancellation level of the EC 110 is inadequate for each frequency bin ω. The SEL 111L selects one of the frequency spectrum Z [f, ω] of the sent input signal and the frequency spectrum E [f, ω] of the residual signal.

Specifically speaking, the SEL 111L selects the frequency spectrum Z [f, ω] of the sent input signal for a frequency bin where the control flag ERcontrol1[f, ω] indicates occurrence of double talk and indicates that the echo cancellation level of the EC 110 is inadequate. The SEL 111L selects the frequency spectrum E [f, ω] of the residual signal for a frequency bin other than the above.

The ER 111 can thus operate separately from the EC 110 for a frequency bin where the echo cancellation level of the EC 110 is inadequate i.e., accuracy of estimation of the EC 110 is inadequate.

The GTBL 111m holds a preset parameter γ [ω] for controlling a level of nonlinear echo cancellation and outputs the parameter γ [ω] which is preferably from 1.0 to 2.0.

The GCAL 111n is provided by the POW 111e with the smoothed sent power spectrum $|Z_S[f, \omega]|^2$, provided by the ELE 111h with the smoothed echo level $|Y_S[f, \omega]|^2$, provided by the GTBL 111m with the parameter γ [ω], provided by the ECLE 111i with the echo cancellation level ECL [f, ω] and provided by the CTRL 111k with the control flag ERcontrol2 [f, ω] indicating for each frequency bin ω whether double talk occurs and whether the echo cancellation level of the EC 110 is inadequate. The GCAL 111n produces an echo reduction gain G [f, ω].

Specifically speaking, for a frequency bin where the control flag ERcontrol2 [f, ω] indicates occurrence of double talk and indicates that the echo cancellation level of the EC 110 is inadequate, the GCAL 111n produces the echo reduction gain G [f, ω] by using a Wiener filter method according to Eq. 10.

The ER 111 can thus perform echo reduction separately from the EC 110.

$$G[f, \omega] = \left(1 - \gamma[\omega] \cdot \frac{|Y_S[f, \omega]|^2}{|Z_S[f, \omega]|^2}\right) \quad \text{(Eq. 10)}$$

For a frequency bin other than the above, it may be assumed that the echo cancellation level of the EC 110 is adequate and the EC 110 works properly. The GCAL 111*n* corrects an echo reduction level of the ER 111 so that it increases by using the echo cancellation level ECL [f, ω] of the EC 110. The GCAL 111*n* produces the echo reduction gain G [f, ω] according to Eq. 11. The communication apparatus of the first embodiment can thus reduce a load of operation and a memory size needed for storing related parameters in comparison with another communication apparatus described later (see fifth embodiment of the present invention).

$$G[f, \omega] = \left(1 - \gamma[\omega] \cdot \frac{|Y_S[f, \omega]|^2}{|Z_S[f, \omega]|^2}\right) \cdot ECL[f, \omega] \quad \text{(Eq. 11)}$$

The GCAL 111*n* controls and keeps the echo reduction gain G [f, ω] above a determined lower threshold so as to prevent the communication apparatus from producing a sent speech signal of low quality due to excessive echo reduction and from suppressing background noise intermittently.

Figure 4:
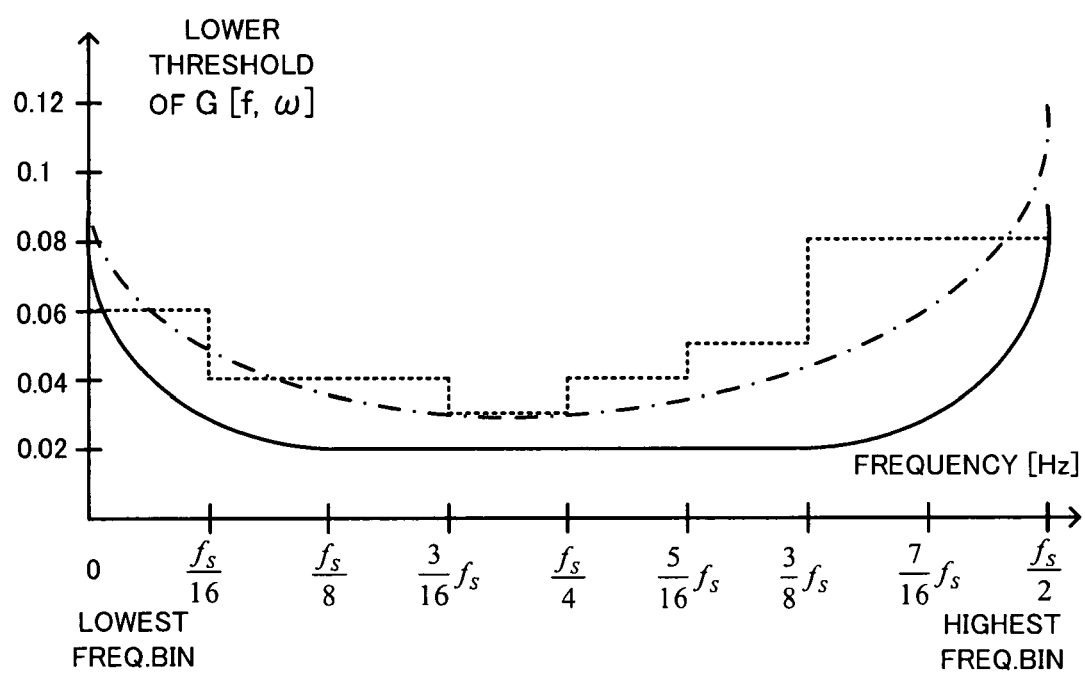
FIG. 4 shows examples of how to set lower threshold of echo reduction gain of the echo reduction unit of the first embodiment.

Shown are examples of how to set the lower threshold in FIG. 4. According to a solid bathtub curve or a dot-and-dash bathtub curve depicted in FIG. 4, the lower threshold is set from 0.04 to 0.12 in a lowest band (from zero to $f_S/16$ [Hz]), set from 0.01 to 0.05 in a middle band (from $f_S/8$ to $3f_S/8$ [Hz]), and set from 0.04 to 0.12 in a highest band (from $7f_S/16$ to $f_S/2$ [Hz]).

The bathtub curves of the lower threshold help the GCAL 111*n* cancel an echo component which may remain in the lowest or the highest band and could be offensive to hear. The bathtub curves of the lower threshold make a produced sound easy to hear. The lower threshold may be set according to a dotted step line e.g., as shown in FIG. 4.

The GCAL 111*n* may evaluate a level of background noise for each frequency bin ω by using a level of the sent input signal z [n] or the residual signal e [n] in an interval not being active-voice. The GCAL 111*n* may control and keep the echo reduction gain G [f, ω] above the level of the background noise so as to prevent the communication apparatus from producing a sent speech signal of low quality due to excessive echo reduction.

The GCAL 111*n* may smooth the echo reduction gain G [f, ω] in the frequency domain according to Eq. 12-1 or Eq. 12-2 so as to prevent the communication apparatus from producing a sent speech signal of low quality. In these equations, $\epsilon_j$ may be [0.1, 0.2, 0.4, 0.2, 0.1], and $\eta_j$ may be [0.1, 0.2, 0.4, 0.8, 0.4, 0.2, 0.1] for instance.

$$G_S[f, \omega] = \frac{\sum_{j=1}^{5} \varepsilon_j \cdot G[f, \omega + j - 3]}{\sum_{j=1}^{5} \varepsilon_j} \quad \text{(Eq. 12-1)}$$

$$G_S[f, \omega] = \frac{\sum_{j=1}^{7} \eta_j \cdot G[f, \omega + j - 4]}{\sum_{j=1}^{7} \eta_j} \quad \text{(Eq. 12-2)}$$

The SS 111*o* is provided by the SEL 111L with the frequency spectrum selected thereby and provided by the GCAL 111*n* with the echo reduction gain G [f, ω]. The SS 111*o* suppresses an echo of the frequency spectrum provided by the SEL 111L, and produces a frequency spectrum of the sent output signal, S' [f, ω], according to Eq. 13-1 or Eq. 13-2.

$$S'[f,\omega]=G[f,\omega]\cdot Z[f,\omega] \quad \text{(Eq. 13-1)}$$

$$S'[f,\omega]=G[f,\omega]\cdot E[f,\omega] \quad \text{(Eq. 13-2)}$$

The sent output signal can be smooth to hear no matter which of the frequency spectrum of the sent input signal, Z [f, ω], and the frequency spectrum of the residual signal, E [f, ω], is selected by the SEL 111L, as the EC 110 operates in the time domain and produces no difference in terms of a phase spectrum.

The control flag ERcontrol1 [f, ω] provided from the CTRL 111*k* to the SEL 111L may be different from the control flag ERcontrol2 [f, ω] provided from the CTRL 111*k* to the GCAL 111*n*. For instance, a condition in which the control flag ERcontrol2 [f, ω] indicates occurrence of double talk and indicates that the echo cancellation level is inadequate may be set broad to cover a condition in which the control flag ERcontrol1 [f, ω] indicates occurrence of double talk and the echo cancellation level is inadequate by setting values of the parameters of the CTRL 111*k*, $\beta_{Z1}$ [ω] and $\beta_{C1}$, different from values of the parameters of the CTRL 111*k*, $\beta_{Z2}$ [ω] and $\beta_{C2}$. The communication apparatus can avoid producing a sent speech signal of low quality by using the two control flags in a case where the echo reduction gain is smoothed.

The IFT 111*p* is provided by the SS 111*o* with the frequency spectrum S' [f, ω], and produces the sent output signal s' [n] by using, e.g., a method of inverse fast Fourier transform (IFFT). The IFT 111*p* removes overlapping by using s' [n] of a past frame taking windowing of the FT 111*b* and the FT 111*c* into account.

Figure 5:
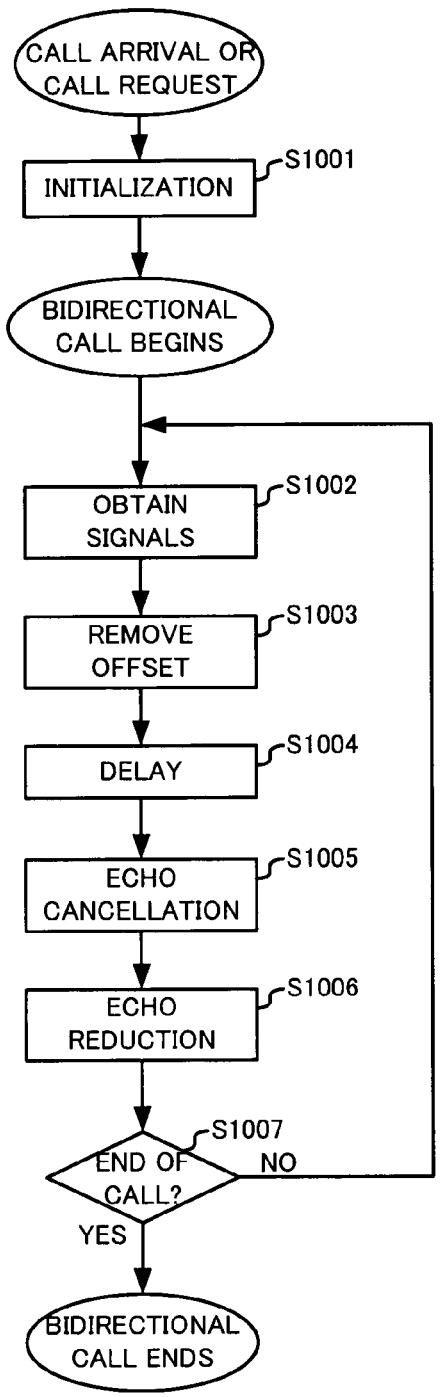
FIG. 5 is a flow chart of operation of the communication apparatus of the first embodiment.
Figure 6:
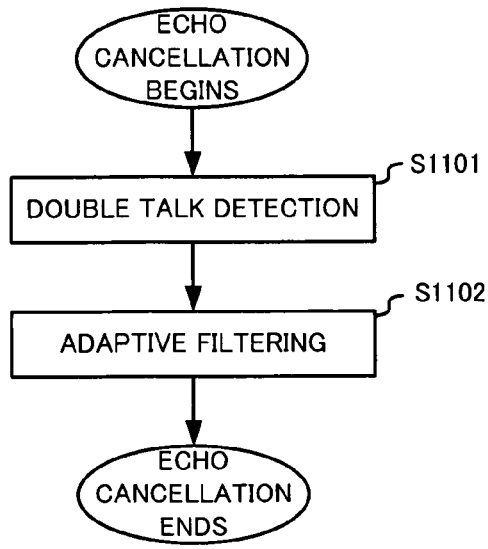
FIG. 6 is a flow chart of operation of the echo canceller of the first embodiment.
Figure 7:
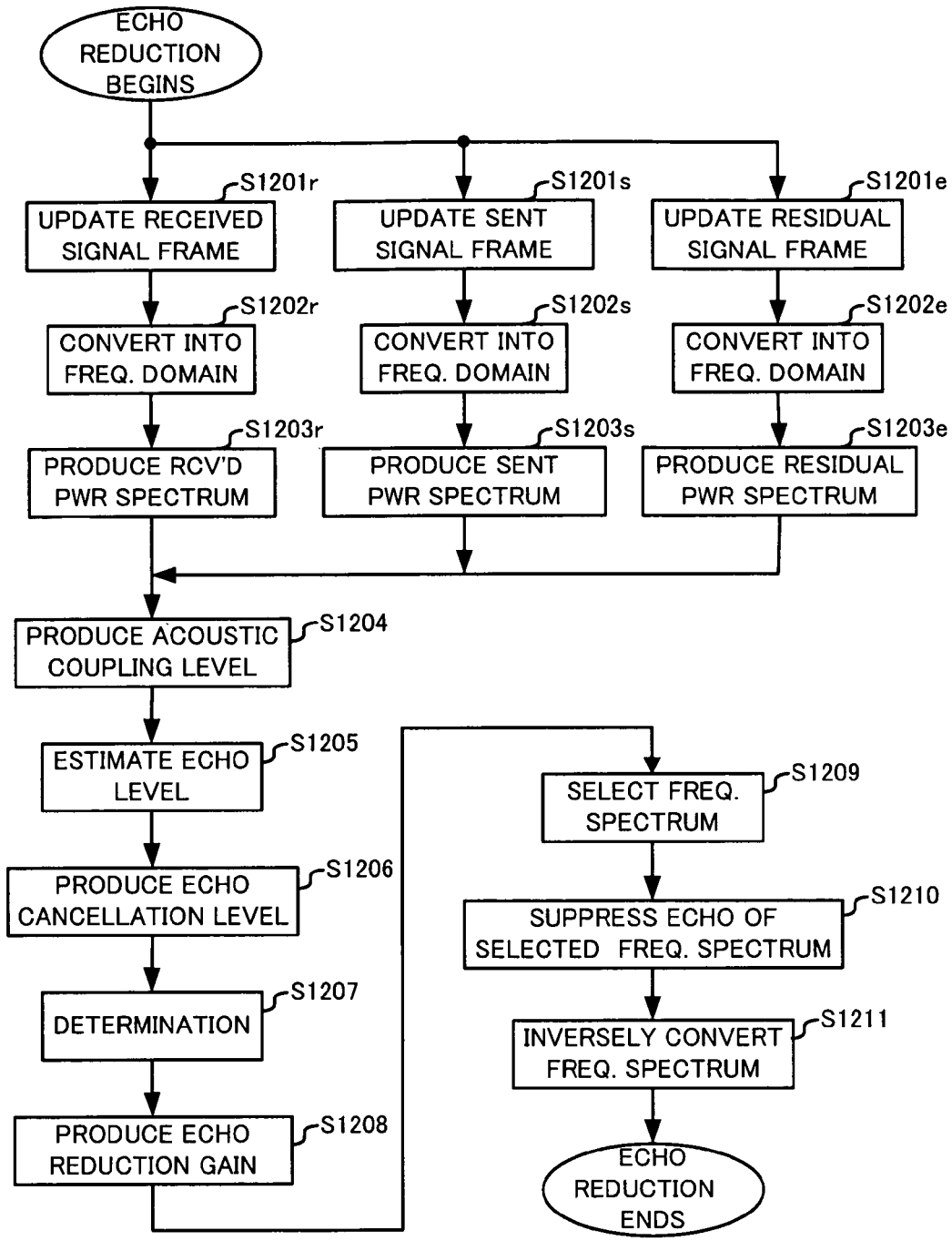
FIG. 7 is a flow chart of operation of the echo reduction unit of the first embodiment.

A flow of operation of the communication apparatus of the first embodiment will be described with reference to FIGS. 5 to 7. FIG. 5 is a flow chart showing the flow as a whole. FIG. 6 is a flow chart of operation of the EC 110. FIG. 7 is a flow chart of operation of the ER 111.

In FIG. 5, the COM 101 establishes a communication link upon a call-in or a call request, and the COM 101 initializes parameters, buffers and so on (step S1001). After the communication link is established, a bidirectional call may begin between the communication apparatus and an opposite end. After the bidirectional call begins, a decoder (not shown in FIGS. 1 to 3) included in the COM 101 decodes an incoming signal on a frame-by-frame basis and obtains the received input signal x [n]. Meanwhile, the sent input signal z [n] is obtained via the MP 106 (step S1002).

The HPF 109 removes an offset of the sent input signal z [n] (step S1003). The DL 102 temporarily holds and delays the received input signal x [n] (step S1004). The EC 110 is provided with the delayed received input signal x [n-D] and the offset-removed sent input signal z [n], and performs echo cancellation (step S1005).

The ER 111 is provided with the delayed received input signal x [n-D] and the offset-removed sent input signal z [n], and provided by the EC 110 with the residual signal e [n] produced as a result of the echo cancellation. The ER 111 performs echo reduction, i.e., a nonlinear method of echo cancellation (step S1006). The steps S1002-S1006 are repeated until an end of the call (step S1007).

The flow of echo cancellation process of the EC 110 shown in FIG. 6 will be described as follows. At first, the DTD 110c detects occurrence of double talk (step S1101). The ADF 110a performs adaptive filtering according to the double talk flag ECstate [n] (step S1102). The ST 110b subtracts the echo replica signal y' [n] produced by the ADF 110a from the sent input signal z [n] so as to produce the residual signal e [n]. The EC 110 then ends the echo cancellation process.

The flow of echo reduction process of the ER 111 shown in FIG. 7 will be described as follows. At first, the FT 111a updates a delayed received signal frame, a buffer for converting a received input signal into a frequency domain representation (step S1201r). The FT 111b updates a sent signal frame, a buffer for converting a sent input signal into a frequency domain representation (step S1201e). The FT 111c updates a residual signal frame, a buffer for converting a residual signal into a frequency domain representation (step S1201s).

The FT 111a then converts the delayed received input signal x [n-D] into the frequency domain, and produces the frequency spectrum of the received input signal, X [f, $\omega$] (step S1202r). The POW 111d produces the received power spectrum $|X [f, \omega]|^2$ and the smoothed received power spectrum $|X_S [f, \omega]|^2$ (step S1203r).

The FT 111b converts the sent input signal z [n] into the frequency domain, and produces the frequency spectrum of the sent input signal, Z [f, $\omega$] (step S1202s). The POW 111e produces the sent power spectrum $|Z [f, \omega]|^2$ and the smoothed sent power spectrum $|Z_S [f, \omega]|^2$ (step S1203s).

The FT 111c converts the residual signal e [n] into the frequency domain, and produces the frequency spectrum of the residual signal, E [f, $\omega$] (step S1202e). The POW 111f produces the residual power spectrum $|E [f, \omega]|^2$ and the smoothed residual power spectrum $|E_S [f, \omega]|^2$ (step S1203e).

The FDTD 111j outputs the frequency-domain double talk flag ERstate [f, $\omega$]. The ACLE 111g is provided with the smoothed received power spectrum $|X_S [f, \omega]|^2$, the smoothed sent power spectrum $|Z_S [f, \omega]|^2$ and the frequency-domain double talk flag ERstate [f, $\omega$] so as to produce the smoothed acoustic coupling level $|H_S [f, \omega]|^2$ (step S1204). Being provided with the smoothed acoustic coupling level $|H_S [f, \omega]|^2$ and the smoothed received power spectrum $|X_S [f, \omega]|^2$, the ELE 111h estimates the smoothed echo level $|Y_S [f, \omega]|^2$ included in the sent input signal (step S1205).

Being provided with the sent power spectrum $|Z [f, \omega]|^2$ and the residual power spectrum $|E [f, \omega]|^2$, the ECLE 111i estimates the echo cancellation level ECL [f, $\omega$] of the EC 110 (step S1206). The CTRL 111k determines whether double talk occurs and whether the echo cancellation level of the EC 110 is adequate, and produces the control flags ERcontrol1 [f, $\omega$] and ERcontrol2 [f, $\omega$] (step S1207).

The GCAL 111n is provided by the POW 111e with the smoothed sent power spectrum $|Z_S [f, \omega]|^2$, provided by the ELE 111h with the smoothed echo level $|Y_S [f, \omega]|^2$, provided by the GTBL 111m with the parameter $\gamma [\omega]$, provided by the ECLE 111i with the echo cancellation level ECL [f, $\omega$], and provided by the CTRL 111k with the control flag ERcontrol2 [f, $\omega$].

For a frequency bin where double talk occurs and the echo cancellation level of the EC 110 is inadequate, the GCAL 111n produces the echo reduction gain G [f, $\omega$] by using one method of suppression. For a frequency bin other than the above, the GCAL 111n produces the echo reduction gain G [f, $\omega$] by using another method of suppression. The GCAL 111n controls and keeps the echo reduction gain G [f, $\omega$] above a determined lower threshold (step S1208).

The SEL 111L is provided by the CTRL 111k with the control flag ERcontrol1 [f, $\omega$]. For a frequency bin where double talk occurs and the echo cancellation level of the EC 110 is inadequate, the SEL 111L selects the frequency spectrum of the sent input signal, Z [f, $\omega$]. For another frequency bin other than the above, the SEL 111L selects the frequency spectrum of the residual signal, E [f, $\omega$] (step S1209).

The SS 111o is provided with the frequency spectrum selected by the SEL 111L, and provided by the GCAL 111n with the echo reduction gain G [f, $\omega$] so as to suppress an echo of the selected frequency spectrum (step S1210). The IFT 111p then inversely converts the echo suppressed frequency spectrum of the sent output signal, S' [f, $\omega$], provided by the SS 111o into a time domain representation (step S1211) and ends the echo reduction process.

The ER 111 thus provides an encoder (not shown in FIGS. 1-3) included in the COM 101 with the sent output signal s' [n]. The encoder encodes the sent output signal s' [n] on a frame-by-frame basis so as to produce a set of sent data. The COM 101 sends the sent data to the opposite end of the call.

In the above description, the ER 111 is of a frequency domain type performing FFT and operates on a frequency bin-by-frequency bin basis. A method of grouping the frequency bins for the FFT and operating on a group-by-group basis may be implemented. The ER 111 may be implemented as a frequency domain type like a bandwidth division filter like a filter bank.

During variation of echo path loss when double talk occurs, the echo cancellation level of the EC 110 may be inadequate as the residual signal e [n] exceeds the sent input signal z [n] due to the echo cancellation of the EC 110.

In that event, according to the first embodiment described above, the ECLE 111i and the CTRL 111k may detect a frequency bin where the echo cancellation level of the EC 110 is inadequate. The SEL 111L and the GCAL 111n, each included in the ER 111, can vary weighting put on the EC 110 and put on the ER 111 for each frequency bin so that the communication apparatus of the first embodiment can be robust against variation of echo path loss and can produce the sent output signal of high quality.

1A Variation of the First Embodiment

A variation of the first embodiment will be described as follows. A communication apparatus of the variation of the first embodiment includes an echo reduction unit 1112 (hereinafter shortened as the ER 1112) instead of the ER 111 of the first embodiment. FIG. 8 is a block diagram of the ER 1112. The ER 1112 includes an acoustic coupling level estimator 111g2 (hereinafter shortened as the ACLE 111g2) instead of the ACLE 111g of the ER 111. The ER 1112 includes an echo reduction gain generator (hereinafter shortened as the GCAL 111n2) instead of the GCAL 111n of the ER 111.

In the ER 1112, the POW 111e provides only the ECLE 111i with its output. In the ER 1112, the POW 111f provides the ACLE 111g2 and the GCAL 111n2 in addition to the ECLE 111i and the FDTD 111j with its output. Each of remaining portions of the ER 1112 is a same as the corresponding portion of the ER 111 given the same reference numeral, and its explanation is omitted.

The ACLE 111g2 is provided by the POW 111d with the smoothed received power spectrum $|X_S [f, \omega]|^2$, provided by the POW 111f with the smoothed residual power spectrum $|E_S[f, \omega]|^2$, and provided by the FDTD 111*j* with the frequency-domain double talk flag ERstate $[f, \omega]$. The ACLE 111*g*2 produces an acoustic coupling level $|H[f, \omega]|^2$ by using the smoothed received power spectrum $|X_S[f, \omega]|^2$ and the smoothed residual power spectrum $|E_S[f, \omega]|^2$ according to Eq. 14.

$$|H[f, \omega]|^2 = \frac{|E_S[f, \omega]|^2}{|X_S[f, \omega]|^2} \quad \text{(Eq. 14)}$$

The ACLE 111*g*2 produces an acoustic coupling level $|H_S[f, \omega]|^2$ smoothed by using a value thereof one frame ago according to Eq. 15, where a value of $\alpha_H[\omega]$ is preferably from 0.03 to 0.99.

$$|H_S[f,\omega]|^2 = \alpha_H[\omega] \cdot |H[f,\omega]|^2 + (1-\alpha_H[\omega]) \cdot |H_S[f-1,\omega]|^2 \quad \text{(Eq. 15)}$$

The GCAL 111*n*2 is provided by the POW 111*f* with the smoothed residual power spectrum $|E_S[f, \omega]|^2$, provided by the ELE 111*h* with the smoothed echo level $|Y_S[f, \omega]|^2$, provided by the GTBL 111*m* with the parameter $\gamma[\omega]$, provided by the ECLE 111*i* with the echo cancellation level ECL $[f, \omega]$, and provided by the CTRL 111*k* with the control flag ERcontrol2 $[f, \omega]$ indicating for each frequency bin whether double talk occurs and whether the echo cancellation level of the EC 110 is inadequate. The GCAL 111*n*2 produces an echo reduction gain G $[f, \omega]$.

Specifically speaking, for a frequency bin where the control flag ERcontrol2 $[f, \omega]$ indicates occurrence of double talk and indicates that the echo cancellation level of the EC 110 is inadequate, the GCAL 111*n*2 corrects the echo reduction gain G $[f, \omega]$ by using the echo cancellation level. ECL $[f, \omega]$ of the EC 110 according to Eq. 16 so that the echo reduction gain of the ER 1112 based on Eq. 10 divided by the echo cancellation level of the EC 110 equals G $[f, \omega]$.

$$G[f, \omega] = \left(1 - \gamma[\omega] \cdot \frac{|Y_S[f, \omega]|^2}{|E_S[f, \omega]|^2}\right) \cdot \left(\frac{1}{ECL[f, \omega]}\right) \quad \text{(Eq. 16)}$$

For a frequency bin other than the above, the GCAL 111*n*2 produces the echo reduction gain G $[f, \omega]$ by using a Wiener filter method according to Eq. 17-1. Instead, in an assumption that the EC 110 works properly, the GCAL 111*n*2 may correct the echo reduction gain G $[f, \omega]$ by using the echo cancellation level ECL $[f, \omega]$ of the EC 110 according to Eq. 17-2 so that the echo cancellation level of the ER 111 increases.

$$G[f, \omega] = \left(1 - \gamma[\omega] \cdot \frac{|Y_S[f, \omega]|^2}{|E_S[f, \omega]|^2}\right) \quad \text{(Eq. 17-1)}$$

$$G[f, \omega] = \left(1 - \gamma[\omega] \cdot \frac{|Y_S[f, \omega]|^2}{|E_S[f, \omega]|^2}\right) \cdot ECL[f, \omega] \quad \text{(Eq. 17-2)}$$

According to the variation of the first embodiment described above, a series connection of the EC 110 and the ER 111 is likely to be selected for a use where variation of echo path loss is little and echo cancellation performance of the EC 110 is stable so that the communication apparatus can avoid excessive echo cancellation and can avoid producing a sent speech signal of low quality.

2 Second Embodiment of the Present Invention

Figure 9:
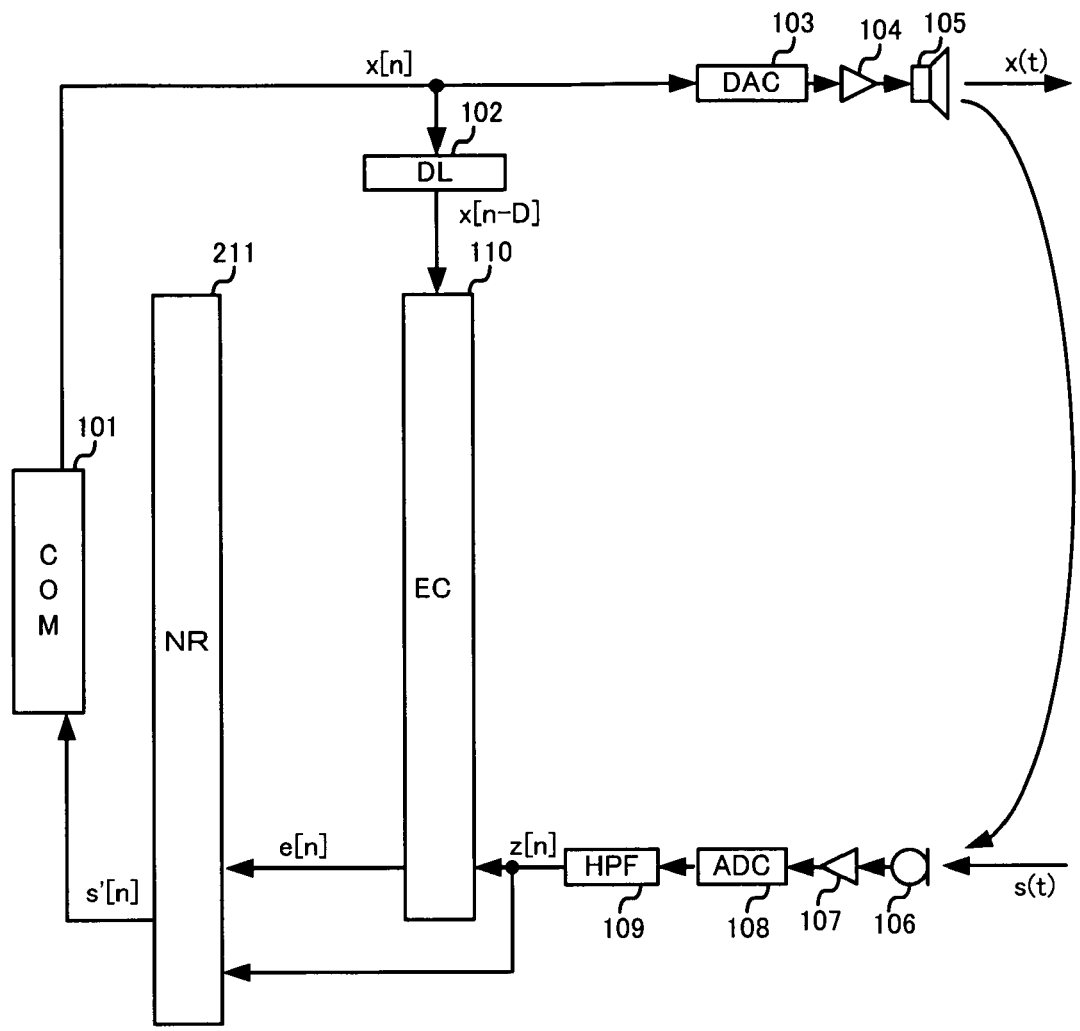
FIG. 9 is a block diagram of a communication apparatus of a second embodiment of the present invention.

A second embodiment of the present invention will be described with reference to FIGS. 9-12. FIG. 9 is a block diagram of a communication apparatus of the second embodiment of the present invention. As shown in FIG. 9, the communication apparatus of the second embodiment includes a noise reduction unit 211 (hereinafter shortened as the NR 211) instead of the ER 111 of the first embodiment.

Each of remaining portions of the communication apparatus of the second embodiment is a same as the corresponding one of the communication apparatus of the first embodiment given the same reference numeral, and its explanation is omitted.

The NR 211 will be explained with reference to FIG. 10. Each of portions of the NR 211 being a same as the corresponding one of the ER 111 is given the same reference numeral, and its explanation is omitted.

FIG. 10 is a block diagram of the NR 211 of the communication apparatus of the second embodiment. The NR 211 includes the FT 111*b*, the FT 111*c*, the POW 111*e*, the POW 111*f*, the ECLE 111*i* and the IFT 111*p*. The NR 211 includes a controller 211*k* (hereinafter shortened as the CTRL 211*k*), a spectrum selector 211L (hereinafter shortened as the SEL 211L), a noise reduction gain generator 211*n* (hereinafter shortened as the GCAL 211*n*), a signal suppressor 211*o* (hereinafter shortened as the SS 211*o*) and a noise level estimator 211*q* (hereinafter shortened as the NLE 211*q*).

The NR 211 is provided by the HPF 109 with the sent input signal z [n] and provided by the ST 110*b* with the residual signal e [n]. The NR 211 performs a noise reduction process, i.e., suppresses a noise component of at least one of the sent input signal z [n] and the residual signal e [n] so as to produce a sent output signal s' [n] (n=0, 1, . . . , N−1) on a frame-by-frame basis as a result of the noise reduction.

The NLE 211*q* is provided by the FT 111*b* with the sent frequency spectrum Z $[f, \omega]$ and provided by the FT 111*c* with the residual frequency spectrum E $[f, \omega]$. The NLE 211*q* measures a component of the above spectra in an interval not being active-voice. The NLE 211*q* estimates a noise level, $|N_Z[f, \omega]|^2$, included in the sent frequency spectrum Z $[f, \omega]$ for each frequency bin $\omega$. The NLE 211*q* estimates a noise level, $|N_E[f, \omega]|^2$, included in the residual frequency spectrum E $[f, \omega]$ for each frequency bin $\omega$.

The CTRL 211*k* is provided by the ECLE 111*i* with the echo cancellation level ECL $[f, \omega]$. Checking whether the echo cancellation level of the EC 110 is inadequate for each frequency bin $\omega$, the CTRL 211*k* produces a control flag NRcontrol $[f, \omega]$ indicating whether the echo cancellation level of the EC 110 is inadequate for each frequency bin $\omega$.

The CTRL 211*k* determines that the echo cancellation level of the EC 110 is inadequate if both of following inequalities are true, i.e., ECL $[f, \omega] > \beta_Z[\omega]$ and count$> \beta_C$, where $\beta_Z[\omega]$ is preferably from −15 to 8 dB, the parameter count represents for how many frequency bins per one frame a following inequality is true, i.e., ECL $[f, \omega] > \beta_Z[\omega]$, and $\beta_C$ is preferably from 10 to 40 percent as many as all frequency bins. In the second embodiment, $\beta_Z[\omega]$ is assumed to be 0 dB hereafter.

The SEL 211L is provided by the FT 111*b* with the frequency spectrum of the sent input signal Z $[f, \omega]$, provided by the FT 111*c* with the frequency spectrum of the residual signal E $[f, \omega]$, and provided by the CTRL 211*k* with the control flag NRcontrol $[f, \omega]$ indicating whether the echo cancellation level of the EC 110 is inadequate. The SEL 211L selects one of the frequency spectrum of the sent input signal Z $[f, \omega]$ and the frequency spectrum of the residual signal E $[f, \omega]$.

Specifically speaking, the SEL 211L selects the frequency spectrum Z $[f, \omega]$ of the sent input signal for a frequency bin where the control flag NRcontrol $[f, \omega]$ indicates that the echo cancellation level of the EC 110 is inadequate. The SEL 211L selects the frequency spectrum E [f, ω] of the residual signal for another frequency bin excluding the above.

The NR 211 can thus operate separately from the EC 110 for a frequency bin where the echo cancellation level of the EC 110 is inadequate, and the noise level can be estimated without being affected by an echo.

The GCAL 211n is provided by the NLE 211q with the noise levels $|N_Z[f, \omega]|^2$ and $|N_E[f, \omega]|^2$, provided by the POW 111e with the sent power spectrum $|Z[f, \omega]|^2$, provided by the CTRL 211k with the control flag NRcontrol [f, ω] and provided by the SS 111o with the frequency spectrum of the sent output signal one frame ago, S' [f−1, ω]. The GCAL 211n produces a noise reduction gain G [f, ω].

Specifically speaking, for a frequency bin where the control flag NRcontrol [f, ω] provided by the CTRL 211k indicates that the echo cancellation level of the EC 110 is inadequate, the GCAL 211n determines that the noise level is affected by a residual echo remaining after the echo cancellation of the EC 110 and that the noise level is therefore inaccurately estimated. The GCAL 211n then selects the noise level $|N_Z [f, \omega]|^2$. For a frequency bin other than the above, the GCAL 211n selects the noise level $|N_E [f, \omega]|^2$.

The noise reduction gain G [f, ω] may be produced based on the noise level selected for each frequency bin ω according to one of or a combination of following algorithms:

a spectral subtraction method, i.e., one of general noise reduction methods (S. F. Boll, "Suppression of acoustic noise in speech using spectral subtraction", IEEE Trans. Acoustics, Speech, and Signal Processing, vol.ASSP-29, pp. 113-120 (1979));

a Wiener filter method (J. S. Lim, A. V. Oppenheim, "Enhancement and bandwidth compression of noisy speech", Proc. IEEE Vol.67, No. 12, pp. 1586-1604, December 1979);

a maximum likelihood method (R. J. McAulay, M. L. Malpass, "Speech enhancement using a soft-decision noise suppression filter", IEEE Trans. on Acoustics, Speech, and Signal Processing, vol.ASSP-28, no.2, pp. 137-145, April 1980);

a method for estimating a priori signal-to-noise ratio $SNR_{PRIO}$ [f, ω] and a posterior signal-to-noise ratio $SNR_{POST}$ [f, ω] and for estimating noise reduction gain accurately by using a frequency spectrum of a sent output signal one frame ago, S' [f−1, ω] (P. Scalart, J. V. Filho, "Speech enhancement based on a priori signal to noise estimation", Proc. ICASSP96, pp.629-632, May 1996);

a minimum mean square error short-time spectral amplitude estimator (MMSE-STSA) method (Y. Ephraim, D. Malah, "Speech enhancement using a minimum mean square error short-time spectral amplitude estimator", IEEE Trans. on Acoustics, Speech, and Signal Processing, vol.ASSP-32, no.6, pp. 1109-1121, December 1984); and a joint map method (T. Lotter, P. Vary, "Noise reduction by maximum a posteriori spectral amplitude estimation with super Gaussian speech modeling", Proc. IWAENC, pp.83-86, September 2003).

In the second embodiment, the noise reduction gain G [f, ω] is produced by processing described later. If the noise level $|N_Z [f, \omega]|^2$ is selected, the $SNR_{PRIO}$ [f, ω] and the $SNR_{POST}$ [f, ω] are obtained according to Eq. 18-1 and Eq. 18-2, respectively. In the Eqs. 18-1 and 18-2, let P [·] be half-wave rectification. In that event, the noise reduction gain G [f, ω] is produced by the Wiener filter method according to Eq. 18-3, where μ [ω] is an oblivion coefficient ranging from 0.9 to 0.999.

If the noise level $|N_E [f, \omega]|^2$ is selected, the noise reduction gain G [f, ω] is produced according to Eq. 18-3 after $|N_Z [f, \omega]|^2$ in Eqs. 18-1 and 18-2 is replaced by $|N_E [f, \omega]|^2$.

$$SNR_{POST}[f, \omega] = \frac{|Z[f, \omega]|^2}{|N_Z[f, \omega]|^2} \quad \text{(Eq. 18-1)}$$

$$SNR_{PRIO}[f, \omega] = \quad \text{(Eq. 18-2)}$$
$$(1 - \mu[\omega]) \cdot P[SNR_{POST}[f, \omega] - 1] + \mu[\omega] \cdot \frac{|S'[f-1, \omega]|^2}{|N_Z[f, \omega]|^2}$$

$$G[f, \omega] = \frac{SNR_{PRIO}[f, \omega]}{SNR_{PRIO}[f, \omega] + 1} \quad \text{(Eq. 18-3)}$$

The GCAL 211n controls and keeps the noise reduction gain G [f, ω] above a determined lower threshold so as to prevent the communication apparatus from producing a sent speech signal of low quality due to excessive noise reduction and to prevent intermittent suppression of background noise. The lower threshold of the noise reduction gain may be set for each frequency bin as shown in FIG. 4, as well as the lower threshold of the echo reduction gain of the first embodiment.

The GCAL 211n may evaluate a level of background noise for each frequency bin ω by using a level of the sent input signal z [n] or the residual signal e [n] in an interval not being active-voice. The GCAL 211n may control and keep the noise reduction gain G [f, ω] above the level of the background noise so as to prevent the communication apparatus from producing a sent speech signal of low quality due to excessive noise reduction.

The SS 211o is provided by the SEL 211L with the frequency spectrum selected thereby and provided by the GCAL 211n with the noise reduction gain G [f, ω]. The SS 211o suppresses noise of the frequency spectrum provided by the SEL 211L and produces the frequency spectrum of the sent output signal, S' [f, ω], according to Eqs. 19-1 or 19-2.

$$S'[f,\omega] = G[f,\omega] \cdot Z[f,\omega] \quad \text{(Eq. 19-1)}$$

$$S'[f,\omega] = G[f,\omega] \cdot E[f,\omega] \quad \text{(Eq. 19-2)}$$

The sent output signal can be smooth to hear no matter which of the frequency spectrum of the sent input signal, Z [f, ω], and the frequency spectrum of the residual signal, E [f, ω], is selected by the SEL 211L, as the EC 110 operates in the time domain and produces no difference in terms of a phase spectrum.

Figure 11:
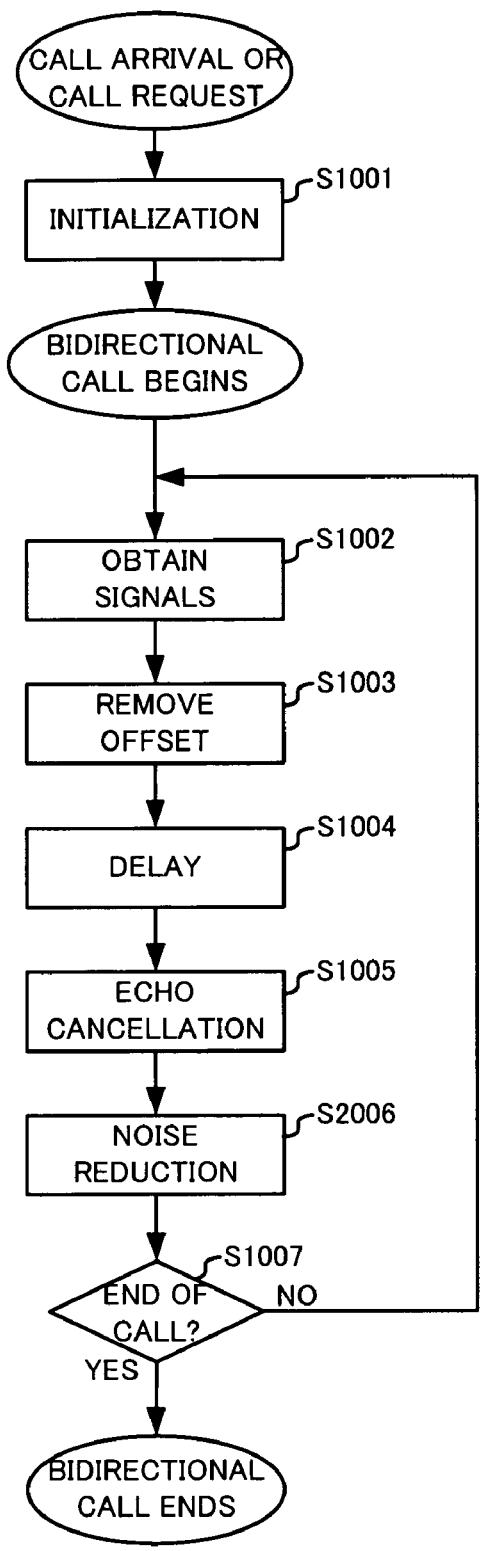
FIG. 11 is a flow chart of operation of the communication apparatus of the second embodiment.

A flow of operation of the communication apparatus of the second embodiment will be described with reference to FIGS. 11 and 12. FIG. 11 is a flow chart showing the flow as a whole. Each of steps shown in FIG. 11 being a same as the corresponding one shown in FIG. 5, the flow chart of the first embodiment, is given the same reference numeral and its explanation is omitted.

The communication apparatus of the first embodiment performs echo reduction at the step S1006. The communication apparatus of the second embodiment performs noise reduction, instead, by using a signal produced as a result of the echo cancellation at the step S1005 (step S2006). The communication apparatus then determines whether the call reaches an end at the step S1007.

The EC 110 of the second embodiment is a same as the EC110 of the first embodiment. As a matter of course, a flow of operation of the EC 110 of the second embodiment is a same as that of the first embodiment, and its explanation is omitted.

Figure 12:
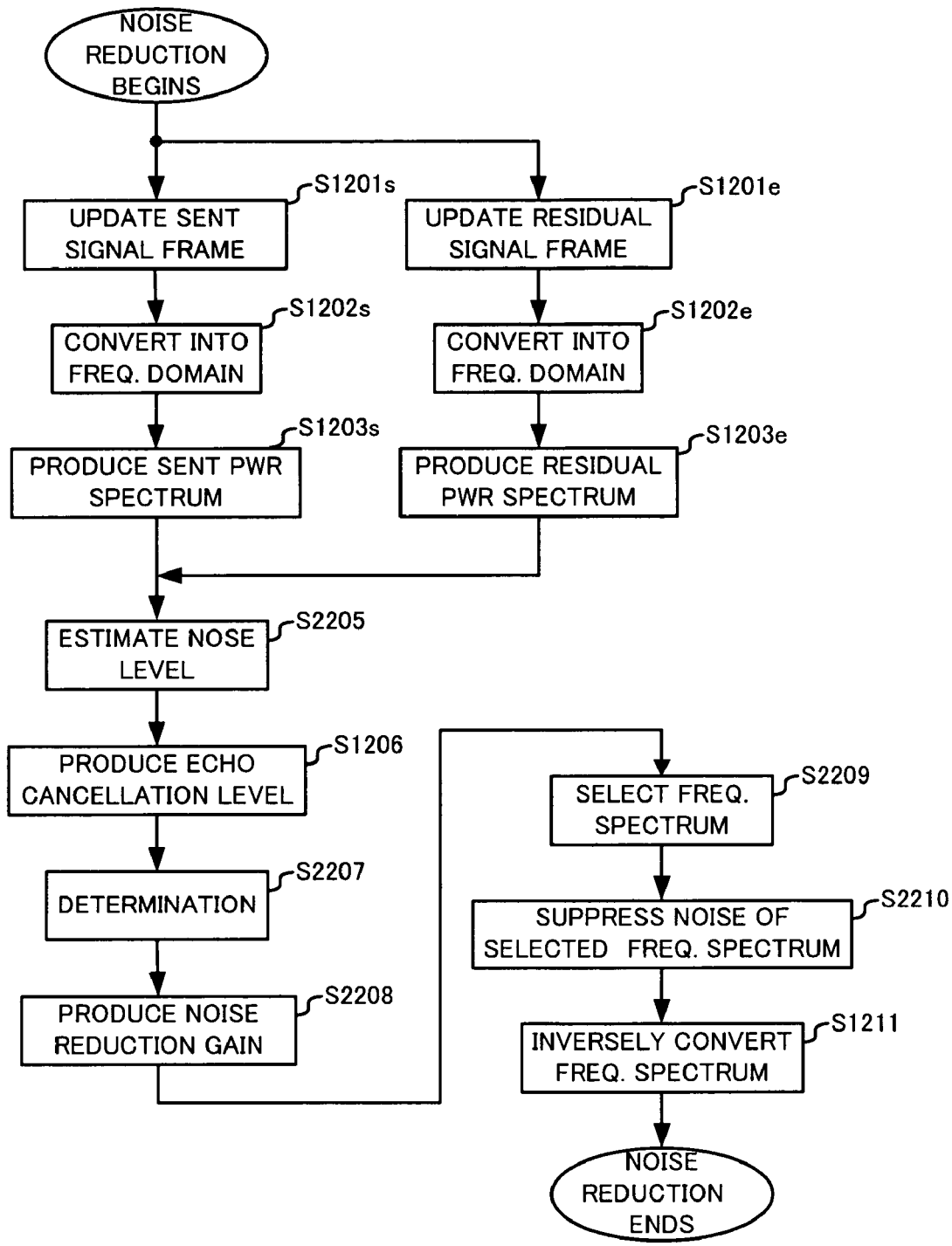
FIG. 12 is a flow chart of operation of the noise reduction unit of the second embodiment.

FIG. 12 is a flow chart of the noise reduction process of the NR 211 of the second embodiment. Each of steps shown in FIG. 12 being a same as the corresponding one shown in FIG. 7, the flow chart of the ER 111 of the first embodiment, is given the same reference numeral and its explanation is omitted. The step S1201r shown in FIG. 7 is not included in FIG. 11, neither are the steps S1202r, S1203r, S1204, S1205, S1207, S1208, S1209, S1210.

The NR 211 starts the noise reduction process and goes through the steps S1201s to S1203s or the steps S1201e to S1203e. After one of the steps S1203s and S1203e, the NLE 211q estimates the noise level $|N_Z[f, \omega]|^2$ included in the frequency spectrum of the sent input signal for each frequency bin ω or estimates the noise level $|N_E[f, \omega]|^2$ included in the frequency spectrum of the residual signal, by measuring a spectrum in an interval not being active-voice (step S2205).

After the step S1206 (estimating the echo cancellation level), the CTRL 211k determines whether the echo cancellation level of the EC 110 is adequate and produces the control flag NRcontrol [f, ω] (step S2207).

The GCAL 211n is provided by the POW 111e with the sent power spectrum $|Z[f, \omega]|^2$ and provided by the CTRL 211k with the control flag NRcontrol [f, ω].

For a frequency bin where the echo cancellation level of the EC 110 is inadequate, the GCAL 211n produces the noise reduction gain G [f, ω] by using one method of suppression. For a frequency bin other than the above, the GCAL 211n produces the noise reduction gain G [f, ω] by using another method of suppression. The GCAL 211n controls and keeps the noise reduction gain G [f, ω] above a determined lower threshold (step S2208).

The SEL 211L is provided by the CTRL 211k with the control flag NRcontrol [f, ω]. For a frequency bin where the echo cancellation level of the EC 110 is inadequate, the SEL 211L selects the frequency spectrum of the sent input signal, Z [f, ω]. For another frequency bin other than the above, the SEL 211L selects the frequency spectrum of the residual signal, E [f, ω] (step S2209).

The SS 211o is provided with the frequency spectrum selected by the SEL 211L, and provided by the GCAL 211n with the noise reduction gain G [f, ω] so as to suppress noise of the selected frequency spectrum (step S2210). The IFT 111p inversely converts the noise suppressed frequency spectrum of the sent output signal, S' [f, ω], provided by the SS 211o into a time domain representation (step S1211 ) and ends the flow of the noise reduction.

In the above description, the NR 211 is of a frequency domain type and operates on a frequency bin-by-frequency bin basis. A method of grouping the frequency bins for the FFT and operating on a group-by-group basis may be implemented. The NR 211 may be implemented as a frequency domain type like a bandwidth division filter like a filter bank.

During variation of echo path loss when double talk occurs, the echo cancellation level of the EC 110 may be inadequate as the residual signal e [n] exceeds the sent input signal z [n] due to the echo cancellation of the EC 110.

In that event, according to the second embodiment described above, the ECLE 111i and the CTRL 211k may detect a frequency bin where the echo cancellation level of the EC 110 is inadequate. The NLE 211q, the SEL 211L and the GCAL 211n, each included in the NR 211, can avoid being affected by an echo for estimating a noise level for each frequency bin so that the communication apparatus of the second embodiment can be robust against variation of echo path loss and can produce the sent output signal of high quality.

3 Third Embodiment of the Present Invention

Figure 13:
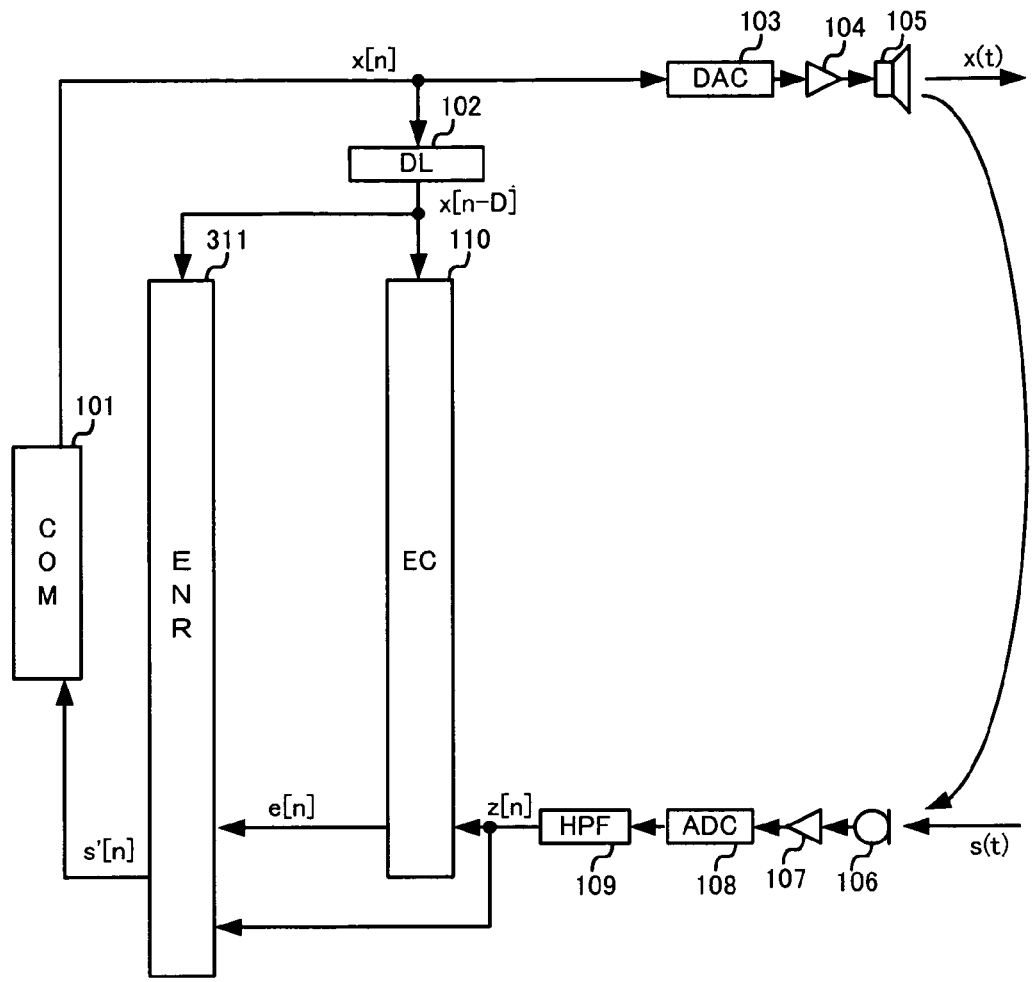
FIG. 13 is a block diagram of a communication apparatus of a third embodiment of the present invention.

A third embodiment of the present invention will be described with reference to FIGS. 13 to 16. FIG. 13 is a block diagram of a communication apparatus of the third embodiment of the present invention. As shown in FIG. 13, the communication apparatus of the third embodiment includes an echo and noise reduction unit 311 (hereinafter shortened as the ENR 311) instead of the ER 111 of the first embodiment.

Each of remaining portions of the communication apparatus of the third embodiment is a same as the corresponding one of the communication apparatus of the first embodiment given the same reference numeral, and its explanation is omitted.

The ENR 311 will be explained with reference to FIG. 14. Each of portions of the ENR 311 being a same as the corresponding one of the ER 111 of the first embodiment or the NR 211 of the second embodiment is given the same reference numeral, and its explanation is omitted.

FIG. 14 is a block diagram of the ENR 311 of the communication apparatus of the third embodiment. The ENR 311 includes the FT 111a, the FT 111b, the FT 111c, the POW 111d, the POW 111e, the POW 111f, the ACLE 111g, the ELE 111h, the ECLE 111i, the CTRL 211k, the SEL 211L, the GTBL 111m and the IFT 111p. The ENR 311 includes an echo and noise reduction gain generator 311n (hereinafter shortened as the GCAL 311n), a signal suppressor 311o (hereinafter shortened as the SS 311o) and a noise level estimator 311q (hereinafter shortened as the NLE 311q).

The ENR 311 is provided by the HPF 109 with the sent input signal z [n] and provided by the ST 110b with the residual signal e [n]. The ENR 311 performs an echo and noise reduction process, i.e., suppresses an echo component and a noise component of at least one of the sent input signal z [n] and the residual signal e [n] so as to produce a sent output signal s' [n] (n=0, 1, . . . , N−1) on a frame-by-frame basis as a result of the echo and noise reduction.

The NLE 311q is provided by the SEL 211L with one of the sent frequency spectrum Z [f, ω] and the residual frequency spectrum E [f, ω]. The NLE 311q measures a component of the above spectrum in an interval not being active-voice. The NLE 311q estimates a noise level, $|N[f, \omega]|^2$, included in the frequency spectrum provided by the SEL 211L for each frequency bin ω.

The GCAL 311n is provided by the ELE 111h with the smoothed echo level $|Y_S[f, \omega]|^2$, provided by the GTBL 111m with the parameter γ [ω], provided by the POW 111e with the smoothed sent power spectrum $|Z_S[f, \omega]|^2$, provided by the NLE 311q with the noise level $|N[f, \omega]|^2$ and provided by the CTRL 211K with the control flag NRcontrol [f, ω]. The GCAL 311n produces an echo and noise reduction gain G [f, ω].

Specifically speaking, for a frequency bin where the control flag NRcontrol [f, ω] provided by the CTRL 211k indicates that the echo cancellation level of the EC 110 is inadequate, the GCAL 311n removes the noise level $|N[f, \omega]|^2$ from the smoothed sent power spectrum $|Z_S[f, \omega]|^2$ so as to prevent the communication apparatus from producing a sent speech signal of low quality due to excessive echo reduction. The GCAL 311n produces an echo reduction gain $G_{ER}[f, \omega]$ according to Eq. 20.

$$G_{ER}[f, \omega] = \left(1 - \gamma[\omega] \cdot \frac{|Y_S[f, \omega]|^2}{|Z_S[f, \omega]|^2 - |N[f, \omega]|^2}\right) \quad \text{(Eq. 20)}$$

For a frequency bin other than the above, it may be assumed that the echo cancellation level of the EC 110 is adequate and the EC 110 works properly. The GCAL 311*n* corrects an echo reduction level of the ENR 311 so that it increases by using the echo cancellation level ECL [f, ω] of the EC 110. The GCAL 311*n* produces the echo reduction gain $G_{ER}$ [f, ω] according to Eq. 21.

$$G_{ER}[f, \omega] = \left( \frac{1 - \gamma[\omega] \cdot |Y_S[f, \omega]|^2}{|Z_S[f, \omega]|^2 - |N[f, \omega]|^2} \right) \cdot ECL[f, \omega] \quad \text{(Eq. 21)}$$

The GCAL 311*n* produces a noise reduction gain $G_{NR}$ [f, ω] based on the noise level |N [f, ω]|² selected for each frequency bin ω according to the spectral subtraction method, i.e., one of general noise reduction methods, the Wiener filter method or the maximum likelihood method. The GCAL 311*n* multiplies the echo reduction gain $G_{ER}$ [f, ω] by the noise reduction gain $G_{NR}$ [f, ω] to produce the echo and noise reduction gain G [f, ω] according to Eq. 22.

$$G[f,\omega] = G_{ER}[f,\omega] \cdot G_{NR}[f,\omega] \quad \text{(Eq. 22)}$$

The GCAL 311*n* controls and keeps the echo and noise reduction gain G [f, ω] above a determined lower threshold so as to prevent the communication apparatus from producing a sent speech signal of low quality due to excessive echo and noise reduction. The lower threshold of the echo and noise reduction gain may be set for each frequency bin as shown in FIG. 4, as well as the lower threshold of the echo reduction gain of the first embodiment.

The GCAL 311*n* may evaluate a level of background noise for each frequency bin ω by using a level of the sent input signal z [n] or the residual signal e [n] in an interval not being active-voice. The GCAL 311*n* may control and keep the echo and noise reduction gain G [f, ω] above the level of the background noise so as to prevent the communication apparatus from producing a sent speech signal of low quality due to excessive echo and noise reduction.

The GCAL 311*n* may smooth the echo and noise reduction gain G [f, ω] in the frequency domain according to Eq. 23-1 or Eq. 23-2 so as to prevent the communication apparatus from producing a sent speech signal of low quality. In these equations, $\epsilon_j$ may be [0.1, 0.2, 0.4, 0.2, 0.1], and $\eta_j$ may be [0.1, 0.2, 0.4, 0.8, 0.4, 0.2, 0.1] for instance.

$$G_S[f, \omega] = \frac{\sum_{j=1}^{5} \epsilon_j \cdot G[f, \omega + j - 3]}{\sum_{j=1}^{5} \epsilon_j} \quad \text{(Eq. 23-1)}$$

$$G_S[f, \omega] = \frac{\sum_{j=1}^{7} \eta_j \cdot G[f, \omega + j - 4]}{\sum_{j=1}^{7} \eta_j} \quad \text{(Eq. 23-2)}$$

The SS 311*o* is provided by the SEL 211L with the frequency spectrum selected thereby and provided by the GCAL 311*n* with the echo and noise reduction gain G [f, ω]. The SS 311*o* suppresses an echo and noise of the frequency spectrum provided by the SEL 311L, and produces a frequency spectrum of the sent output signal, S' [f, ω], according to Eq. 24-1 or Eq. 24-2.

$$S'[f,\omega] = G[f,\omega] \cdot Z[f,\omega] \quad \text{(Eq. 24-1)}$$

$$S'[f,\omega] = G[f,\omega] \cdot E[f,\omega] \quad \text{(Eq. 24-2)}$$

The sent output signal can be smooth to hear no matter which of the frequency spectrum of the sent input signal, Z [f, ω], and the frequency spectrum of the residual signal, E [f, ω], is selected by the SEL 311L, as the EC 110 operates in the time domain and produces no difference in terms of a phase spectrum.

Figure 15:
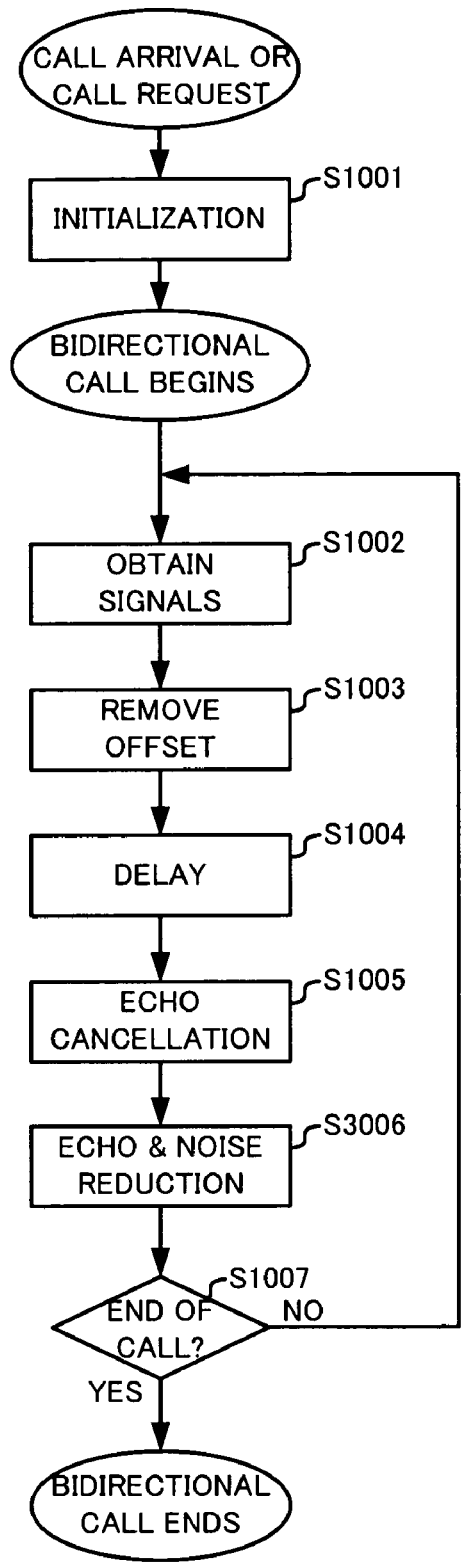
FIG. 15 is a flow chart of operation of the communication apparatus of the third embodiment.

A flow of operation of the communication apparatus of the third embodiment will be described with reference to FIGS. 15 and 16. FIG. 15 is a flow chart showing the flow as a whole. Each of steps shown in FIG. 15 being a same as the corresponding one shown in FIG. 5, the flow chart of the first embodiment, is given the same reference numeral and its explanation is omitted.

The communication apparatus of the first embodiment performs echo cancellation at the step S1006. The communication apparatus of the third embodiment performs echo and noise suppression, instead, by using a signal produced as a result of the echo cancellation at the step S1005 (step S3006). The communication apparatus then determines whether the call reaches an end at the step S1007.

The EC 110 of the third embodiment is a same as the EC110 of the first embodiment. As a matter of course, a flow of operation of the EC 110 of the third embodiment is a same as that of the first embodiment, and its explanation is omitted.

Figure 16:
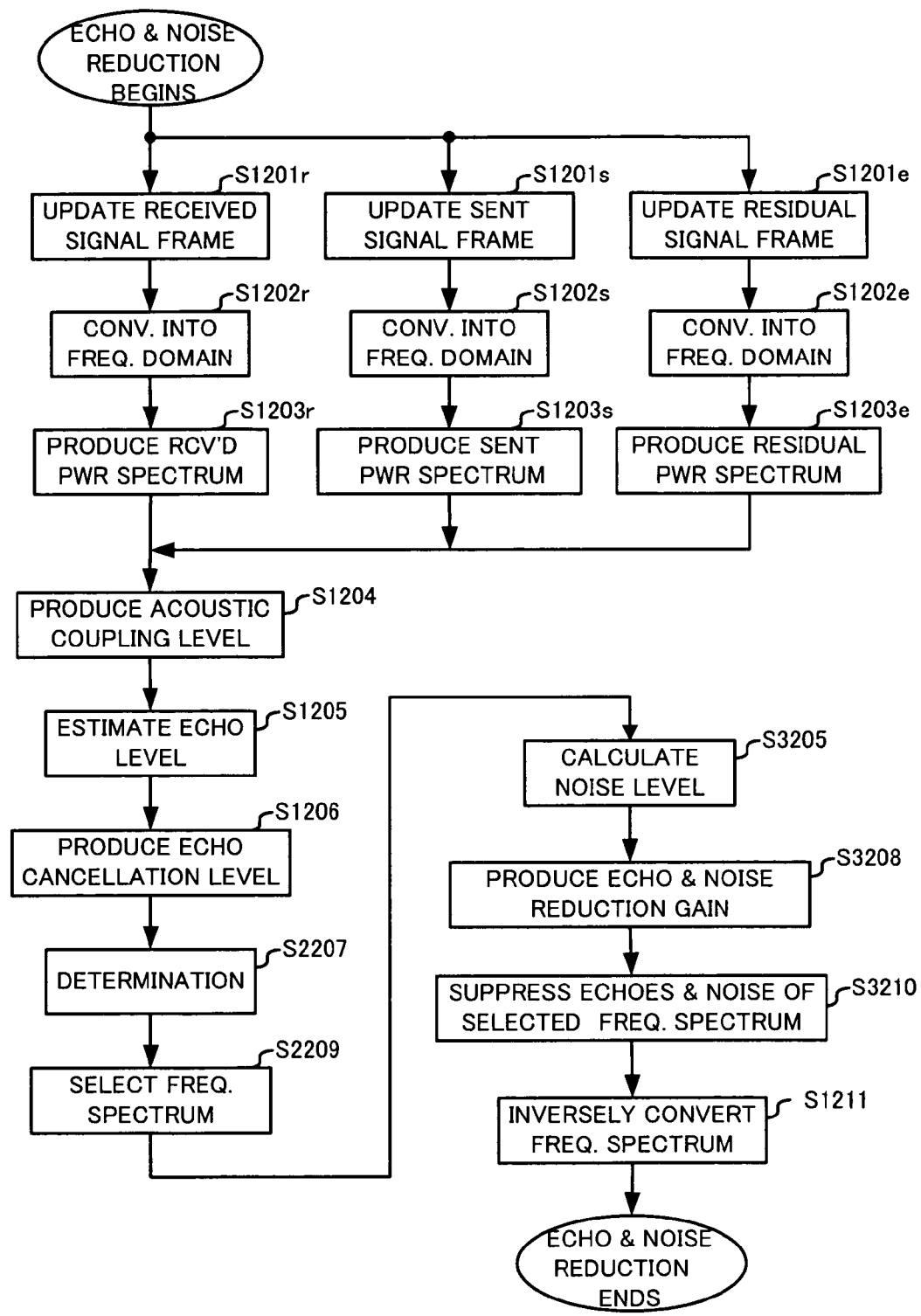
FIG. 16 is a flow chart of operation of the echo and noise reduction unit of the third embodiment.

FIG. 16 is a flow chart of the echo and noise reduction process of the ENR 311 of the third embodiment. Each of steps shown in FIG. 16 being a same as the corresponding one shown in FIG. 7, the flow chart of the ER 111 of the first embodiment, is given the same reference numeral and its explanation is omitted. Each of steps shown in FIG. 16 being a same as the corresponding one shown in FIG. 12, the flow chart of the NR 211 of the second embodiment, is given the same reference numeral and its explanation is omitted.

The ENR 311 starts the echo and noise reduction process and goes through the steps S1201*r* to S1203*r*, the steps S1201*s* to S1203*s* or the steps S1201*e* to S1203*e*. The ENR 311 then goes through the steps S1204, S1206, S2207 and S2209. Following the step S2209, the NLE 311*q* estimates the noise level |N [f, ω]|² included in the frequency spectrum provided by the SEL 211L for each frequency bin ω (step S3205).

The GCAL 311*n* is provided by the NLE 311*q* with the noise level |N [f, ω]|² and provided by the CTRL 211*k* with the control flag NRcontrol [f, ω].

For a frequency bin where the echo cancellation level of the EC 110 is inadequate, the GCAL 311*n* produces the echo and noise reduction gain G [f, ω] by using one method of suppression. For a frequency bin other than the above, the GCAL 311*n* produces the echo and noise reduction gain G [f, ω] by using another method of suppression. The GCAL 311*n* controls and keeps the echo and noise reduction gain G [f, ω] above a determined lower threshold (step S3208).

Being provided with the frequency spectrum selected by the SEL 211L, and provided by the GCAL 311*n* with the echo and noise reduction gain G [f, ω], the SS 311*o* suppresses an echo and noise of the selected frequency spectrum (step S3210). The IFT 111*p* inversely converts the echo and noise suppressed frequency spectrum of the sent output signal, S' [f, ω], provided by the SS 311*o* into a time domain representation (step S1211) and ends the echo and noise reduction process.

In the above description, the ENR 311 is of a frequency domain type and operates on a frequency bin-by-frequency bin basis. A method of grouping the frequency bins for the FFT and operating on a group-by-group basis may be implemented. The ENR 311 may be implemented as a frequency domain type like a bandwidth division filter like a filter bank.

During variation of echo path loss when double talk occurs, the echo cancellation level of the EC 110 may be inadequate as the residual signal e [n] exceeds the sent input signal z [n] due to the echo cancellation of the EC 110.

In that event, according to the third embodiment described above, the ECLE 111i and the CTRL 211k may detect a frequency bin where the echo cancellation level of the EC 110 is inadequate. The SEL 211L and the GCAL 311n can vary weighting put on the EC 110 and put on the ENR 311 for each frequency bin so that the communication apparatus of the third embodiment can be robust against variation of echo path loss and can produce the sent output signal of high quality.

As the echo reduction in the frequency domain, that is nonlinear process, and the noise reduction in the frequency domain are combined by the GCAL 311n and the SS 311o to be included in the ENR 311, the communication apparatus of the third embodiment can reduce a load of operation and can produce a sent speech signal of quality higher than that produced by another apparatus configured that the echo reduction and the noise reduction are arranged in series.

4 Fourth Embodiment of the Present Invention

Figure 17:
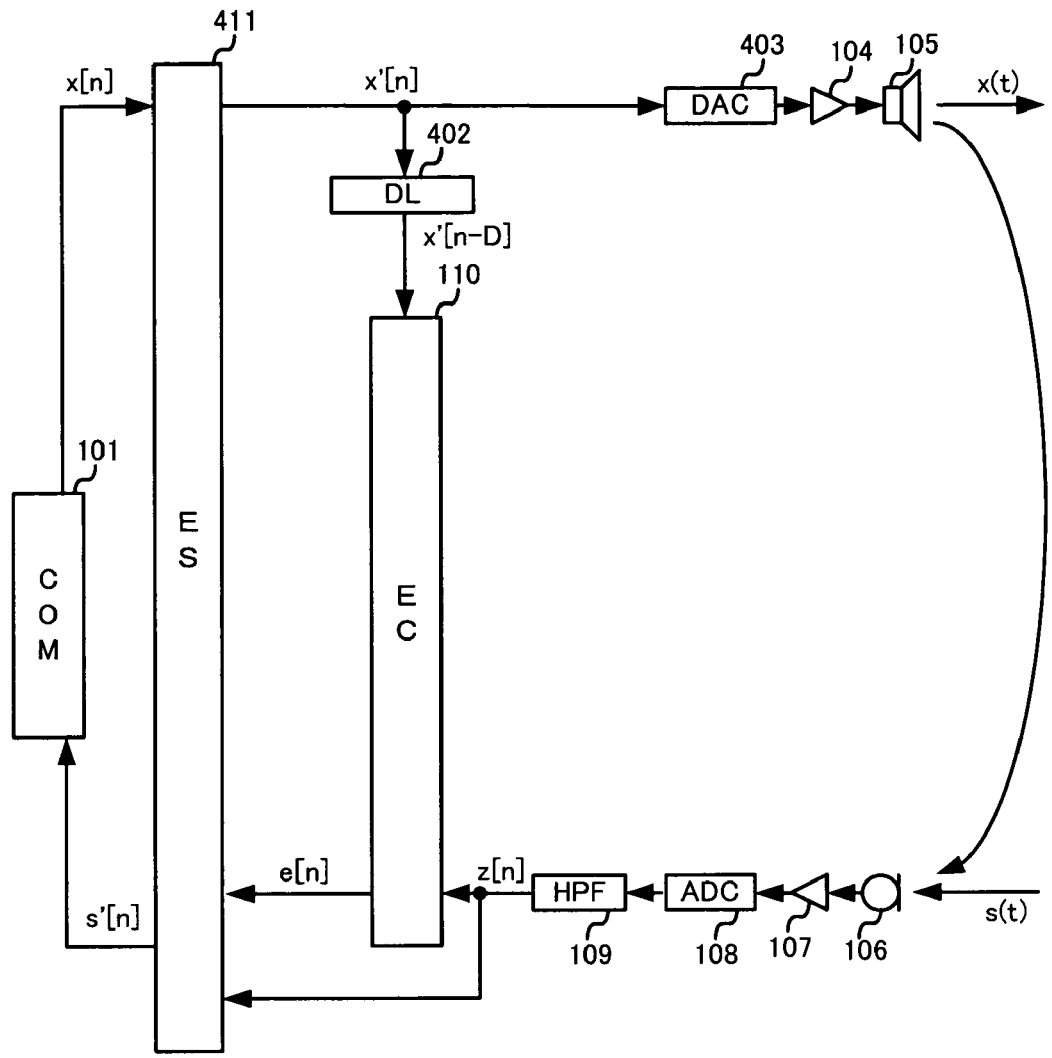
FIG. 17 is a block diagram of a communication apparatus of a fourth embodiment of the present invention.

A fourth embodiment of the present invention will be described with reference to FIGS. 17 to 20. FIG. 17 is a block diagram of a communication apparatus of the fourth embodiment. As shown in FIG. 17, the communication apparatus of the fourth embodiment includes an echo suppressor 411 (hereinafter shortened as the ES 411), a delay unit 402 (hereinafter shortened as the DL 402) and a digital-to-analog converter 403 (hereinafter shortened as the DAC 403), instead of the ER 111, the DL 102 and the DAC 103 of the first embodiment, respectively.

Each of remaining portions of the communication apparatus of the fourth embodiment is a same as the corresponding one of the communication apparatus of the first embodiment given the same reference numeral, and its explanation is omitted.

Although the DL 402 is provided by the ES 411 with a received input signal x' [n] and differs from the DL 102 in this respect, an explanation of the DL 402 is omitted as the DL 402 works in a same way as the DL 102 does. Although the DAC 403 is provided by the ES 411 with the received input signal x' [n] and differs from the DAC 103 in this respect, an explanation of the DAC 403 is omitted as the DAC 403 works in a same way as the DAC 103 does.

Figure 18:
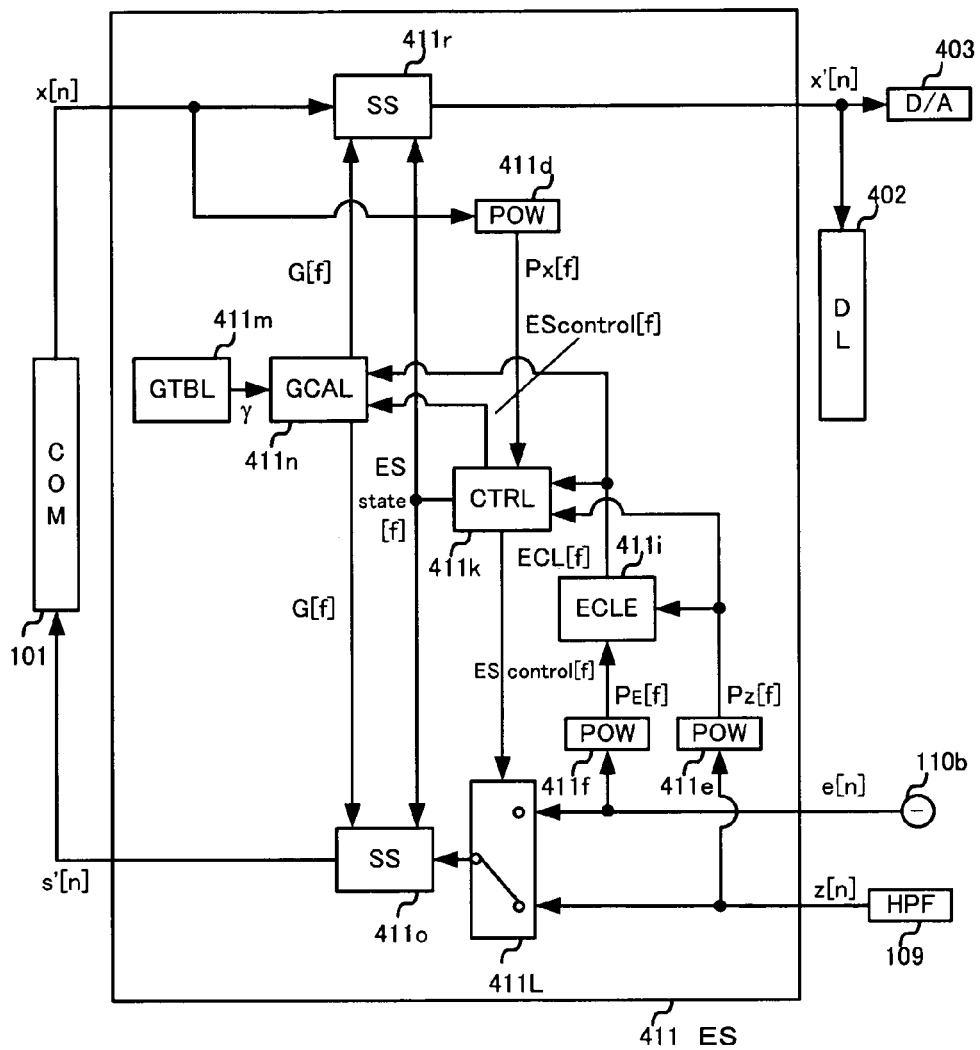
FIG. 18 is a block diagram of an echo suppressor included in the communication apparatus of the fourth embodiment.

FIG. 18 is a block diagram of the ES 411 of the communication apparatus of the fourth embodiment. The ES 411 includes a received power evaluation unit 411d (hereinafter shortened as the POW 411d), a sent power evaluation unit 411e (hereinafter shortened as the POW 411e) and a residual power evaluation unit 411f (hereinafter shortened as the POW 411f).

The ES 411 includes an echo cancellation level estimator 411i (hereinafter shortened as the ECLE 411i), a controller 411k (hereinafter shortened as the CTRL 411k) and a signal selector 411L (hereinafter shortened as the SEL 411L). The ES 411 includes a memory of a gain value 411m (hereinafter shortened as the GTBL 411m), an echo suppression gain generator 411n (hereinafter shortened as the GCAL 411n), a sent signal attenuator 411o (hereinafter shortened as the SS 411o) and a received signal attenuator 411r (hereinafter shortened as the SS 411r).

The ES 411 is provided by the COM 101 with the received input signal x [n], provided by the HPF 109 with the sent input signal z [n] and provided by the ST 110b with the residual signal e [n]. After performing echo suppression on at least one of the received input signal x [n] and either the sent input signal z [n] or the residual signal e [n], the ES 411 produces a received output signal x' [n] and a sent output signal s' [n] for each frame.

The POW 411d is provided by the COM 101 with the received input signal x [n]. The POW 411d produces received power $P_X$ [f] for each frame according to Eq. 25-1. The received power $P_X$ [f] may be replaced by $P_{SX}$ [f] which has been smoothed by using a value thereof one frame ago, $P_{SX}$ [f−1], according to Eq. 25-2, where $\alpha_X$ is preferably from 0.375 to 0.999.

$$P_X[f] = \sum_{n=0}^{N-1} x^2[n] \quad \text{(Eq. 25-1)}$$

$$P_{SX}[f] = \alpha_X \cdot P_X[f] + (1 - \alpha_X) \cdot P_{SX}[f-1] \quad \text{(Eq. 25-2)}$$

The POW 411e is provided by the HPF 109 with the sent input signal z [n]. The POW 411e produces sent power $P_Z$ [f] for each frame according to Eq. 26-1. The sent power $P_Z$ [f] may be replaced by $P_{SZ}$ [f] which has been smoothed by using a value thereof one frame ago, $P_{SZ}$ [f−1], according to Eq. 26-2, where $\alpha_Z$ is preferably from 0.375 to 0.999.

$$P_Z[f] = \sum_{n=0}^{N-1} z^2[n] \quad \text{(Eq. 26-1)}$$

$$P_{SZ}[f] = \alpha_Z \cdot P_Z[f] + (1 - \alpha_Z) \cdot P_{SZ}[f-1] \quad \text{(Eq. 26-2)}$$

The POW 411f is provided by the ST 110b with the residual signal e [n]. The POW 411f produces residual power $P_E$ [f] for each frame according to Eq. 27-1. The residual power $P_E$ [f] may be replaced by $P_{SE}$ [f] which has been smoothed by using a value thereof one frame ago, $P_{SE}$ [f−1], according to Eq. 27-2, where $\alpha_E$ is preferably from 0.375 to 0.999.

$$P_E[f] = \sum_{n=0}^{N-1} e^2[n] \quad \text{(Eq. 25-1)}$$

$$P_{SE}[f] = \alpha_E \cdot P_E[f] + (1 - \alpha_E) \cdot P_{SE}[f-1] \quad \text{(Eq. 25-2)}$$

The ECLE 411i is provided by the POW 411e with the sent power $P_Z$ [f] and provided by the POW 411f with the residual power $P_E$ [f]. The ECLE 411i produces an echo cancellation level ECL [f] of the EC 110 according to Eq. 28. The ECLE 411i may use a difference between the sent power $P_Z$ [f] and the residual power $P_E$ [f], etc.

$$ECL[f] = \frac{P_E[f]}{P_Z[f]} \quad \text{(Eq. 28)}$$

Being provided by the ECLE 411i with the echo cancellation level ECL [f], the CTRL 411k determines whether the echo cancellation level of the EC 110 is inadequate for each frame, and produces a control flag EScontrol [f] indicating the above determination of the echo cancellation level. Specifically speaking, the CTRL 411k determines that the echo cancellation level of the EC 110 is inadequate if a following inequality is true, i.e., ECL [f]>$\beta_Z$, where $\beta_Z$ is preferably from −15 to 8 dB. In the fourth embodiment, $\beta_Z$ is assumed to be 0 dB hereafter.

The CTRL 411*k* is provided by the POW 411*d* with the received power $P_X[f]$ and provided by the POW 411*e* with the sent power $P_Z[f]$. The CTRL 411*k* determines whether the SS 411*r* attenuates the received input signal x [n] or whether the SS 411*o* attenuates a sent signal (the sent input signal z [n] or the residual signal e [n]), and produces a state flag ESstate [f] indicating the above determination of the attenuation.

For instance, the CTRL 411*k* detects an active-voice condition of the received path by using the received power $P_X[f]$ and a variable threshold indicating a noise level of the received path. The CTRL 411*k* detects an active-voice condition of the send path by using the sent power $P_Z[f]$ and a variable threshold indicating a noise level of the send path.

If the received path is in an active-voice condition, the CTRL 411*k* sets the state flag ESstate [f] indicating the attenuation of the sent signal. If the send path is in an active-voice condition, the CTRL 411*k* sets the state flag ESstate [f] indicating the attenuation of the received signal. The CTRL 411*k* continues the above indication of the state flag ESstate [f] until a difference between the received power $P_X[f]$ and the sent power $P_Z[f]$ becomes significant.

For a frame where the control flag EScontrol [f] indicates that the echo cancellation level is inadequate, the sent power $P_Z[f]$ may be used as sent power $P_S[f]$. For a frame where the control flag EScontrol [f] indicates that the echo cancellation level is adequate, the residual power $P_E[f]$ may be used as sent power $P_S[f]$.

The SEL 411L is provided by the HPF 109 with the sent input signal z [n], provided by the ST 110*b* with the residual signal e [n] and provided by the CTRL 411*k* with the control flag EScontrol [f]. The SEL 411L selects one of the sent input signal z [n] and the residual signal e [n] on a frame-by-frame basis.

Specifically speaking, the SEL 411L selects the sent input signal z [n] for a frame where the control flag EScontrol [f] indicates that the echo cancellation level of the EC 110 is inadequate. The SEL 411L selects the residual signal e [n] for a frame other than the above. The ES 411 can thus operate separately from the EC 110 for a frame where the echo cancellation level of the EC 110 is inadequate, and so is its accuracy of estimation.

The GTBL 411*m* keeps a gain parameter γ which is preferably preset based on echo return loss of an analog front end (the DAC 403, the SP 105, the sound space, the MP 106, the SA 107 and the ADC 108).

The GCAL 411*n* is provided by the GTBL 411*m* with the gain parameter γ, provided by the ECLE 411*i* with the echo cancellation level ECL [f] and provided by the CTRL 411*k* with the control flag EScontrol [f] and the state flag ESstate [f]. The GCAL 411*n* produces an echo suppression gain G [f].

Specifically speaking, if the state flag ESstate [f] indicates the attenuation of the sent signal (the sent input signal z [n] or the residual signal e [n]), the GCAL 411L operates as follows. At first, the GCAL 411*n* sets the echo suppression gain G [f] equal to the gain parameter γ, i.e., G [f]=γ for a frame where the control flag EScontrol [f] indicates that the echo cancellation level of the EC 110 is inadequate.

There are two options for a frame other than the above. One option is that the GCAL 411*n* sets the echo suppression gain G [f] equal to the echo cancellation level ECL [f] multiplied by y, i.e., G [f]=γ·ECL [f], as the echo suppression gain may be increased by making the most of adequate echo cancellation level of the EC 110. Another option is that the GCAL 411*n* sets the echo suppression gain G [f] equal to γ divided by ECL [f], i.e., G [f]=γ/ECL [f], as the echo suppression gain may be decreased by the echo cancellation level of the EC 110 so as to avoid excessive echo attenuation. If the state flag ESstate [f] indicates the attenuation of the received input signal, the GCAL 411*n* sets the echo suppression gain G [f] equal to γ, i.e., G [f]=γ.

The GCAL 411*n* may evaluate a level of background noise by using a level of the sent input signal z [n] or the residual signal e [n] in an interval not being active-voice. The GCAL 411*n* may control and keep the echo suppression gain G [f] above the level of the background noise so as to prevent quality of a sent speech from worsening due to excessive echo attenuation.

The SS 411*o* is provided by the CTRL 411*k* with the state flag ESstate [f], provided by the GCAL 411*n* with the echo suppression gain G [f] and provided by the SEL 411L with the sent signal (the sent input signal z [n] or the residual signal e [n]). If the state flag ESstate [f] indicates the attenuation of the sent signal (the sent input signal z [n] or the residual signal e [n]), the SS 411*o* attenuates the signal selected by the SEL 411L by using the echo suppression gain G [f] produced by the GCAL 411*n* according to Eq. 29-1 or Eq. 29-2. The SS 411*o* produces a sent output signal s' [n].

If the flag ESstate [f] indicates no attenuation of the sent signal (the sent input signal z [n] or the residual signal e [n]), the SS 411*o* produces the sent output signal s' [n] selected by the SEL 411L according to Eq. 29-3 or Eq. 29-4.

$$s'[n]=G[f]\cdot z[n] \qquad \text{(Eq. 29-1)}$$

$$s'[n]=G[f]\cdot e[n] \qquad \text{(Eq. 29-2)}$$

$$s'[n]=z[n] \qquad \text{(Eq. 29-3)}$$

$$s'[n]=e[n] \qquad \text{(Eq. 29-4)}$$

The sent output signal s' [n] may be multiplied by the echo suppression gain G [f] smoothed in the time domain so as to be smooth to hear no matter which of the sent input signal z [n] and the residual signal e [n] is selected by the SEL 411L.

The SS 411*r* is provided by the CTRL 411*k* with the state flag ESstate [f], provided by the GCAL 411*n* with the echo suppression gain G [f] and provided by the COM 101 with the received input signal x [n]. If the state flag ESstate [f] indicates the attenuation of the received input signal x [n] provided by the COM 101, the SS 411*r* attenuates the received input signal x [n] by using the echo suppression gain G [f] produced by the GCAL 411*n* according to Eq. 30-1. The SS 411*r* produces a received output signal x' [n].

If the state flag ESstate [f] indicates no attenuation of the received input signal x [n], the SS 411*r* produces the received output signal x' [n] according to Eq. 30-2.

$$x'[n]=G[f]\cdot x[n] \qquad \text{(Eq. 30-1)}$$

$$x'[n]=x[n] \qquad \text{(Eq. 30-2)}$$

Figure 19:
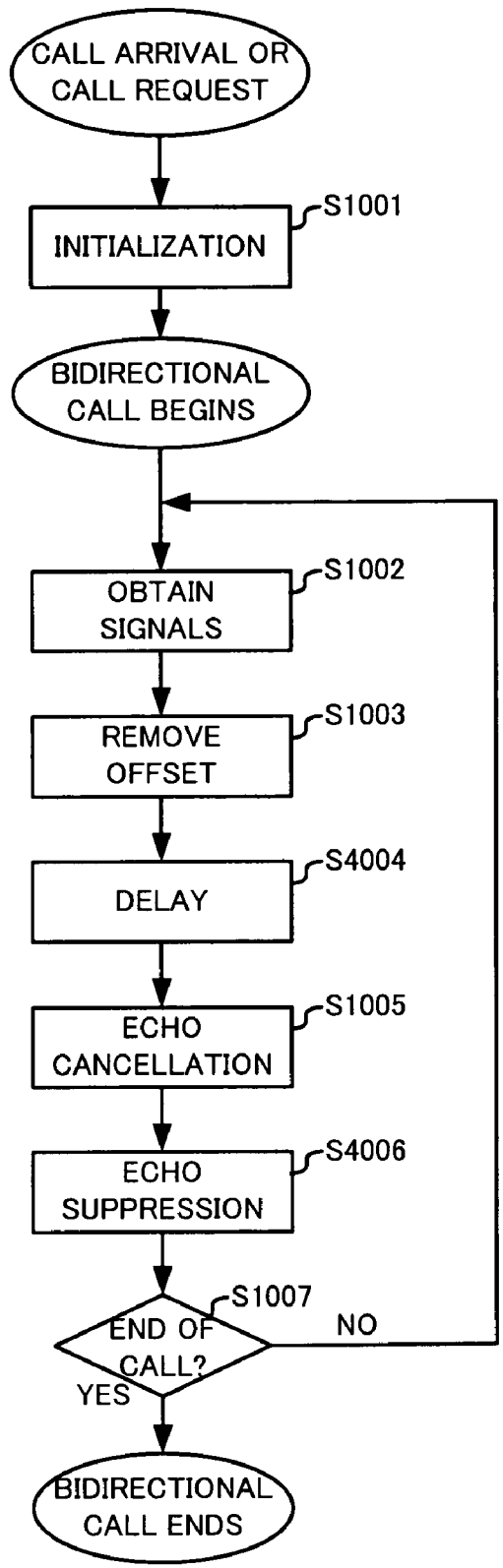
FIG. 19 is a flow chart of operation of the communication apparatus of the fourth embodiment.

A flow of operation of the communication apparatus of the fourth embodiment will be described with reference to FIGS. 19 and 20. FIG. 19 is a flow chart showing the flow as a whole. Each of steps shown in FIG. 19 being a same as the corresponding one shown in FIG. 5, the flow chart of the first embodiment, is given the same reference numeral and its explanation is omitted.

After the removal of the offset of the sent input signal z [n] at the step S1003, the DL 402 temporarily holds and delays the received output signal x' [n] provided by the SS 411*r* (step S4004). The flow moves on to the echo cancellation at the step S1005. After the echo cancellation at the step S1005, the communication apparatus of the fourth embodiment performs echo suppression by using an echo-cancelled signal obtained at the step S1005 instead of the echo reduction which the communication apparatus of the first embodiment performs at the step S1006 (step S4006). The communication apparatus then determines whether the call reaches an end at the step S1007.

The EC 110 of the fourth embodiment is a same as the EC110 of the first embodiment. As a matter of course, a flow of operation of the EC 110 of the fourth embodiment is a same as that of the first embodiment, and its explanation is omitted.

Figure 20:
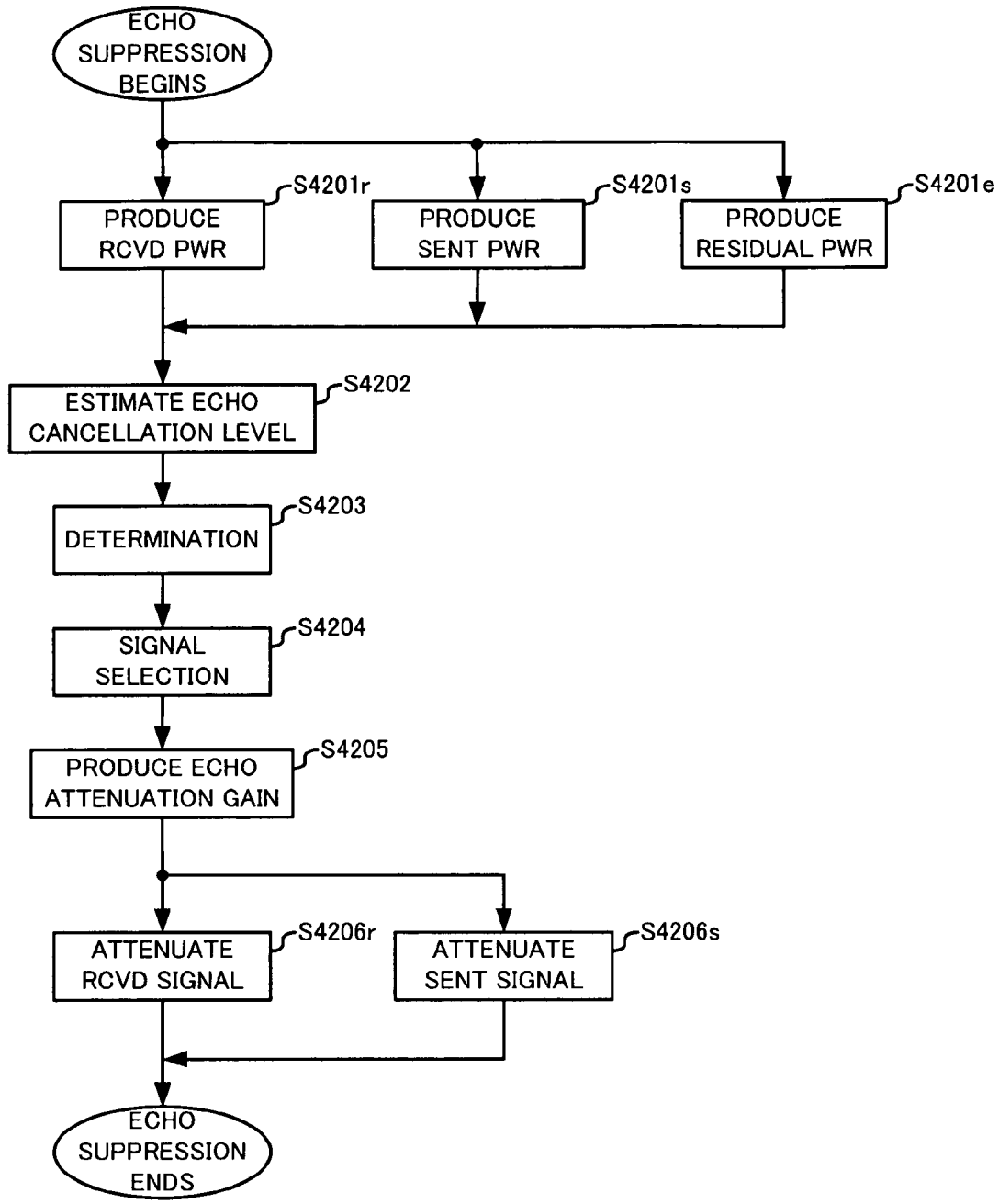
FIG. 20 is a flow chart of operation of the echo suppressor of the fourth embodiment.

FIG. 20 is a flow chart of processing of the ES 411 of the fourth embodiment. At first, the POW 411*d* produces the received power P$_X$ [f] from the received input signal x [n] (step S4201*r*). The POW 411*e* produces the sent power P$_Z$ [f] from the sent input signal z [n] (step S4201*s*). The POW 411*f* produces the residual power P$_E$ [f] from the residual signal e [n] (step S4201*e*).

The ECLE 411*i* is provided with the sent power P$_Z$ [f] and the residual power P$_E$ [f]. The ECLE estimates the echo cancellation level ECL [f] of the EC 110 (step S4202).

Being provided with the echo cancellation level ECL [f] the CTRL 411*k* determines whether the echo cancellation level is adequate for each frame, and produces the control flag EScontrol [f]. The CTRL 411*k* determines whether the SS 411*r* attenuates the received input signal x [n] or whether the SS 411*o* attenuates the sent signal (the sent input signal z [n] or the residual signal e [n]) based on the received power P$_X$[f] and the sent power P$_Z$[f]. The CTRL 411*k* produces the state flag ESstate [f] (step S4203).

The SEL 411L is provided with the control flag EScontrol [f]. The SEL 411L selects z [n] for a frame where the echo cancellation level is inadequate. The SEL 411L selects e [n] for a frame where the echo cancellation level is adequate (step S4204).

The GCAL 411*n* is provided with the control flag EScontrol [f] and the echo cancellation level ECL [f]. For a frame where the echo cancellation level is inadequate, the GCAL 411L produces the echo suppression gain G [f] by using one method of attenuation. For a frame other than the above, the GCAL 411L produces the echo attenuation gain G [f] by using another method of attenuation (step S4205).

The SS 411*o* is provided with the echo suppression gain G [f] and the state flag ESstate [f]. If it is determined that the SS 411*o* attenuates the sent signal (the sent input signal z [n] or the residual signal e [n]), the SS 411*o* attenuates the signal selected by the SEL 411L by using the echo suppression gain G [f] produced by the GCAL 411*n*, and produces the sent output signal s' [n] as a result of the attenuation. If it is determined that the SS 411*o* does not attenuate the sent signal, the SS 411*o* outputs the signal selected by the SEL 411L as the sent output signal s' [n] (step S4206*s*).

The SS 411*r* is provided with the echo suppression gain G [f] and the state flag ESstate [f]. If it is determined that the SS 411*r* attenuates the received input signal x [n], the SS 411*o* attenuates the received input signal x [n] by using the echo suppression gain G [f] produced by the GCAL 411*n*, and produces the received output signal x' [n] as a result of the attenuation. If it is determined that the SS 411*r* does not attenuate the received input signal x [n], the SS 411*r* outputs the received input signal x [n] as the received output signal x' [n] (step S4206*r*). The ES 411 then ends the echo suppression process.

In the above description, the ES 411 is of a time domain type and operates on a frame-by-frame basis. The ES 411 may be implemented as a frequency domain type by using a band-width division filter like an FFT or a filter bank, etc.

During variation of echo path loss when double talk occurs, the echo cancellation level of the EC 110 may be inadequate as the residual signal e [n] exceeds the sent input signal z [n] due to the echo cancellation of the EC 110.

In that event, according to the fourth embodiment described above, the ECLE 411*i* and the CTRL 411*k* may detect a case where the echo cancellation level of the EC 110 is inadequate. The GCAL 411*n* and the SS 411*o* may take the echo cancellation level of the EC 110 into account and can avoid excessive attenuation of a sent speech signal so that the communication apparatus of the fourth embodiment can be robust against variation of echo path loss and can produce the sent output signal of high quality.

5 Fifth Embodiment of the Present Invention

A fifth embodiment of the present invention will be described with reference to FIGS. 21 to 23. The communication apparatus of the fifth embodiment includes an echo reduction unit 511 (hereinafter shortened as the ER 511), instead of the ER 111 of the first embodiment. Each of remaining portions of the communication apparatus of the fifth embodiment is a same as the corresponding one of the communication apparatus of the first embodiment given the same reference numeral, and its explanation is omitted.

Figure 21:
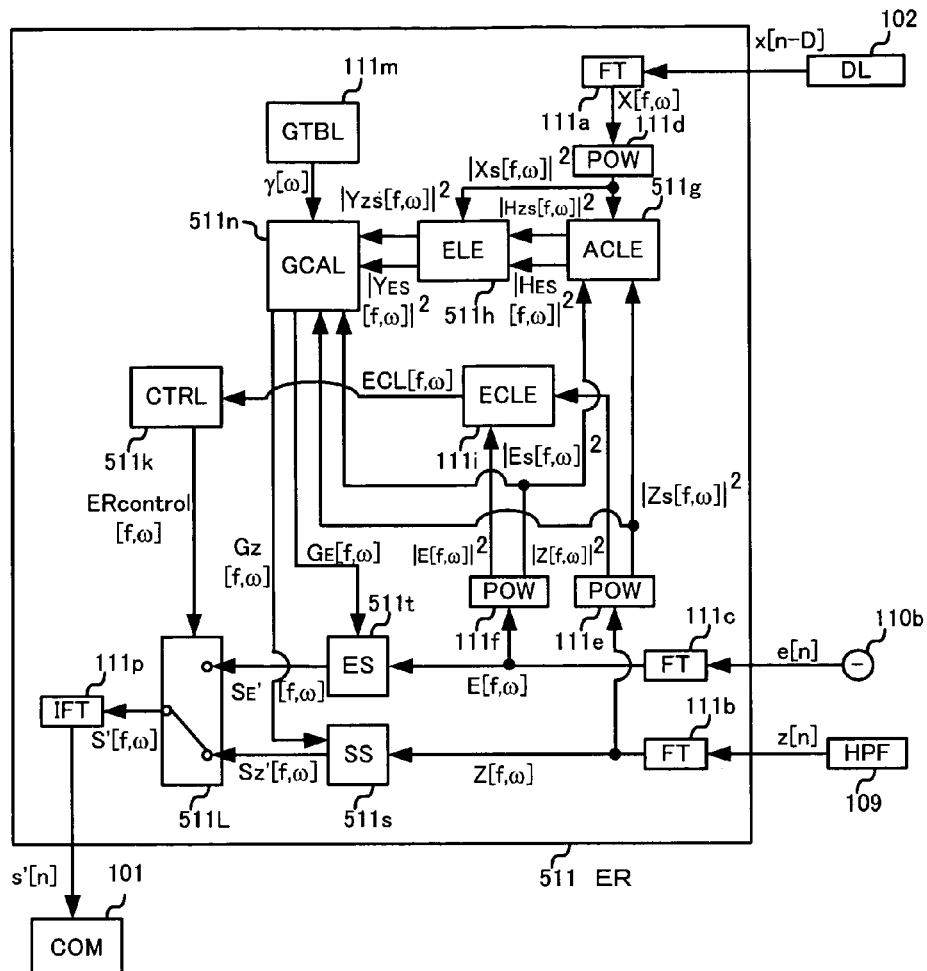
FIG. 21 is a block diagram of an echo reduction unit included in a communication apparatus of a fifth embodiment of the present invention.
Figure 22:
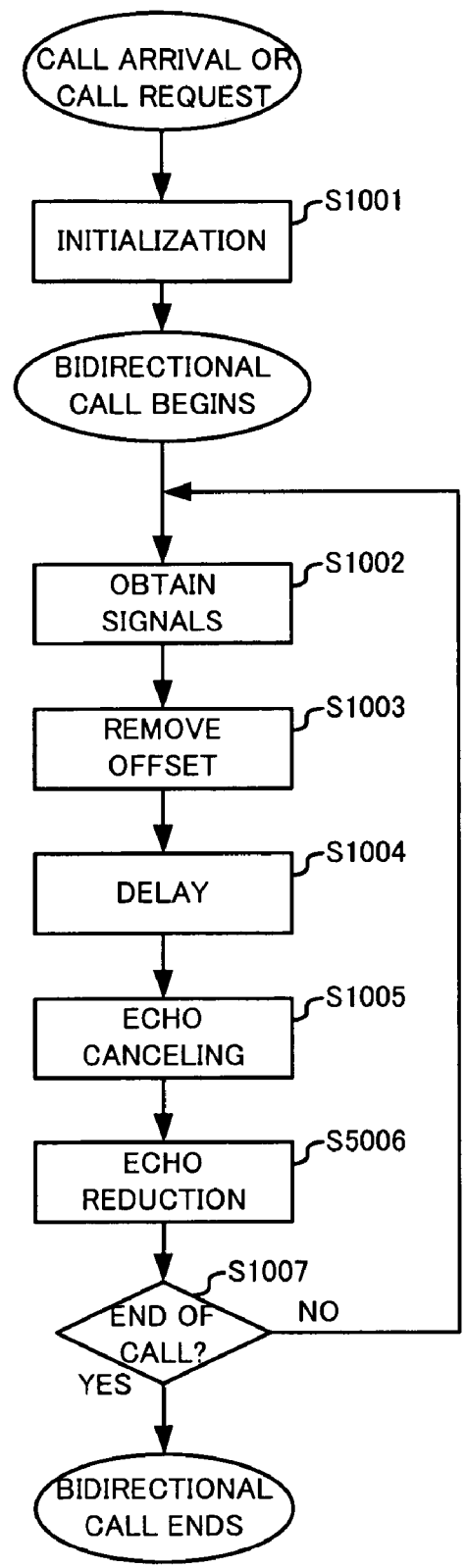
FIG. 22 is a flow chart of operation of the communication apparatus of the fifth embodiment.

FIG. 21 is a block diagram of the ER 511 of the communication apparatus of the fifth embodiment. A portion of the ER 511 being different from the corresponding one of the ER 111 of the first embodiment will be explained as follows. Each of portions of the ER 511 being a same as the corresponding one of the ER 111 of the first embodiment or of the NR 211 of the second embodiment is given the same reference numeral, and its explanation is omitted.

The ER 211 includes the FT 111*a*, the FT 111*b*, the FT 111*c*, the POW111*d*, the POW 111*e*, the POW 111*f*, the ECLE 111*i*, the GTBL 111*m* and the IFT 111*p*. The ER 511 includes a controller 511*k* (hereinafter shortened as the CTRL 511*k*), a spectrum selector 511L (hereinafter shortened as the SEL 511L), an echo reduction gain generator 511*n* (hereinafter shortened as the GCAL 511*n*), a sent signal suppressor 511*s* (hereinafter shortened as the SS 511*s*) and a residual signal suppressor 511*t* (hereinafter shortened as the ES 511*t*).

The ER 511 is provided by the DL 102 with the delayed received input signal x [n-D], provided by the HPF 109 with the sent input signal z [n] and provided by the ST 110*b* with the residual signal e [n]. The ER 511 performs an echo reduction process, i.e., suppresses an echo component of at least one of the sent input signal z [n] and the residual signal e [n] so as to produce an sent output signal s' [n] (n=0, 1, . . . , N−1) on a frame-by-frame basis as a result of the echo reduction.

The ACLE 511*g* is provided by the POW 111*d* with the smoothed received power spectrum |X$_S$ [f, ω]|$^2$, provided by the POW 111*e* with the smoothed sent power-spectrum |Z$_S$ [f, ω]|$^2$ and provided by the POW 111*f* with the smoothed residual power spectrum |E$_S$ [f, ω]|$^2$. The ACLE 511*g* produces an acoustic coupling level |H$_Z$[f, ω]|$^2$ according to Eq. 31-1. The ACLE 511*g* produces an acoustic coupling level |H$_E$ [f, ω]|$^2$ according to Eq. 31-2.

$$|H_Z[f, \omega]|^2 = \frac{|Z_S[f, \omega]|^2}{|X_S[f, \omega]|^2} \quad \text{(Eq. 31-1)}$$

$$|H_E[f, \omega]|^2 = \frac{|E_S[f, \omega]|^2}{|X_S[f, \omega]|^2} \quad \text{(Eq. 31-2)}$$

The ACLE 511*g* produces a smoothed acoustic coupling level |H$_{ZS}$ [f, ω]|$^2$ by using a value thereof one frame ago according to Eq. 32-1, where α$_{HZ}$ [ω] is preferably from 0.03 to 0.09. The ACLE 511*g* produces a smoothed acoustic coupling level $|H_{ES}[f,\omega]|^2$ by using a value thereof one frame ago according to Eq. 32-2, where $\alpha_{HE}[\omega]$ is preferably from 0.03 to 0.09.

$$|H_{ZS}[f,\omega]|^2 = \alpha_{HZ}[\omega] \cdot |H_Z[f,\omega]|^2 + (1-\alpha_{HZ}[\omega]) \cdot |H_{ZS}[f-1,\omega]|^2 \quad \text{(Eq. 32-1)}$$

$$|H_{ES}[f,\omega]|^2 = \alpha_{HE}[\omega] \cdot |H_E[f,\omega]|^2 + (1-\alpha_{HE}[\omega]) \cdot |H_{ES}[f-1,\omega]|^2 \quad \text{(Eq. 32-2)}$$

A relatively large value is given to $\alpha_{HZ}[\omega]$ and to $\alpha_{HE}[\omega]$, e.g. for five seconds after a voice call begins so that the acoustic coupling level $|H_{ZS}[f,\omega]|^2$ and the acoustic coupling level $|H_{ES}[f,\omega]|^2$ may be quickly updated for that while. As the acoustic coupling level is thus initialized, the communication apparatus can prevent its echo cancellation level from decreasing for that while.

If the acoustic coupling level steeply changes, i.e., $|H_Z[f,\omega]|^2 > \beta_{ZH}[\omega] \cdot |H_{ZS}[f-1,\omega]|^2$, or if the received input signal is not very significant, i.e., $|X_S[f,\omega]|^2 < \beta_X[\omega]$, however, the ACLE 511g uses a value of the acoustic coupling level one frame ago, $|H_{ZS}[f-1,\omega]|^2$ or $|H_{ES}[f-1,\omega]|^2$, without updating the acoustic coupling level so as to maintain ability to track variation of an echo path quickly and to avoid producing the acoustic coupling level for a frequency bin where double talk occurs.

As occurrence of double talk may cause a very steep change of the acoustic coupling level, the communication apparatus may avoid producing a sent speech signal of low quality by not updating the acoustic coupling level. In the above inequalities, $\beta_{ZH}[\omega]$ is preferably 0.9 to 30, so is $\beta_{EH}[\omega]$, and $\beta_X[\omega]$ is preferably from 30 to 40 dB.

The ELE 511h is provided by the POW 111d with the smoothed received power spectrum $|X_S[f,\omega]|^2$, and provided by the ACLE 511g with the acoustic coupling level $|H_{ZS}[f,\omega]|^2$ and the acoustic coupling level $|H_{ES}[f,\omega]|^2$. The ELE 511g estimates a sent echo level $|Y_Z[f,\omega]|^2$ included in the frequency spectrum of the sent input signal, $Z[f,\omega]$, for each frequency bin $\omega$ according to Eq. 33-1. The ELE 511g estimates a residual echo level, $|Y_E[f,\omega]|^2$ included in the frequency spectrum of the residual signal, $E[f,\omega]$, for each frequency bin $\omega$ according to Eq. 33-2.

$$|Y_Z[f,\omega]|^2 = |H_{ZS}[f,\omega]|^2 \cdot |X_S[f,\omega]|^2 \quad \text{(Eq. 33-1)}$$

$$|Y_E[f,\omega]|^2 = |H_{ES}[f,\omega]|^2 \cdot |X_S[f,\omega]|^2 \quad \text{(Eq. 33-2)}$$

A signal as a result of echo reduction using an instantaneous echo level like $|Y_Z[f,\omega]|^2$ or $|Y_E[f,\omega]|^2$ is not as natural to hear as a signal as a result of echo reduction using a smoothed value of the echo level. Hence, the ELE 511h produces the smoothed echo level $|Y_{ZS}[f,\omega]|^2$ and the smoothed echo level $|Y_{ES}[f,\omega]|^2$ for each frequency bin $\omega$ according to Eqs. 34-1 and 34-2, respectively, where $\alpha_{ZY}[\omega]$ is preferably from 0.7 to 0.99 and $\alpha_{EY}[\omega]$ is preferably from 0.7 to 0.99.

$$|Y_{ZS}[f,\omega]|^2 = \alpha_{ZY}[\omega] \cdot |Y_Z[f,\omega]|^2 + (1-\alpha_{ZY}[\omega]) \cdot |Y_{ZS}[f-1,\omega]|^2 \quad \text{(Eq. 34-1)}$$

$$|Y_{ES}[f,\omega]|^2 = \alpha_{EY}[\omega] \cdot |Y_E[f,\omega]|^2 + (1-\alpha_{EY}[\omega]) \cdot |Y_{ES}[f-1,\omega]|^2 \quad \text{(Eq. 34-2)}$$

The CTRL 511k is provided by the ECLE 111i with the echo cancellation level ECL $[f,\omega]$. The CTRL 511k produces a control flag ERcontrol $[f,\omega]$ indicating whether the echo cancellation level of the EC 110 is inadequate for each frequency bin $\omega$.

Specifically speaking, the CTRL 511k determines for each frequency bin $\omega$ that the echo cancellation level of the EC 110 is inadequate if both of following inequalities are true, i.e., ECL $[f,\omega] > \beta_Z[\omega]$ and count $> \beta_C$, where $\beta_Z[\omega]$ is preferably from −15 to 8 dB and $\beta_C$ is preferably from 10 to 40 percent as many as all frequency bins. The parameter count represents for how many frequency bins per one frame a following inequality is true, i.e., ECL $[f,\omega] > \beta_Z[\omega]$. In the fifth embodiment, $\beta_Z[\omega]$ is assumed to be 0 dB hereafter.

The GCAL 511n is provided by the POW 111e with the smoothed power spectrum $|Z_S[f,\omega]|^2$, provided by the POW 111f with the residual power spectrum $|E_S[f,\omega]|^2$, provided by the ELE 511h with the smoothed sent echo level $|Y_{ZS}[f,\omega]|^2$ and the smoothed residual echo level $|Y_{ES}[f,\omega]|^2$, and provided by the GTBL 111m with the parameter $\gamma[\omega]$. The GCAL 511n produces a sent echo reduction gain $G_Z[f,\omega]$ and a residual echo reduction gain $G_E[f,\omega]$. Specifically speaking, the GCAL 511n produces the sent echo reduction gain $G_Z[f,\omega]$ using a Wiener filter method according to Eq. 35-1. The GCAL 511n produces the residual echo reduction gain $G_E[f,\omega]$ using the Wiener filter method according to Eq. 35-2.

$$G_Z[f,\omega] = \left(1 - \gamma[\omega] \cdot \frac{|Y_{ZS}[f,\omega]|^2}{|Z_S[f,\omega]|^2}\right) \quad \text{(35-1)}$$

$$G_E[f,\omega] = \left(1 - \gamma[\omega] \cdot \frac{|Y_{ES}[f,\omega]|^2}{|Z_S[f,\omega]|^2}\right) \quad \text{(35-2)}$$

The GCAL 511n controls and keeps each of the sent echo reduction gain $G_Z[f,\omega]$ and the residual echo canceling gain $G_E[f,\omega]$ above a determined lower threshold so as to prevent the communication apparatus from producing a sent speech signal of low quality due to excessive echo reduction and from suppressing background noise intermittently.

The GCAL 511n may evaluate a level of background noise for each frequency bin $\omega$ by using a level of the sent input signal $z[n]$ or the residual signal $e[n]$ in an interval not being active-voice. The GCAL 511n may control and keep the sent echo reduction gain $G_Z[f,\omega]$ and the residual echo reduction gain $G_E[f,\omega]$ above the level of the background noise so as to prevent the communication apparatus from producing a sent speech signal of low quality due to excessive echo reduction.

The GCAL 511n may smooth the sent echo reduction gain $G_Z[f,\omega]$ in the frequency domain according to Eq. 36-1 or Eq. 36-2 so as to prevent the communication apparatus from producing a sent speech signal of low quality. In these equations, $\epsilon_j$ may be [0.1, 0.2, 0.4, 0.2, 0.1] and $\eta_j$ may be [0.1, 0.2, 0.4, 0.8, 0.4, 0.2, 0.1] for instance.

$$G_{ZS}[f,\omega] = \frac{\sum_{j=1}^{5} \epsilon_j \cdot G_Z[f,\omega+j-3]}{\sum_{j=1}^{5} \epsilon_j} \quad \text{(Eq. 36-1)}$$

$$G_{ZS}[f,\omega] = \frac{\sum_{j=1}^{7} \eta_j \cdot G_Z[f,\omega+j-4]}{\sum_{j=1}^{7} \eta_j} \quad \text{(Eq. 36-2)}$$

The GCAL 511n may smooth the residual echo reduction gain $G_E[f,\omega]$ in the frequency domain according to Eq. 36-3 or Eq. 36-4 so as to prevent the communication apparatus from producing a sent speech signal of low quality. In these equations, $\epsilon_j$ may be [0.1, 0.2, 0.4, 0.2, 0.1] and $\eta_j$ may be [0.1, 0.2, 0.4, 0.8, 0.4, 0.2, 0.1] for instance.

$$G_{ES}[f, \omega] = \frac{\sum_{j=1}^{5} \epsilon_j \cdot G_E[f, \omega + j - 3]}{\sum_{j=1}^{5} \epsilon_j} \quad \text{(Eq. 36-3)}$$

$$G_{ES}[f, \omega] = \frac{\sum_{j=1}^{7} \eta_j \cdot G_E[f, \omega + j - 4]}{\sum_{j=1}^{7} \eta_j} \quad \text{(Eq. 36-4)}$$

The SS 511s is provided by the FT 111b with the frequency spectrum Z [f, ω] of the sent input signal and provided by the GCAL 511n with the sent echo reduction gain $G_Z$ [f, ω]. The SS 511s suppresses an echo of the frequency spectrum of the sent input signal, and produces a frequency spectrum $S_Z'$ [f, ω] according to Eq. 37.

$$S_Z'[f,\omega]=G_Z[f,\omega]\cdot Z[f,\omega] \quad \text{(Eq. 37)}$$

The ES 511t is provided by the FT 111c with the frequency spectrum E [f, ω] of the residual signal and provided by the GCAL 511n with the residual echo reduction gain $G_E$ [f, ω]. The ES 511t suppresses an echo of the frequency spectrum of the residual signal, and produces a frequency spectrum $S_E'$ [f, ω] according to Eq. 38.

$$S_E'[f,\omega]=G_E[f,\omega]\cdot E[f,\omega] \quad \text{(Eq. 37)}$$

The SEL 511L is provided by the SS 511s with the frequency spectrum $S_Z'$ [f, ω] of the echo-suppressed sent input signal, provided by the ES 511t with the frequency spectrum $S_E'$ [f, ω] of the echo-suppressed residual signal, and provided by the CTRL 511k with the control flag ERcontrol [f, ω] indicating for each frequency bin whether the echo cancellation level of the EC 110 is inadequate. The SEL 511L selects one of the frequency spectrum $S_Z'$ [f, ω] of the echo-suppressed sent input signal and the frequency spectrum $S_E'$ [f, ω] of the echo-suppressed residual signal.

Specifically speaking, the SEL 511L selects $S_Z'$ [f, ω] for a frequency bin where the control flag ERcontrol [f, ω] indicates that the echo cancellation level of the EC 110 is inadequate. The SEL 511L selects $S_E'$ [f, ω] for a frequency bin other than the above.

The ER 511 can thus operate separately from the EC 110 if the echo cancellation level of the EC 110 is inadequate, i.e., estimation accuracy of the EC 110 is inadequate.

A flow of operation of the communication apparatus of the fifth embodiment will be described with reference to FIGS. 22 and 23. FIG. 22 is a flow chart showing the flow as a whole. Each of steps shown in FIG. 22 being a same as the corresponding one shown in FIG. 5, the flow chart of the first embodiment, is given the same reference numeral and its explanation is omitted.

The communication apparatus of the first embodiment performs echo reduction at the step S1006. The communication apparatus of the fifth embodiment performs echo reduction of another kind by using a signal produced as a result of the echo cancellation at the step S1005 (step S5006). The communication apparatus then determines whether the call reaches an end at the step S1007.

The EC 110 of the fifth embodiment is a same as the EC 110 of the first embodiment. As a matter of course, a flow of operation of the EC 110 of the fifth embodiment is a same as that of the first embodiment, and its explanation is omitted.

Figure 23:
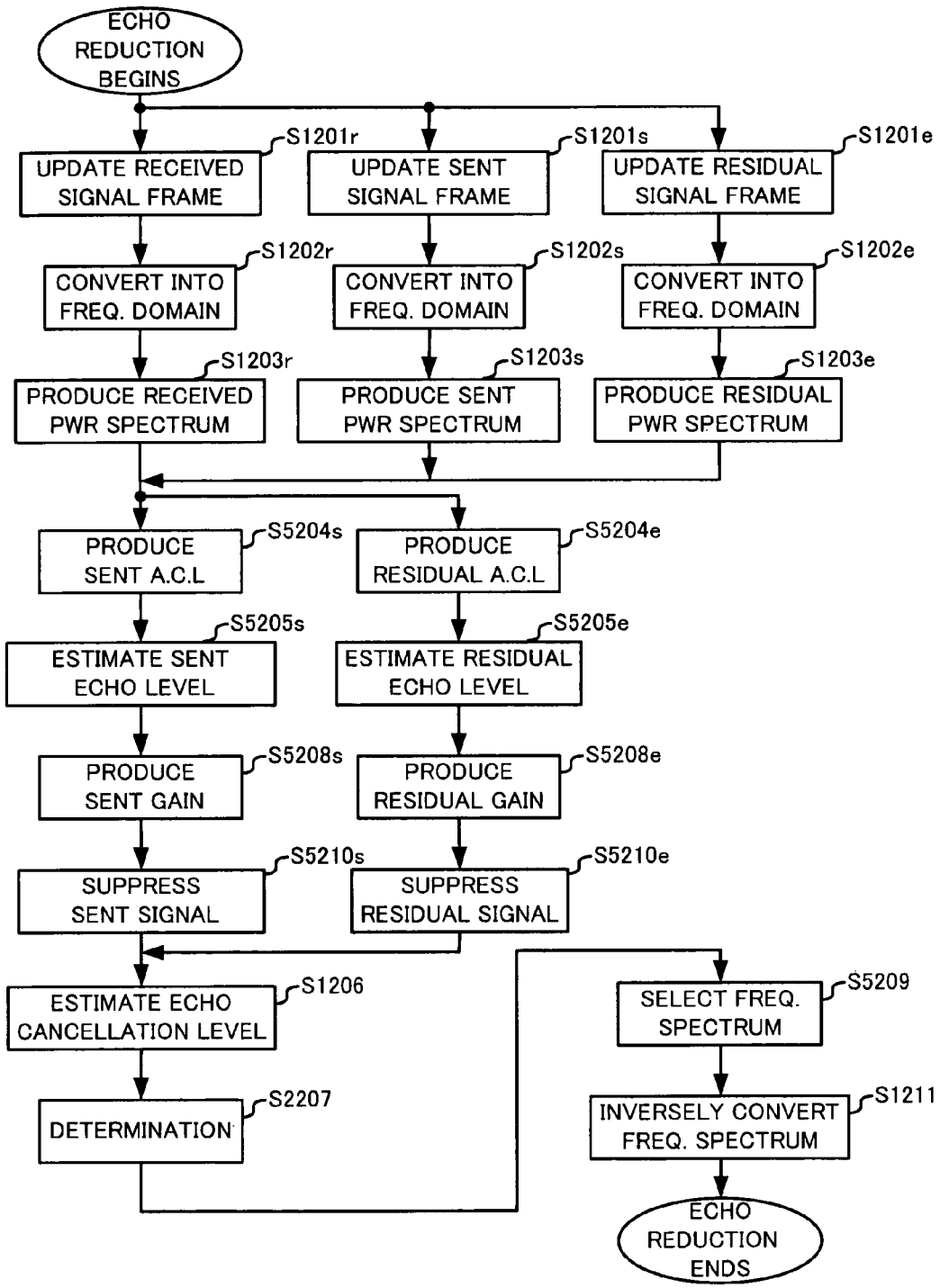
FIG. 23 is a flow chart of operation of the echo reduction unit of the fifth embodiment.

FIG. 23 is a flow chart of the echo reduction process of the ER 511 of the fifth embodiment. Each of steps shown in FIG. 23 being a same as the corresponding one shown in FIG. 7 or FIG. 12, the flow chart of the ER 111 of the first embodiment or of the NR 211 of the second embodiment, respectively, is given the same reference numeral and its explanation is omitted.

The ER 511 starts the echo reduction process and goes through the steps S1201r to S1203r, the steps S1201s to S1203s or the steps S1201e to S1203e. After one of the steps S1203r, S1203s and S1203e, the ACLE 511g produces the acoustic coupling level $|H_{ZS}$ [f, ω]$|^2$ from the smoothed received power spectrum $|X_S$ [f, ω]$|^2$ and the smoothed sent power spectrum $|Z_S$ [f, ω]$|^2$ (step S5204s). The ACLE 511g similarly produces the acoustic coupling level $|H_{ES}$ [f, ω]$|^2$ from the smoothed received power spectrum $|X_S$ [f, ω]$|^2$ and the smoothed sent power spectrum $|Z_S$ [f, ω]$|^2$ (step S5204e).

The ELE 511h estimates the sent echo level $|Y_{ZS}$ [f, ω]$|^2$ from the acoustic coupling level $|H_{ZS}$ [f, ω]$|^2$ and the smoothed received power spectrum $|X_S$[f, ω]$|^2$ (step S5205s). The ELE 511h similarly estimates the residual echo level $|Y_{ES}$ [f, ω]$|^2$ from the acoustic coupling level $|H_{ES}$ [f, ω]$|^2$ and the smoothed received power spectrum $|X_S$ [f, ω]$|^2$ (step S5205e).

The GCAL 511n is provided by the ELE 511h with the sent echo level $|Y_{ZS}$ [f, ω]$|^2$ and provided by the POW 111e with the smoothed sent power spectrum $|Z_S$ [f, ω]$|^2$. The GCAL 511n produces the sent echo reduction gain $G_Z$ [f, ω], and controls and keeps $G_Z$[f, ω] above a determined lower threshold (step S1208s).

The GCAL 511n is provided by the ELE 511h with the residual echo level $|Y_{ES}$ [f, ω]$|^2$ and provided by the POW 111f with the smoothed residual power spectrum $|E_S$ [f, ω]$|^2$. The GCAL 511n produces the residual echo reduction gain $G_E$[f, ω], and controls and keeps $G_E$ [f, ω] above a determined lower threshold (step S1208e).

Being provided then by the FT 111b with the frequency spectrum Z [f, ω] of the sent input signal and provided by the GCAL 511n with the sent echo reduction gain $G_Z$ [f, ω], the SS 511s suppresses the sent input signal, i.e., cancels an echo of the frequency spectrum of the sent input signal (step S5210s).

Being provided, similarly, by the FT 111c with the frequency spectrum E [f, ω] of the residual signal and provided by the GCAL 511n with the residual echo reduction gain GE [f, ω], the SS 511t suppresses the residual signal, i.e., cancels an echo of the frequency spectrum of the residual signal (step S5210e).

After the step S1206 and the step S2207, the SEL 511L is provided by the SS 511s with $S_Z'$ [f, ω], the frequency spectrum of the echo-suppressed sent input signal, provided by the ES 511t with $S_E'$ [f, ω], the frequency spectrum of the echo-suppressed residual signal, and provided by the CTRL 511k with the control flag ERcontrol [f, ω].

The SEL 511L selects the frequency spectrum of the echo-suppressed sent input signal, $S_Z'$ [f, ω], for a frequency bin where the echo cancellation level is inadequate. The SEL 511L selects and outputs the frequency spectrum of the echo-suppressed residual signal, $S_E'$ [f, ω], for a frequency bin other than the above (step S5209). The IFT 111p inversely converts the frequency spectrum selected by the SEL 511L into the time domain (step S1211), and ends the echo reduction process.

In the above description, the ER 511 is of a frequency domain type and operates on a frequency bin-by-frequency bin basis. A method of grouping the frequency bins for the FFT and operating on a group-by-group basis may be implemented. The ER 511 may be implemented as a frequency domain type like a bandwidth division filter like a filter bank.

During variation of echo path loss when double talk occurs, the echo cancellation level of the EC 110 may be inadequate as the residual signal e [n] exceeds the sent input signal z [n] due to the echo cancellation of the EC 110.

In that event, according to the fifth embodiment described above, the ECLE 111i and the CTRL 511k may detect a frequency bin where the echo cancellation level of the EC 110 is inadequate. The SEL 511L and the GCAL 511n can vary weighting put on the EC 110 and put on the ER 511 for each frequency bin so the communication apparatus of the fifth embodiment can be robust against variation of echo path loss and can produce the sent output signal of high quality.

The ER 511 can avoid excessive echo reduction and can avoid producing a sent speech signal of low quality, as the ACLE 511g and the ELE 511h estimates the echo level included in the sent input signal z [n] and the echo level included in the residual signal e [n] separately, as the GCAL 511n produces the sent echo reduction gain $G_Z$ [f, ω] and the residual echo reduction gain $G_E$ [f, ω] separately, and as the SS 511s and the ES 511t performs echo reduction separately.

6 Sixth Embodiment of the Present Invention

Figure 24:
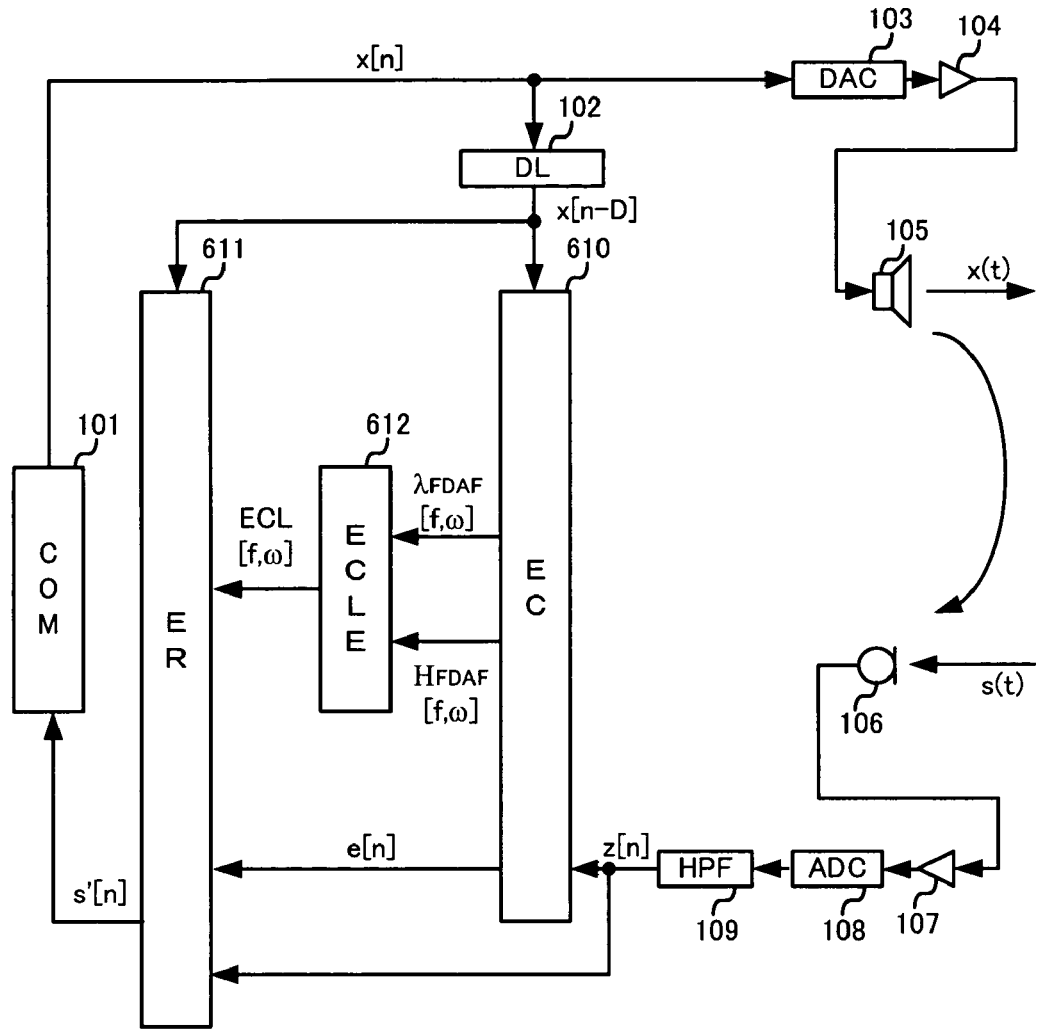
FIG. 24 is a block diagram of a communication apparatus of a sixth embodiment of the present invention.

A sixth embodiment of the present invention will be described with reference to FIGS. 24 to 30. FIG. 24 is a block diagram, of a communication apparatus of the sixth embodiment of the present invention. The communication apparatus of the sixth embodiment includes an echo canceller 610 (hereinafter shortened as the EC 610) and an echo reduction unit 611 (hereinafter shortened as the ER 611), instead of the EC 110 and the ER 111 of the first embodiment. Besides, the communication apparatus of the sixth embodiment includes an echo cancellation level estimator 612 (hereinafter shortened as the ECLE 612) outside of the ER 611.

Each of remaining portions of the communication apparatus of the sixth embodiment is a same as the corresponding portion of the communication apparatus of the first embodiment given the same reference numeral, and its explanation is omitted. Each of portions of the ER 611 being a same as the corresponding one of the ER 111 of the first embodiment is given the same reference numeral, and its explanation is omitted.

Figure 25:
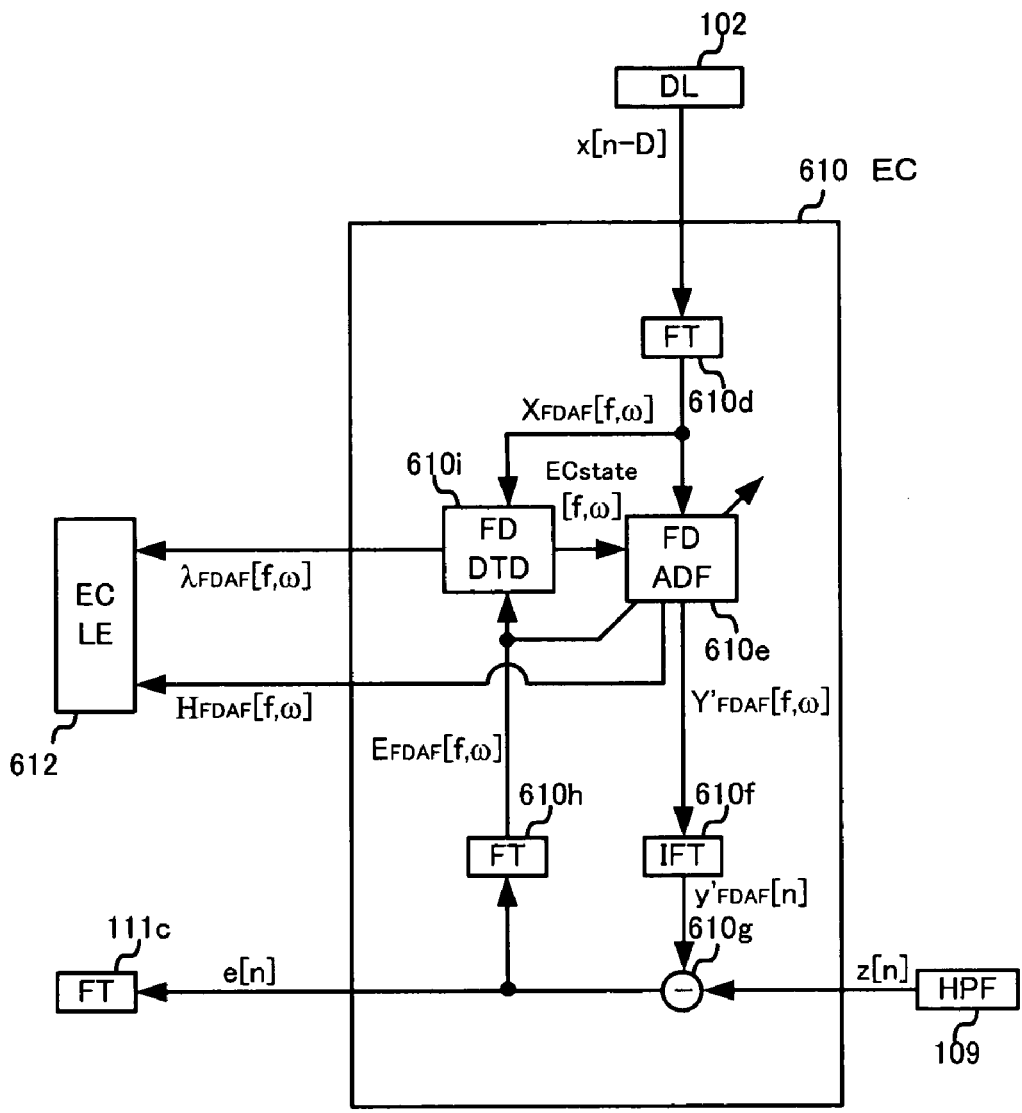
FIG. 25 is a block diagram of an echo canceller included in the communication apparatus of the sixth embodiment.

FIG. 25 is a block diagram of the EC 610 of the communication apparatus of the sixth embodiment. The EC 610 includes a frequency-domain transformer 610d (hereinafter shortened as the FT 610d), a frequency-domain adaptive filter 610e (hereinafter shortened as the FDADF 610e), a frequency-domain inverse-transformer 610f (hereinafter shortened as the IFT 610f), a signal subtractor 610g (hereinafter shortened as the ST 610g), a frequency-domain transformer 610h (hereinafter shortened as the FT 610h) and a frequency-domain double talk detector 610i (hereinafter shortened as the FDDTD 610i).

Figure 26:
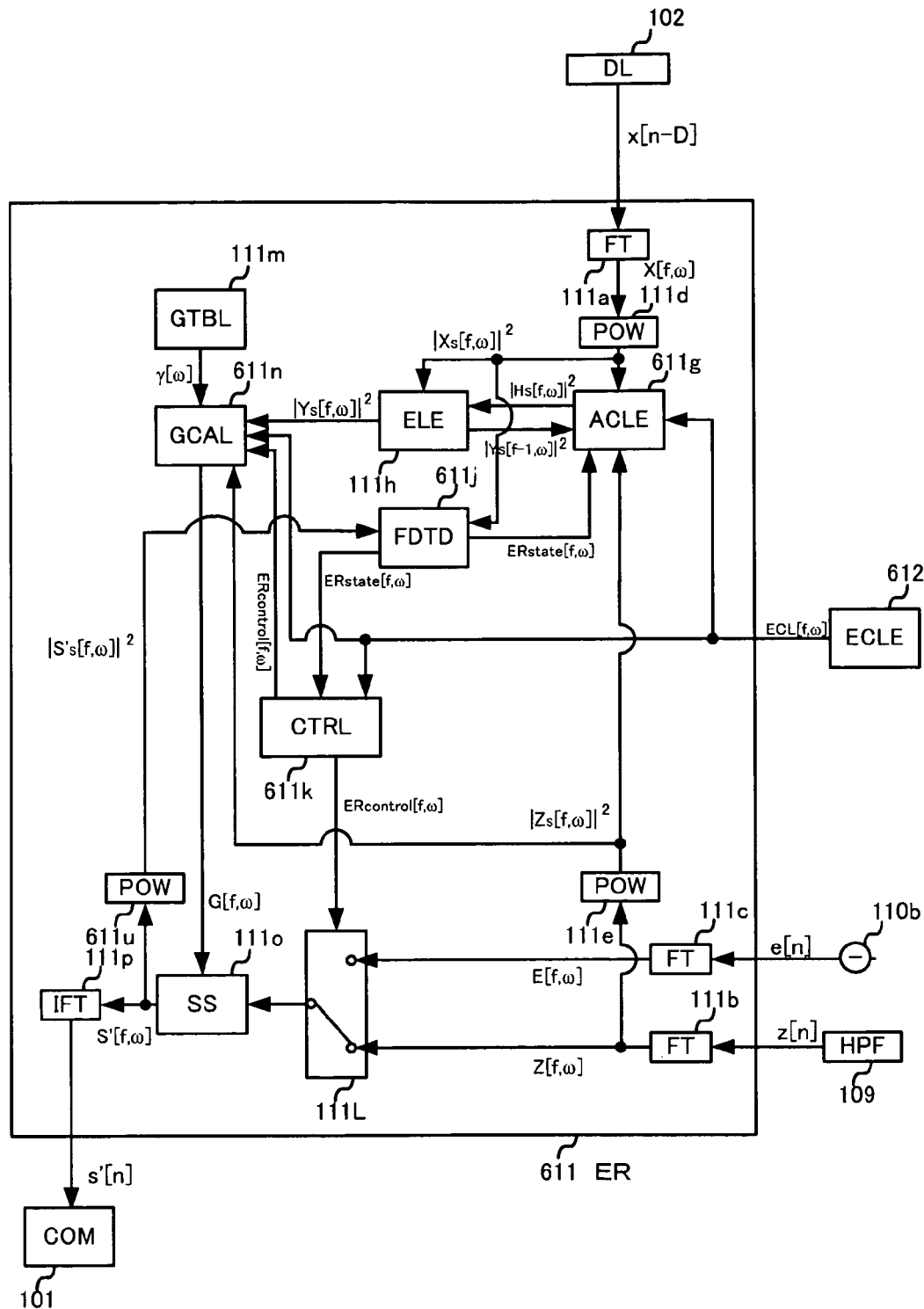
FIG. 26 is a block diagram of an echo reduction unit included in the communication apparatus of the sixth embodiment.

FIG. 26 is a block diagram of the ER 611 of the communication apparatus of the sixth embodiment. The ER 611 includes the FT 111a, the FT 111b, the FT 111c, the POW 111d, the POW 111e, the ELE 111h, the SEL 111L, the GTBL 111m, the SS 111o and the IFT 111p. The ER 611 includes an acoustic coupling level estimator 611g (hereinafter shortened as the ACLE 611g), a controller 611k (hereinafter shortened as the CTRL 611k), an echo reduction gain generator 611n (hereinafter shortened as the GCAL 611n) and a sent output power evaluation unit 611u (hereinafter shortened as the POW 611u).

Figure 27:
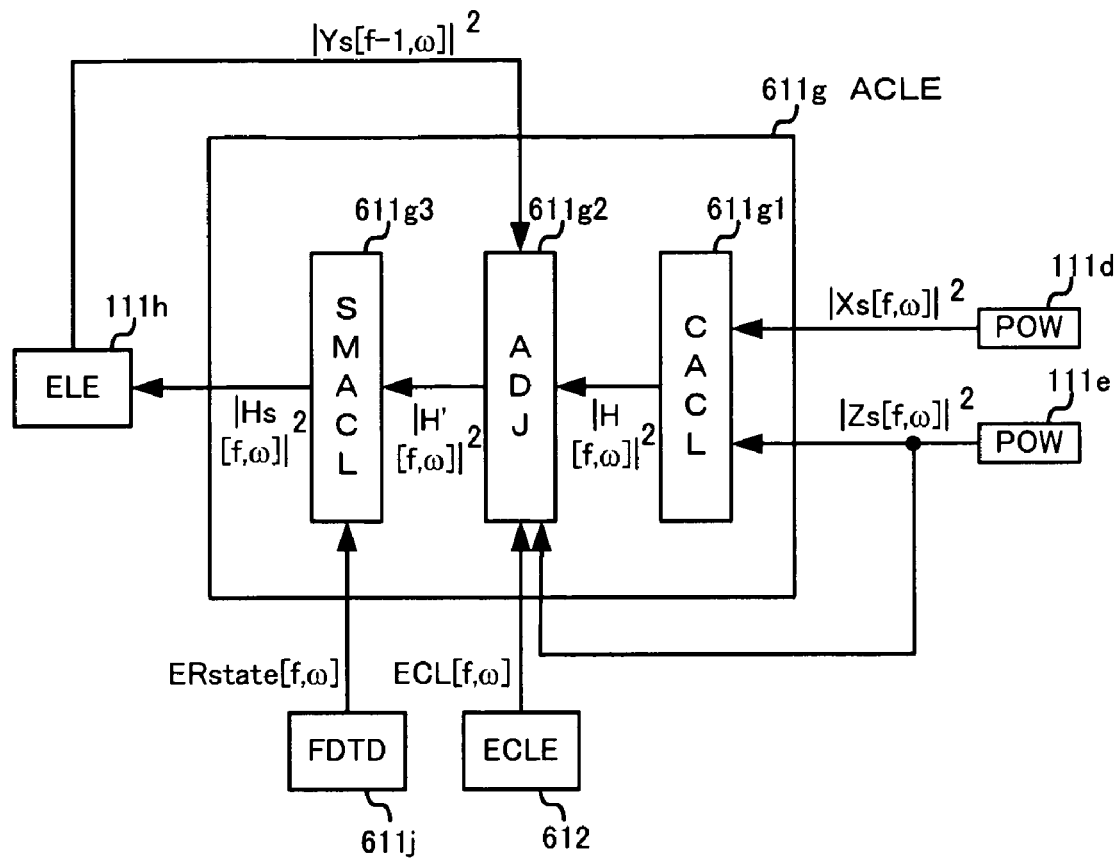
FIG. 27 is a block diagram of an acoustic coupling level estimator included in the echo reduction unit of the sixth embodiment.

FIG. 27 is a block diagram of the ACLE 611g including a minor acoustic coupling level estimator 611g1 (hereinafter shortened as the CACL 611g1), an acoustic coupling level correction unit 611g2 (hereinafter shortened as the ADJ 611g2) and an acoustic coupling level smoother 611g3 (hereinafter shortened as the SMACL 611g3).

Operation of each portion of the communication apparatus of the sixth embodiment as configured above will be described with reference to FIGS. 24 to 27.

The EC 610 is provided by the HPF 109 with the sent input signal z [n] and provided by the DL 102 with the delayed received input signal x [n-D]. The EC 610 cancels an echo component of the sent input signal z [n] according to an overlap-save method or an overlap-add method. The EC 610 thus produces a residual signal e [n] (n=0, 1, ..., N−1), and produces a filter coefficient $H_{FDAF}$ [f, ω] and an estimation of echo path loss $\lambda_{FDAF}$ [f, ω]. Being provided by the DL 102 with the delayed received input signal x [n-D], the FT 610d converts x [n-D] into a frequency domain representation by using a method of fast Fourier transform (FFT), etc., and produces a frequency spectrum of the received input signal, $X_{FDAF}$ [f, ω]. Meanwhile, the FT 610d may use a method of Hamming windowing, a past frame, a method of zero padding or a method of overlapping according to the overlap-save method or the overlap-add method.

The FDADF 610e is a frequency-domain adaptive filter configured by a transversal filter having a variable filter coefficient $H_{FDAF}$ [f, ω]. The FDADF 610e is provided by the FT 610d with the frequency spectrum of the received input signal, $X_{FDAF}$ [f, ω]. The FDADF 610e is provided by the FT 610h with a frequency spectrum of the residual signal one frame ago, $E_{FDAF}$ [f−1, ω]. The FDADF 610e is provided by the FDDTD 610i with a double talk flag ECstate [f, ω].

If the double talk flag ECstate [f, ω] indicates nonexistence of double talk, the FDADF 610e adaptively learns the filter coefficient $H_{FDAF}$ [f, ω] for each frame f and for each frequency bin ω. If the double talk flag ECstate [f, ω] indicates existence of double talk, the FDADF 610e does not adaptively learn. The FDADF 610e thus produces the filter coefficient $H_{FDAF}$ [f, ω].

The FDADF 610e produces a frequency spectrum $Y'_{FDAF}$ [f, ω] of an echo replica signal by using the frequency spectrum $X_{FDAF}$ [f, ω] of the received input signal provided by the FT 610d, and the filter coefficient $H_{FDAF}$ [f, ω], i.e., $Y'_{FDAF}$ [f, ω]=$H_{FDAF}$ [f, ω]·$X_{FDAF}$ [f, ω].

The FDADF 610e controls a speed of learning the filter coefficients $H_{FDAF}$ [f, ω] by using a variable or constant representing a value of step-size $\mu_F$[f, ω].

The FDADF 610e may be based on a linear adaptive algorithm like a least-mean-square (LMS) algorithm, a normalized least-mean-square (NLMS) algorithm, an Affine projection or a recursive-least-squares (RLS) algorithm. The FDADF 610e may be based on a nonlinear adaptive algorithm like a gradient-limited normalized least-mean-square (GL-NLMS) algorithm or an adaptive Volterra filter. Although being a gradient-unconstrained frequency-domain adaptive filter in the sixth embodiment, the FDADF 610e may be replaced by a gradient-constrained frequency-domain adaptive filter.

The IFT 610f is provided by the FDADF 610e with the frequency spectrum of an echo replica signal, $Y'_{FDAF}$ [f, ω]. The IFT 610e produces an echo replica signal $y_{FDAF}'$ [n] (n=0, 1, ..., N−1) by using, e.g., a method of inverse fast Fourier transform (IFFT). The IFT 610e may use a past frame or a method of zero padding or may remove overlapping as necessary according to the overlap-save method or the overlap-add method.

The ST 610g is provided by the HPF 109 with the sent input signal z [n] and provided by the IFT 610f with the echo replica signal $y_{FDAF}'$ [n]. The ST 610g subtracts the echo replica signal $y_{FDAF}'$ [n] from the sent input signal z [n] for each sample n. After canceling an echo component, the ST 610g produces a residual signal e [n].

The FT 610h is provided by the ST 610g with the residual signal e [n] in the time domain. Converting the residual signal e [n] into the frequency domain by using, e.g., a method of fast Fourier transform (FFT), the FT 610h produces a frequency spectrum of the residual signal, $E_{FDAF}$ [f, ω]. The FT 610h may use a method of Hamming windowing, a past frame, a method of zero padding or a method of overlapping as necessary according to the overlap-save method or the overlap-add method.

The FDDTD 610i is provided by the FT 610d with the frequency spectrum $X_{FDAF}$ [f, ω] of the received signal and provided by the FT 610h with the frequency spectrum of the residual signal one frame ago, $E_{FDAF}$ [f–1, ω]. The FDDTD 610i determines whether double talk occurs for each frame f and for each frequency bin ω. The FDDTD 610i produces the double talk flag ECstate [f, ω] indicating whether double talk occurs. The FDDTD 610i produces the estimation of echo path loss $\lambda_{FDAF}$ [f, ω].

Specifically speaking, the FDDTD 610i produces the power spectrum $|X_{FDAF}[f, \omega]|^2$ of the received signal and the power spectrum of the residual signal one frame ago, $|E_{FDAF}[f-1, \omega]|^2$, for each frame f and for each frequency bin ω. The FDDTD 610i determines occurrence of double talk if a following inequality is true, i.e., $|E_{FDAF}[f-1, \omega]|^2 > \lambda_{FDAF}[f, \omega] \cdot |X_{FDAF}[f, \omega]|^2$. The estimation of echo path loss $\lambda_{FDAF}[f, \omega]$ is a variable which decreases if the adaptive learning moves ahead and increases if the adaptive learning is wrong. The estimation of echo path loss $\lambda_{FDAF}$ [f, ω] is updated and produced for each frame f and for each frequency bin ω where the filter coefficient $H_{FDAF}$ [f, ω] is adaptively learned.

In this case, the EC 610 stores the filter coefficients $H_{FDAF}$ [f, ω], the value of step-size $\mu_F$[f, ω], the value of echo path loss estimated $\lambda_{FDAF}$[f, ω], the double talk flag ECstate [f, ω], the power spectrum $|X_{FDAF}[f, \omega]|^2$, and the power spectrum $|E_{FDAF}[f, \omega]|^2$ in memory as an internal condition.

The ECLE 612 is provided by the FDADF 610e with the filter coefficient $H_{FDAF}$ [f, ω] and provided by the FDDTD 610i with the estimation of echo path loss $\lambda_{FDAF}$ [f, ω]. The ECLE 612 estimates the echo cancellation level of the EC 610, ECL [f, ω], for each frequency bin ω. Specifically speaking, if no double talk occurs, the ECLE 612 approximates the power spectrum of the residual signal $|E_{FDAF}[f, \omega]|^2$ as $|E_{FDAF}[f, \omega]|^2 = \lambda_{FDAF}[f, \omega] \cdot |X_{FDAF}[f, \omega]|^2$.

The ECLE 612 produces the ECL [f, ω] as a ratio of $\lambda_{FDAF}$ [f, ω] to a power spectrum of the sent input signal $|Y'_{FDAF}[f, \omega] + E_{FDAF}[f, \omega]|^2$ according to Eq. 39.

$$ECL[f, \omega] = \frac{\lambda_{FDAF}[f, \omega]}{\left(|H_{FDAF}[f, \omega]| + \sqrt{\lambda_{FDAF}[f, \omega]}\right)^2} \quad \text{(Eq. 39)}$$

The ER 611 performs echo reduction, i.e., suppresses an echo component based on the received signal x [n], the sent input signal z [n] and the residual signal e [n]. The ER 611 produces a sent output signal s' [n] as a result of the echo reduction (n=0, 1, . . . , N–1).

The ACLE 611g is provided by the POW 111d with the smoothed received power spectrum $|X_S[f, \omega]|^2$ and provided by the POW 111e with the smoothed sent power spectrum $|Z_S[f, \omega]|^2$. The ACLE 611g is provided by the ECLE 612 with the echo cancellation level ECL [f, ω], provided by the FDTD 611j with a frequency-domain double talk flag ERstate [f, ω] and provided by the ELE 111h with the echo level one frame ago, $|Y_S[f-1, \omega]|^2$. The ACLE 611g produces a smoothed corrected acoustic coupling level, $|H_S[f, \omega]|^2$.

The CACL 611g1 is provided by the POW 111d with the smoothed received power spectrum $|X_S[f, \omega]|^2$ and provided by the POW 111e with the smoothed sent power spectrum $|Z_S[f, \omega]|^2$. The CACL 611g1 produces the acoustic coupling level $|H[f, \omega]|^2$ not by using $|E_S[f, \omega]|^2$ based on the residual signal but by using $|Z_S[f, \omega]|^2$ based on the sent input signal, according to Eq. 40, so as not to be affected by the echo cancellation performance of the EC 610.

$$|H[f, \omega]|^2 = \frac{|Z_S[f, \omega]|^2}{|X_S[f, \omega]|^2} \quad \text{(Eq. 40)}$$

The ADJ 611g2 is provided by the CACL 611g1 with the acoustic coupling level $|H[f, \omega]|^2$ and provided by the ECLE 612 with the echo cancellation level ECL [f, ω]. The ADJ 611g2 is provided by the POW 111e with the smoothed sent power spectrum $|Z_S[f, \omega]|^2$ and provided by the ELE 111h with the echo level one frame ago, $|Y_S[f-1, \omega]|^2$. The ADJ 611g2 produces a corrected acoustic coupling level $|H'[f, \omega]|^2$ by correcting the acoustic coupling level $H[f, \omega]|^2$.

Specifically speaking, the ADJ 611g2 determines for each frequency bin ω at first that the echo cancellation level of the EC 610 is inadequate if both of following inequalities are true, i.e., ECL [f, ω]>$\beta_{ACL}$[ω] and count>$\beta_{CACL}$, where $\beta_{ACL}$[ω] is preferably from –35 to 8 dB and $\beta_{CACL}$ is preferably from 10 to 40 percent as many as all frequency bins. The parameter count represents for how many frequency bins per one frame a following inequality is true, i.e., ECL [f, ω]>$\beta_{ACL}$[ω]. In the sixth embodiment, $\beta_{ACL}$[ω] is assumed to be 0 dB hereafter.

For a frequency bin where the ADJ 611g2 determines that the echo cancellation level is adequate, the ADJ 611g2 corrects the acoustic coupling level $|H[f, \omega]|^2$ according to Eq. 41 and produces the corrected acoustic coupling level $|H'[f, \omega]|^2$, only if the echo level one frame ago, $|Y_S[f-1, \omega]|^2$, is greater than the sent power spectrum $|Z_S[f, \omega]|^2$.

$$|H'[f, \omega]|^2 = |H[f, \omega]|^2 \cdot \frac{|Y_S[f-1, \omega]|^2}{|Z_S[f, \omega]|^2} \quad \text{(Eq. 41)}$$

Unless the above conditions are satisfied, the ADJ 611g2 sets $|H'[f, \omega]|^2$ equal to $|H[f, \omega]|^2$ without correction, i.e., $|H'[f, \omega]|^2 = |H[f, \omega]|^2$. Neither does the ADJ 611g2 for a frequency bin for which the ADJ 611g2 determines that the echo cancellation level of the EC 610 is inadequate.

The SMACL 611g3 is provided by the ADJ 611g2 with the corrected acoustic coupling level $|H'[f, \omega]|^2$ and provided by the FDTD 611j with the frequency-domain double talk flag ERstate [f, ω]. The SMACL 611g3 produces the corrected acoustic coupling level $|H_S[f, \omega]|^2$ smoothed by using a value thereof one frame ago according to Eq. 42, where $\alpha_H$ [ω] is preferably from 0.03 to 0.09.

$$|H_S[f,\omega]|^2 = \alpha_H[\omega] \cdot |H'[f,\omega]|^2 + (1-\alpha_H[\omega]) \cdot |H_S[f-1,\omega]|^2 \quad \text{(Eq. 42)}$$

The SMACL 611g3 gives $\alpha_H$[ω] a relatively large value, e.g. for five seconds after a voice call begins so that the acoustic coupling level $|H_S[f, \omega]|^2$ may be quickly updated for that while. As the acoustic coupling level is thus initialized, the communication apparatus may prevent its echo cancellation level from decreasing for that while.

If the frequency-domain double talk flag ERstate [f, ω] provided by the FDTD 611j indicates occurrence of double talk, however, the SMACL 611g3 uses a value of the acoustic coupling level one frame ago, $|H_S[f-1, ω]|^2$, without updating the acoustic coupling level so as to maintain ability to track variation of an echo path quickly and to avoid producing the acoustic coupling level for a frequency bin where the double talk occurs.

So does the SMACL 611g3 if the acoustic coupling level steeply changes, i.e., $|H_S[f, ω]|^2 > β_{H[ω]} \cdot |H_S[f-1, ω]|^2$, or if amplitude of the received input signal is not great enough, i.e., $|X_S[f, ω]|^2 < β_X[ω]$.

As occurrence of double talk may cause a very steep change of the acoustic coupling level, the communication apparatus can avoid producing a sent speech signal of low quality by not updating the acoustic coupling level. In the above inequalities, $β_H[ω]$ is preferably from 0.9 to 30, and $β_X[ω]$ is preferably from 30 to 40 dB.

The FDTD 611j is provided by the POW 111d with the smoothed received power spectrum $|X_S[f, ω]|^2$ and provided by the POW 611u with a smoothed sent output power spectrum one frame ago, $|S'_S[f-1, ω]|^2$. The FDTD 611j produces the frequency-domain double talk flag ERstate [f, ω] indicating whether double talk occurs. Specifically, the FDTD 611j determines occurrence of double-talk if a following inequality is true, i.e., $|S'_S[f-1, ω]|^2 > λ_{ER}[f, ω] \cdot |X_S[f, ω]|^2$.

In the above inequality, $λ_{ER}[f, ω]$ is an estimation of the echo path loss, and is updated for each frame f and for each frequency bin ω where the acoustic coupling level $|H_S[f, ω]|^2$ is updated. The estimation of the echo path loss, $λ_{ER}[f, ω]$, is a variable which decreases as the acoustic coupling level $|H_S[f, ω]|^2$ is steadily updated but otherwise increases.

The CTRL 611k is provided by the ECLE 612 with the echo cancellation level ECL [f, ω] and is provided by the FDTD 611j with the frequency-domain double talk flag ERstate [f, ω]. The CTRL 611k determines occurrence of double talk and determines that the echo cancellation level of the EC 610 is inadequate for each frequency bin ω. The CTRL 611k produces a control flag ERcontrol [f, ω] indicating whether double talk occurs and whether the echo cancellation level is inadequate for each frequency bin ω.

The CTRL 611k determines whether double talk occurs according to the FDTD 611j that determines whether double talk occurs for each frequency bin ω.

The CTRL 611k determines for each frequency bin ω that the echo cancellation level of the EC 610 is inadequate if both of following inequalities are true, i.e., ECL [f, ω] > $β_Z[ω]$ and count > $β_C$, where $β_Z[ω]$ is preferably from −15 to 8 dB and $β_Z$ is preferably from 10 to 40 percent as many as all frequency bins. The parameter count represents for how many frequency bins per one frame a following inequality is true, i.e., ECL [f, ω] > $β_Z[ω]$. In the sixth embodiment, $β_Z[ω]$ is assumed to be 2.5 (8 dB) hereafter.

The GCAL 611n is provided by the POW 111e with the smoothed sent power spectrum $|Z_S[f, ω]|^2$, provided by the ELE 111h with the smoothed echo level $|Y_S[f, ω]|^2$ and provided by the ECLE 612 with the echo cancellation level ECL [f, ω]. The GCAL 611n is provided by the CTRL 611k with the control flag ERcontrol [f, ω] and provided by the GTBL 111m with the parameter γ [ω]. The GCAL 611n produces a smoothed echo reduction gain $G_S[f, ω]$.

Specifically speaking, for a frequency bin for which the CTRL 611k determines occurrence of double talk and determines that the echo cancellation level of the EC 610 is inad equate, the GCAL 611n produces the echo reduction gain G [f, ω] by using a Wiener filter method according to Eq. 43.

$$G[f, ω] = \left(1 - γ[ω] \cdot \frac{|Y_S[f, ω]|^2}{|Z_S[f, ω]|^2}\right) \quad \text{(Eq. 43)}$$

For a frequency bin other than the above, it is assumed that the echo cancellation level of the EC 610 is adequate and that the EC 610 works properly. The GCAL 611n then corrects the echo reduction gain G [f, ω] by using a function F (ECL [f, ω]) according to Eq. 44 so that the echo reduction level of the ER 611 increases. The function F (ECL [f, ω]) includes the echo cancellation level of the EC 610 as a variable, and satisfies a following inequality, i.e., 0 ≦ F (ECL [f, ω]) ≦ 1.

$$G[f, ω] = \left(1 - γ[ω] \cdot \frac{|Y_S[f, ω]|^2}{|Z_S[f, ω]|^2}\right) \cdot F(ECL[f, ω]) \quad (44)$$

The function F (ECL [f, ω]) is defined by Eq. 45-1 if the variable ECL [f, ω] satisfies a following inequality, i.e., 0 ≦ ECL [f, ω] ≦ 1.

$$F(ECL[f, ω]) = ECL[f, ω] \quad \text{(Eq. 45-1)}$$

The function F (ECL [f, ω]) is defined by Eq. 45-2 if the variable ECL [f, ω] satisfies a following inequality, 1 ≦ ECL [f, ω] ≦ $β_Z[ω]$.

$$F(ECL[f, ω]) = 1 \quad \text{(Eq. 45-2)}$$

The function F (ECL [f, ω]) is defined by Eq. 45-3 or Eq. 45-4 if the variable ECL [f, ω] satisfies a following inequality, i.e., $β_Z[ω]$ ≦ ECL [f, ω].

$$F(ECL[f, ω]) = \frac{δ_C}{\text{Count}} \quad \text{(Eq. 45-3)}$$

$$F(ECL[f, ω]) = \frac{δ_C}{ECL[f, ω]} \quad \text{(Eq. 45-4)}$$

It can be avoided that the corrected echo reduction gain takes a nonnatural value by setting the function F (ECL [f, ω]), a gain correcting the echo reduction gain, satisfying the inequality 0 ≦ ECL [f, ω] ≦ 1. Hence it may be avoided that the communication apparatus produces a sent speech signal of low quality.

In a case where the echo cancellation level of the EC 610 is inadequate ($β_Z[ω]$ ≦ ECL [f, ω]), the echo reduction gain may be corrected by setting the function F (ECL [f, ω]) nonlinear as described here so that the echo cancellation level increases.

The GCAL 611n controls and keeps the echo reduction gain G [f, ω] above a determined lower threshold so as to prevent the sent speech from deteriorating inequality due to excessive echo reduction and so as to avoid suppressing background noise intermittently.

The GCAL 611n may evaluate a level of background noise for each frequency bin ω by using a level of the sent input signal z [n] or the residual signal e [n] in an interval not being active-voice. The GCAL 611n may control and keep the echo reduction gain G [f, ω] above the level of the background noise so as to communication apparatus from producing a sent speech signal of low quality due to excessive echo reduction.

The GCAL 611n may smooth the echo reduction gain G [f, ω] in the frequency domain according to Eq. 46-1 or Eq. 46-2 so as to prevent the communication apparatus from producing a sent speech signal of low quality. In these equations, $\epsilon_j$ may be [0.1, 0.2, 0.4, 0.2, 0.1], and $\eta_j$ may be [0.1, 0.2, 0.4, 0.8, 0.4, 0.2, 0.1] for instance.

$$G_S[f, \omega] = \frac{\sum_{j=1}^{5} \varepsilon_j \cdot G[f, \omega + j - 3]}{\sum_{j=1}^{5} \varepsilon_j} \quad \text{(Eq. 46-1)}$$

$$G_S[f, \omega] = \frac{\sum_{j=1}^{7} \eta_j \cdot G[f, \omega + j - 4]}{\sum_{j=1}^{7} \eta_j} \quad \text{(Eq. 46-2)}$$

The POW 611$u$ is provided by the SS 111$o$ with the frequency spectrum S' [f, $\omega$] and produces a sent output power spectrum |S' [f, $\omega$]|$^2$. The POW 611$u$ produces a sent output power spectrum |S'$_S$ [f, $\omega$]|$^2$ smoothed by using a value thereof one frame ago, |S'$_S$ [f-1, ]|$^2$, according to Eq. 47, where $\alpha_S$ [$\omega$] is preferably from 0.75 to 0.999.

$$|S'_S[f,\omega]|^2 = \alpha_S[\omega] \cdot |S'[f,\omega]|^2 + (1-\alpha_S[\omega]) \cdot |S'_S[f-1,\omega]|^2 \quad \text{(Eq. 47)}$$

Figure 28:
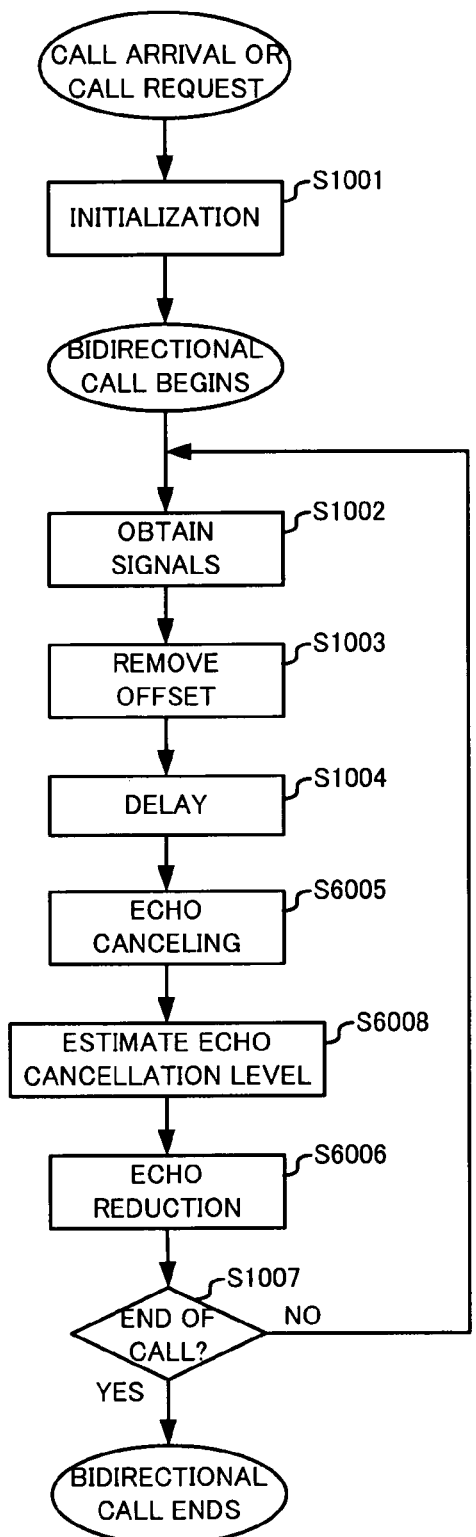
FIG. 28 is a flow chart of operation of the communication apparatus of the sixth embodiment.

A flow of operation of the communication apparatus of the sixth embodiment will be described with reference to FIGS. 28 to 30. FIG. 28 is a flow chart showing the flow as a whole. Each of steps shown in FIG. 28 being a same as the corresponding one shown in FIG. 5, the flow chart of the first embodiment, is given the same reference numeral and its explanation is omitted.

The received input signal x [n] is delayed at the step S1004. Being provided then with the delayed received input signal x [n-D] and the offset-removed sent input signal z [n], the EC 610 performs echo cancellation (step S6005).

Being provided by the FDADF 610$e$ with the filter coefficient H$_{FDAF}$ [f, $\omega$] and provided by FDDTD 610$i$ with the estimation of echo path loss $\lambda_{FDAF}$ [f, $\omega$], the ECLE 612 estimates the echo cancellation level ECL [f, $\omega$] of the EC 610 (step S6008).

Being provided with the delayed received input signal x[n-D] and the offset-removed sent input signal z [n], and provided by the EC 610 with the residual signal e [n] as a result of the echo cancellation, the ER 611 performs echo reduction, i.e., nonlinear echo cancellation (step S6006). The communication apparatus then determines whether the call reaches an end at the step S1007.

Figure 29:
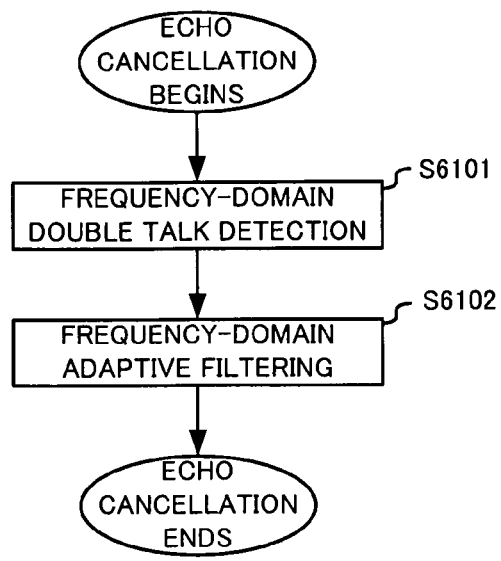
FIG. 29 is a flow chart of operation of the echo canceller of the sixth embodiment.

FIG. 29 is a flow chart of the echo-cancellation process of the EC 610 of the sixth embodiment.

The flow of echo cancellation process of the EC 610 shown in FIG. 29 will be described as follows. At first, the EC 610 converts the received input signal into the frequency domain and produces the frequency spectrum of the received input signal, X$_{FDAF}$ [f, $\omega$]. The FDDTD 610$i$ then detects occurrence of double talk in the frequency domain by using the frequency spectrum of the received signal, X$_{FDAF}$ [f, $\omega$], and the frequency spectrum of the residual signal one frame ago, E$_{FDAF}$ [f-1, $\omega$] (step S6101).

The FDADF 610$e$ performs an adaptive filtering process in the frequency domain according to the double talk flag ECstate [f, $\omega$] by using the frequency spectrum of the received signal, X$_{FDAF}$ [f, $\omega$], and the frequency spectrum of the residual signal one frame ago, E$_{FDAF}$ [f-1, $\omega$] (step S6102).

The IFT 610$f$ inversely converts the frequency spectrum of the echo replica signal, Y'$_{FDAF}$ [f, $\omega$], into the time domain and produces the echo replica signal, y'$_{FDAF}$ [n]. The ST 610$g$ subtracts the echo replica signal, y'$_{FDAF}$ [n], from the sent input signal z [n] and produces the residual signal e [n]. The EC 610 then ends the echo cancellation process.

Figure 30:
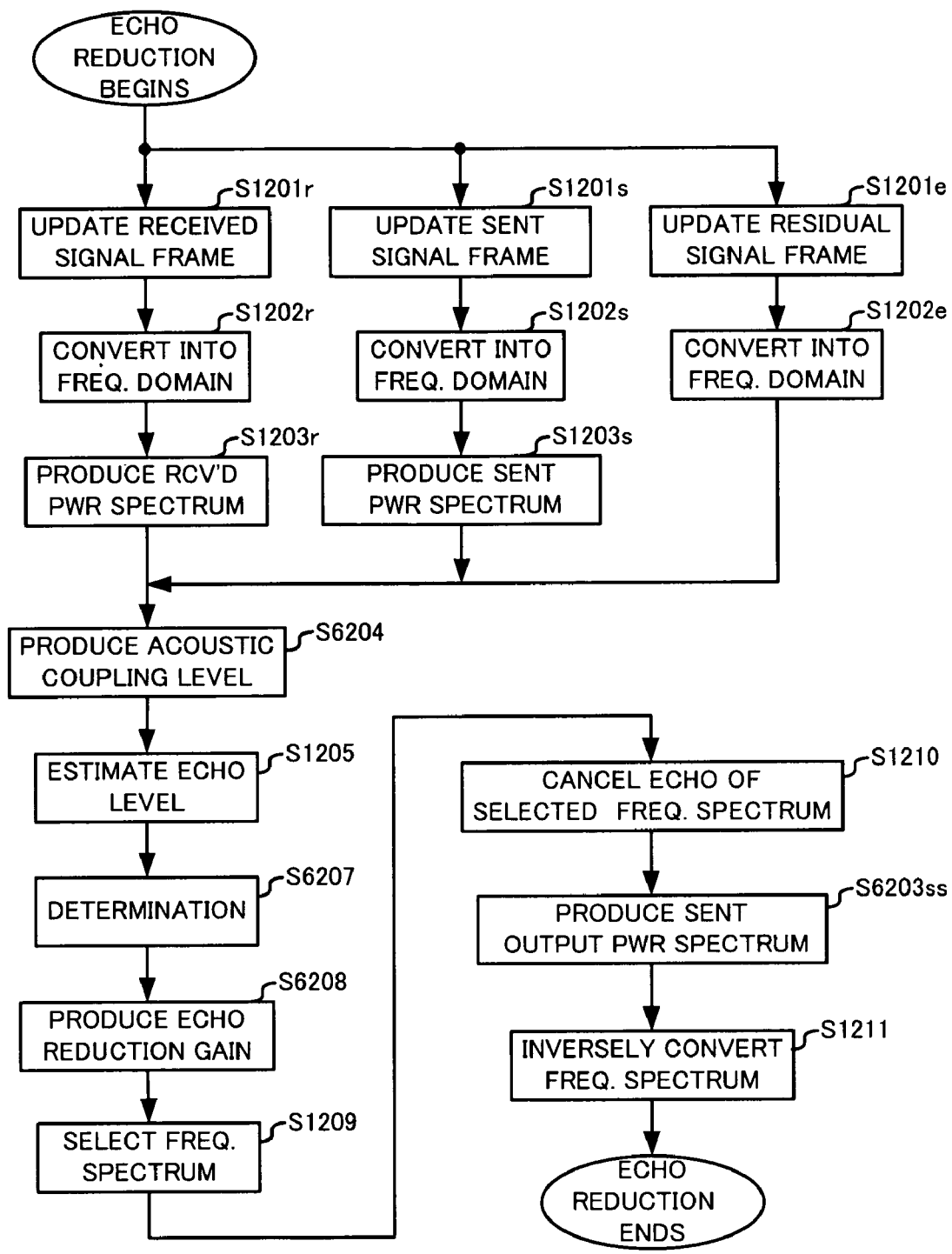
FIG. 30 is a flow chart of operation of the echo reduction unit of the sixth embodiment.

FIG. 30 is a flow chart of the echo reduction process of the ER 611 of the sixth embodiment. Each of steps shown in FIG. 30 being a same as the corresponding one shown in FIG. 7, the flow chart of processing of the ER 111 of the first embodiment, is given the same reference numeral and its explanation is omitted.

FIG. 30 does not include a step corresponding to the step 1203$e$ shown in FIG. 7, producing the frequency spectrum of the residual signal, E [f, $\omega$].

The ER 611 of the sixth embodiment starts the echo reduction process and goes through the steps S 1201$r$ to S1203$r$, the steps S1201$s$ to S1203$s$ or the steps S1201$e$ to S1202$e$. After one of the steps S1203$r$, S1203$s$ or S1202$e$, the FDTD 611$j$ produces the frequency-domain double talk flag ERstate [f, $\omega$] indicating whether double talk occurs. The ACLE 611$g$ produces the acoustic coupling level |H$_S$ [f, $\omega$]|$^2$ that is corrected and smoothed based on the smoothed received power spectrum |X$_S$ [f, $\omega$]|$^2$, the smoothed sent power spectrum |Z$_S$ [f, $\omega$]|$^2$, the echo cancellation level ECL [f, $\omega$] provided by the ECLE 612 and the frequency-domain double talk flag ERstate [f, $\omega$] (step S6204).

The ELE 111$h$ estimates the echo level included in the sent input signal at the step S1205. Being provided then with the echo cancellation level ECL [f, $\omega$] and the frequency-domain double talk flag ERstate [f, $\omega$], the CTRL 611$k$ determines for each frequency bin $\omega$ whether double talk occurs and whether the echo cancellation level of the EC 610 is inadequate, and produces the control flag ERcontrol [f, $\omega$] (step S6207).

Being provided with the smoothed sent power spectrum |Z$_S$ [f, $\omega$]|$^2$, the echo level |Y$_S$ [f, $\omega$]|$^2$, the echo cancellation level ECL [f, $\omega$], the control flag ERcontrol [f, $\omega$] and the parameter $\gamma$ [$\omega$], the GCAL 611$n$ produces the echo reduction gain G [f, $\omega$] (step S6208).

After the steps S1209 and S1210, the POW 611$u$ produces the sent output power spectrum (step S6203$ss$). The IFT 111$p$ then inversely converts the frequency spectrum S' [f, $\omega$] provided by the SS 111$o$ into the time domain (step S1211) and ends the echo reduction.

Although being implemented as a frequency-domain type adaptive filter based on the overlap-save method or the overlap-add method as described above, the EC 610 may be implemented as a frequency-domain type adaptive filter based on a circular-convolution method.

In the above description, the ER 611 is of a frequency domain type performing FFT and operates on a frequency bin-by-frequency bin basis. A method of grouping the frequency bins by FFT and operating on a group-by-group basis may be implemented. The ER 611 may be implemented as a frequency domain type like a bandwidth division filter like a filter bank.

According to the sixth embodiment described above, the ECLE 612 and the CTRL 611$k$ may detect a frequency bin where the echo cancellation level of the EC 610 is inadequate. The SEL 111L and the GCAL 611$n$ can vary weighting put on the EC 610 and on the ER 611 for each frequency bin so that the communication apparatus of the sixth embodiment can be robust against variation of echo path loss and can produce the sent output signal of high quality.

6A Variation of the Sixth Embodiment

A variation of the sixth embodiment will be described as follows. A communication apparatus of the variation of the sixth embodiment includes an echo reduction unit 6112 (hereinafter shortened as the ER 6112) instead of the ER 611 of the sixth embodiment.

Figure 31:
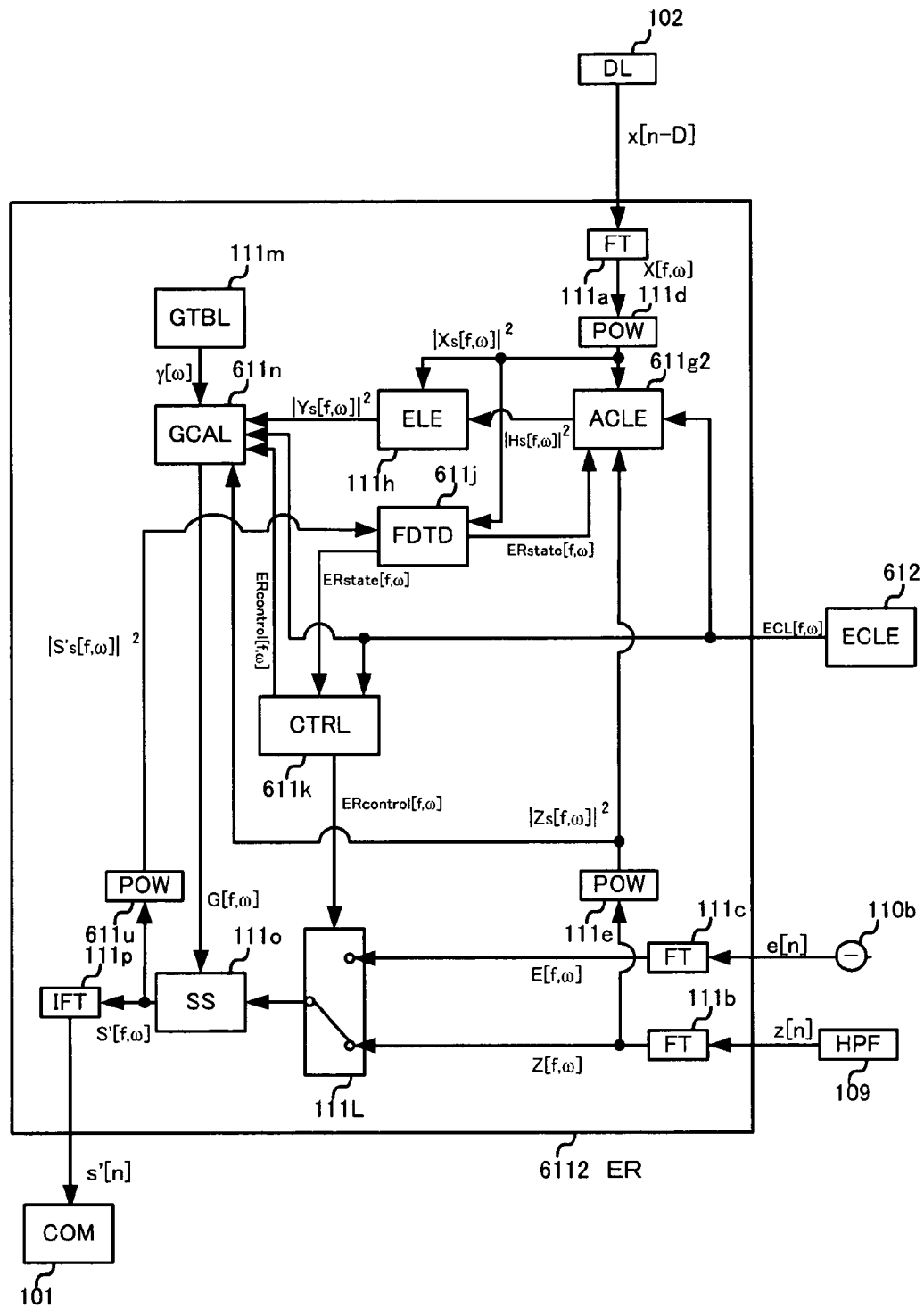
FIG. 31 is a block diagram of an echo reduction unit included in a communication apparatus of a variation of the sixth embodiment.

FIG. 31 is a block diagram of the ER 6112. The ER 6112 includes an acoustic coupling level estimator 611g2 (hereinafter shortened as the ACLE 611g2) instead of the ACLE 611g of the ER 611. Each of remaining portions of the ER 6112 is a same as the corresponding one of the ER 611 given the same reference numeral, and its explanation is omitted.

Figure 32:
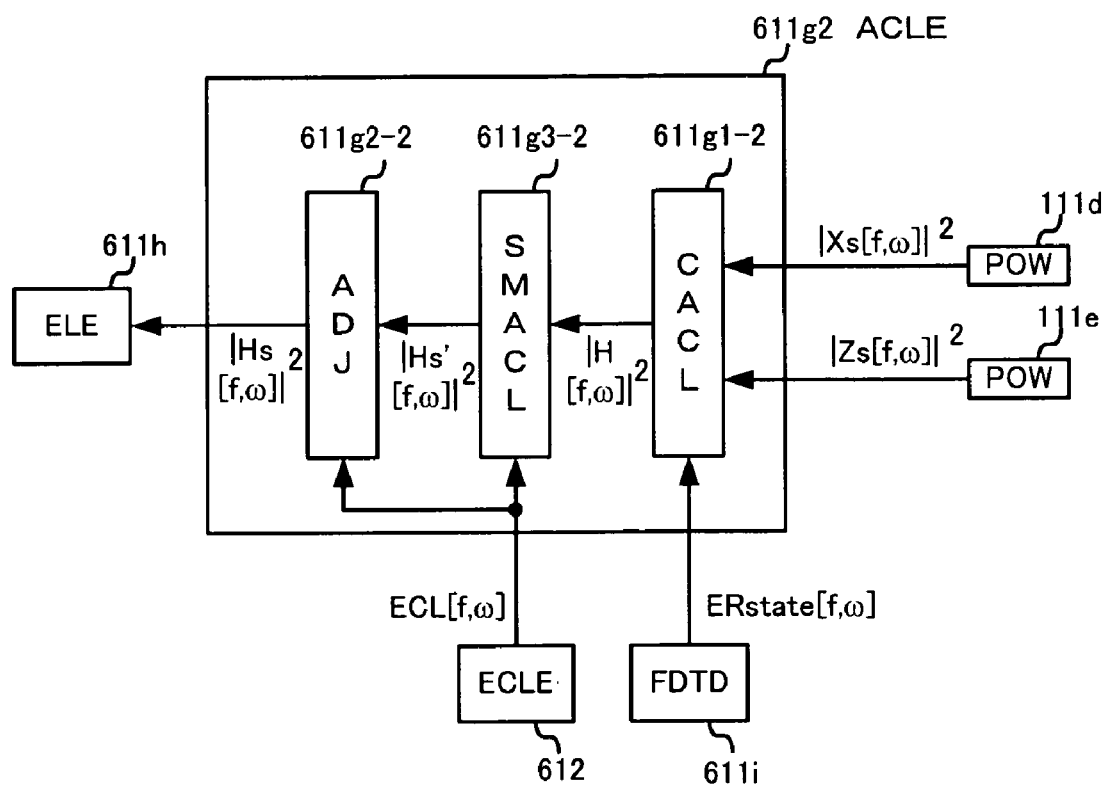
FIG. 32 is a block diagram of an acoustic coupling level estimator included in the echo reduction unit of the variation of the sixth embodiment.

FIG. 32 is a block diagram of the ACLE 611g2. The ACLE 611g2 includes a minor acoustic coupling level estimator 611g1-2 (hereinafter shortened as the CACL 611g1-2), an acoustic coupling level correction unit 611g2-2 (hereinafter shortened as the ADJ 611g2-2) and an acoustic coupling level smoother 611g3-2 (hereinafter shortened as the SMACL 611g3-2).

The CACL 611g1-2 is provided by the POW 111d with the smoothed received power spectrum $|X_S[f,\omega]|^2$, provided by the POW 111e with the smoothed sent power spectrum $|Z_S[f,\omega]|^2$ and provided by the FDTD 611j with the frequency-domain double talk flag ERstate $[f, \omega]$. The CACL 611g1-2 produces an acoustic coupling level $|H[f,\omega]|^2$ for each frequency bin $\omega$ not by using $|E_S[f,\omega]|^2$ based on the residual signal but by using $|Z_S[f,\omega]|^2$ based on the sent input signal, according to Eq. 48, so as not to be affected by the echo cancellation performance of the EC 610.

$$|H[f,\omega]|^2 = \frac{|Z_S[f,\omega]|^2}{|X_S[f,\omega]|^2} \qquad \text{(Eq. 48)}$$

If the frequency-domain double talk flag ERstate $[f, \omega]$ provided by the FDTD 611j indicates occurrence of double talk, however, the ACLE 611g1-2 uses a value of the acoustic coupling level one frame ago, $|H[f-1,\omega]|^2$, without updating the acoustic coupling level so as to maintain ability to track variation of an echo path quickly and to avoid producing the acoustic coupling level for a frequency bin where the double talk occurs.

So does the ACLE 611g1-2 if the acoustic coupling level steeply changes, i.e., $|H[f,\omega]|^2 > \beta_H[\omega]\cdot|H[f-1,\omega]|^2$, or if amplitude of the received input signal is not great enough, i.e., $|X_S[f,\omega]|^2 < \beta_X[\omega]$, where $\beta_H[\omega]$ is preferably from 0.9 to 30, and $\beta_X[\omega]$ is preferably from 30 to 40 dB.

As occurrence of double talk may cause a very steep change of the acoustic coupling level, the communication apparatus may avoid producing a sent speech signal of low quality by not updating the acoustic coupling level.

The SMACL 611g3-2 is provided by the CACL 611g1-2 with the acoustic coupling level $|H[f,\omega]|^2$ and provided by the ECLE 612 with the echo cancellation level ECL $[f, \omega]$. The SMACL 611g3-2 produces the acoustic coupling level $|H_S'[f,\omega]|^2$ smoothed by using a value thereof one frame ago according to Eq. 49.

$$|H_S'[f,\omega]|^2 = \alpha_H[\omega]\cdot|H[f,\omega]|^2 + (1-\alpha_H[\omega])\cdot|H_S'[f-1,\omega]|^2 \qquad \text{(Eq. 49)}$$

In Eq. 49, $\alpha_H[\omega]$ is preferably from 0.03 to 0.99, and is set variable for each frequency bin $\omega$ based on the echo cancellation level ECL $[f, \omega]$ of the EC 610. The more adequate the echo cancellation level ECL $[f, \omega]$ is, the nearer to zero $\alpha_H[\omega]$ is. The less adequate the echo cancellation level ECL $[f, \omega]$ is, the nearer to one $\alpha_H[\omega]$ is.

The ADJ 611g2-2 is provided by the SMACL 611g3-2 with the smoothed acoustic coupling level $|H_S'[f,\omega]|^2$ and provided by the ECLE 612 with the echo cancellation level ECL $[f, \omega]$. The ADJ 611g2-2 produces the corrected acoustic coupling level $|H_S[f,\omega]|^2$.

Specifically speaking, the ADJ 611g2-2 determines at first whether the echo cancellation level ECL $[f, \omega]$ of the EC 610 is adequate for each frequency bin $\omega$. For a frequency bin where the ADJ 611g2-2 determines that the echo cancellation level ECL $[f, \omega]$ of the EC 610 is adequate, the ADJ 611g2-2 corrects the acoustic coupling level $|H_S'[f,\omega]|^2$ smoothed by using a coefficient $\beta_{HACL}[\omega]$ according to Eq. 50 so as to produce the corrected acoustic coupling level $|H_S[f,\omega]|^2$, where $0 < \beta_{HACL}[\omega] \leq 1$.

$$|H_S[f,\omega]|^2 = |H_S'[f,\omega]|^2 \cdot \beta_{HACL}[\omega] \qquad \text{(Eq. 50)}$$

For a frequency bin where the ADJ 611g2-2 determines that the echo cancellation level ECL $[f, \omega]$ of the EC 610 is inadequate, the ADJ 611g2 sets $|H_S[f,\omega]|^2$ equal to $|H_S'[f,\omega]|^2$, i.e., $|H_S[f,\omega]|^2 = |H_S'[f,\omega]|^2$, without correcting the smoothed acoustic coupling level $|H_S'[f,\omega]|^2$. According to the variation of the sixth embodiment described above, the communication apparatus may avoid producing a sent speech signal of low quality in a case where variation of echo path loss is not very often.

7 Seventh Embodiment of the Present Invention

Figure 33:
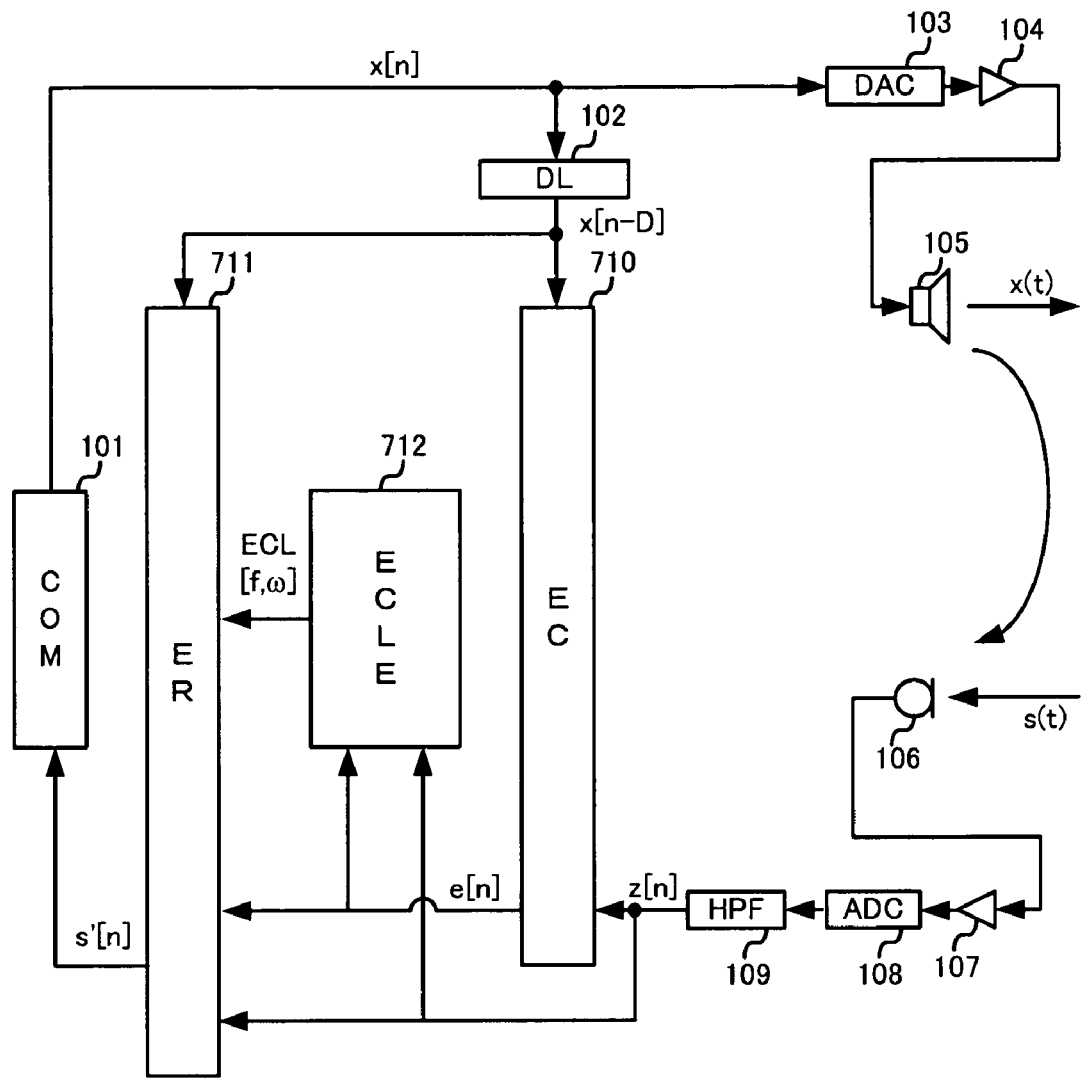
FIG. 33 is a block diagram of a communication apparatus of a seventh embodiment of the present invention.

A seventh embodiment of the present invention will be described with reference to FIGS. 33 to 40. FIG. 33 is a block diagram of a communication apparatus of the seventh embodiment. The communication apparatus of the seventh embodiment includes an echo canceller 710 (hereinafter shortened as the EC 710), an echo reduction unit 711 (hereinafter shortened as the ER 711) and an echo cancellation level estimator 712 (hereinafter shortened as the ECLE 712) instead of the EC 610, the ER 611 and the ECLE 612 of the sixth embodiment, respectively.

Each of remaining portions of the communication apparatus of the seventh embodiment is a same as the corresponding one of the communication apparatus of the sixth embodiment given the same reference numeral, and its explanation is omitted. Each of portions of the ER 711 being a same as the corresponding one of the ER 111 of the first embodiment or of the ER 611 of the sixth embodiment is given the same reference numeral, and its explanation is omitted.

Figure 34:
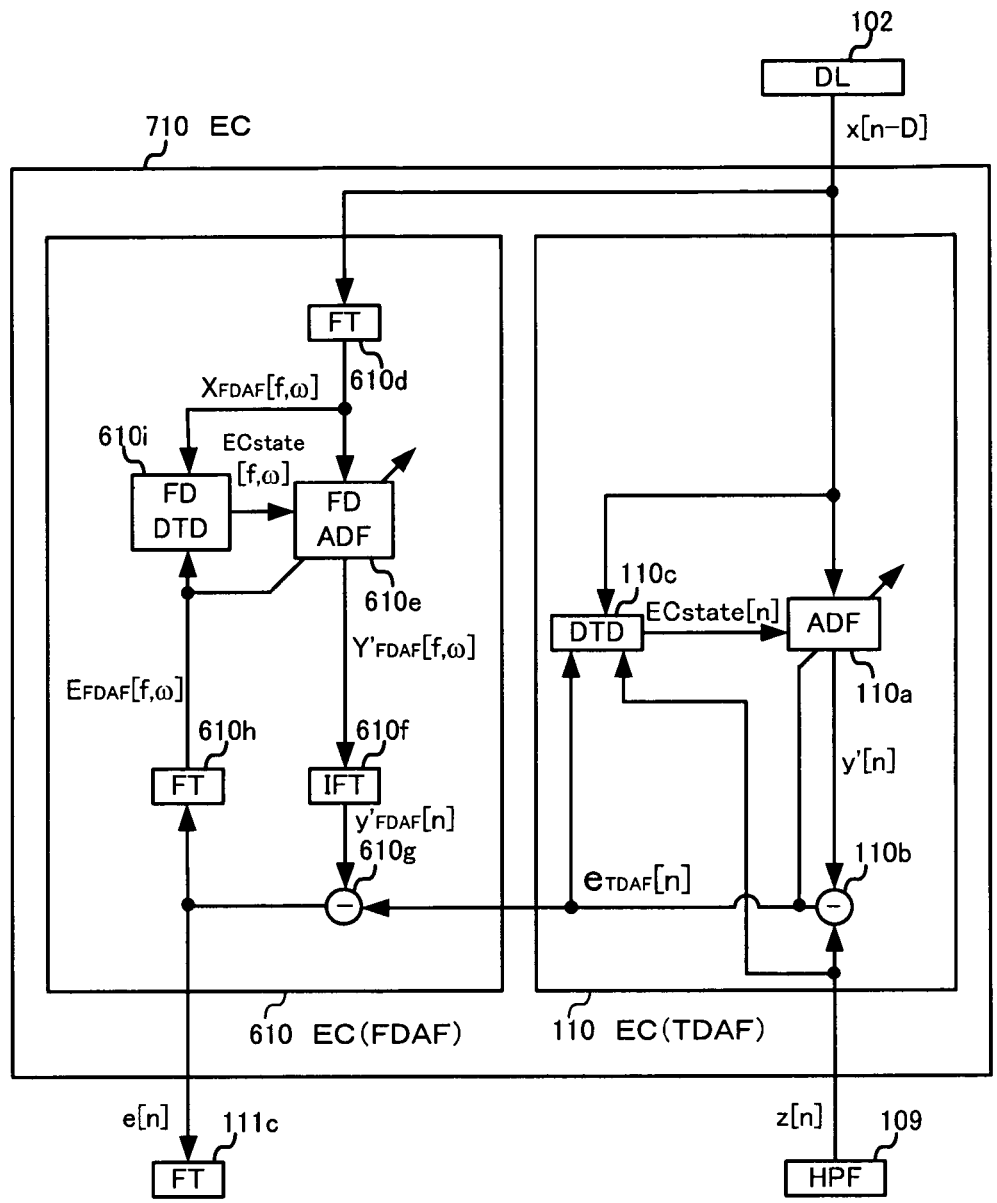
FIG. 34 is a block diagram of an echo canceller included in the communication apparatus of the seventh embodiment.

FIG. 34 is a block diagram of the EC 710 of the seventh embodiment. The EC 710 includes a time-domain echo canceller (hereinafter shortened as the TDAF) and a frequency-domain echo canceller (hereinafter shortened as the FDAF) coupled to the TDAF in series, i.e., a signal produced by the TDAF is applied to and processed by the FDAF.

The TDAF is a same as the EC 110 of the first embodiment. The FDAF is a same as the EC 610 of the sixth embodiment.

The DL 102 provides the TDAF (EC 110) and the FDAF (EC 610) with a delayed received input signal x [n-D]. The EC 110 provides the EC 610 with a residual signal e [n] as a sent input signal z [n]. The TDAF is given the same reference numeral as that of the EC 110. The FDAF is given the same reference numeral as that of the EC 610. In this case, an internal condition of the EC 710 is a same as a condition combined the internal condition of the EC110 and the EC610 in memory as an internal condition. An explanation of the EC 710 is omitted.

Figure 35:
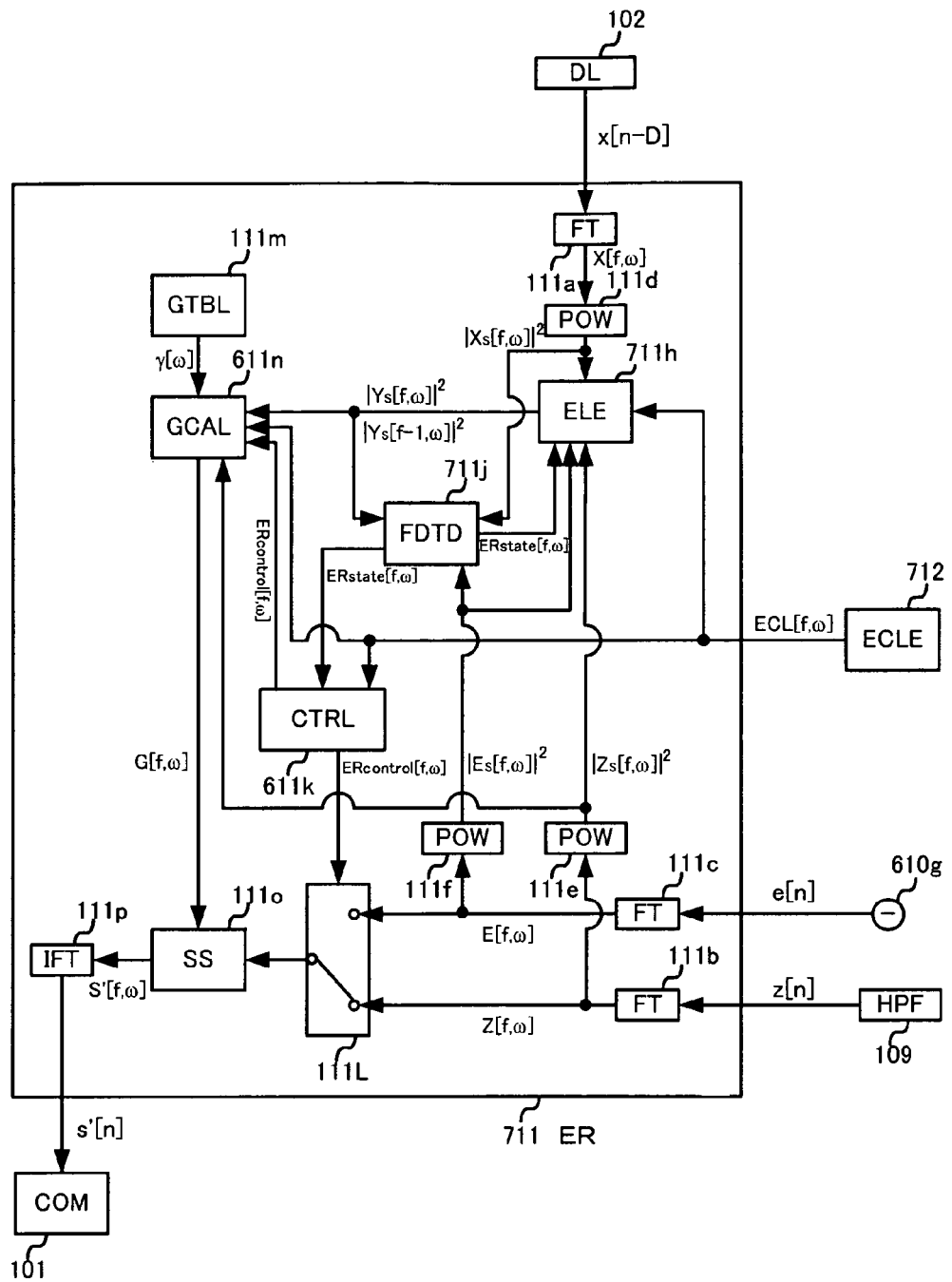
FIG. 35 is a block diagram of an echo reduction unit included in the communication apparatus of the seventh embodiment.

FIG. 35 is a block diagram of the ER 711. The ER 711 includes the FT 111a, the FT 111b and the FT 111c. The ER 711 includes the POW 111d, the POW 111e and the POW 111f. The ER 711 includes the CTRL 611k, the SEL 111L, the GCAL 611n, the SS 111o and the IFT 111p. The ER 711 includes an echo level estimator 711h (hereinafter shortened as the ELE 711h) and a frequency-domain double talk detector 711j (hereinafter shortened as the FDTD 711j).

Figure 36:
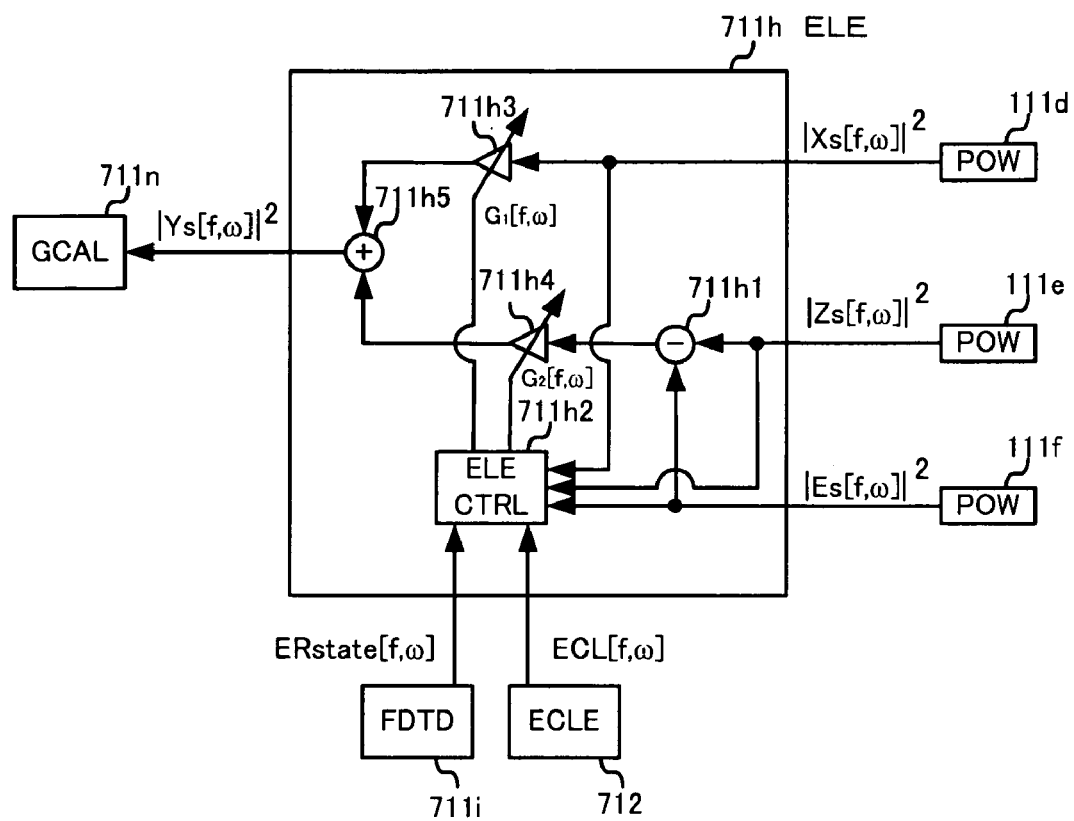
FIG. 36 is a block diagram of an echo level estimator included in the echo reduction unit of the seventh embodiment.

FIG. 36 is a block diagram of the ELE 711h. The ELE 711h includes a signal subtractor 711h1 (hereinafter shortened as the ST 711h), an echo level controller 711h2 (hereinafter shortened as the ELECTRL 711h2), a variable gain amplifier 711h3 (hereinafter shortened as the VGA 711h3), a variable gain amplifier 711h4 (hereinafter shortened as the VGA 711h4) and a signal adder 711h5 (hereinafter shortened as the ADD 711h5).

Operation of each portion of the communication apparatus of the seventh embodiment as configured above will be described with reference to FIGS. 33 to 36.

At first, the ECLE 712 is provided by the HPF 109 with the sent input signal z [n] and provided by the ST 610g of the EC 710 with the residual signal in the time domain, e [n]. The ECLE produces an estimation of the echo cancellation level of the EC 610 for each frequency bin ω.

Specifically speaking, at first, the ECLE 712 windows and overlaps the sent input signal z [n]. Converting a signal as a result of windowing and overlapping into the frequency domain by using an FFT method, the ECLE 712 produces a sent power spectrum, $|Z'[f, \omega]|^2$. Next, the ECLE 712 windows and overlaps the residual signal e [n]. Converting a signal as a result of windowing and overlapping into the frequency domain by using an FFT method, the ECLE 712 produces a residual power spectrum, $|E'[f, \omega]|^2$.

The ECLE 712 produces a ratio of the residual power spectrum $|E'[f, \omega]|^2$ to the sent power spectrum $|Z'[f, \omega]|^2$ according to Eq. 51. The ECLE 712 outputs the produced ratio as an echo cancellation level ECL [f, ω] of the EC 710.

$$ECL[f, \omega] = \frac{|E'[f, \omega]|^2}{|Z'[f, \omega]|^2} \qquad \text{(Eq. 51)}$$

Operation of the ER 711 of the seventh embodiment will be described with reference to FIGS. 35 and 36.

The ER 711 performs echo reduction, i.e., cancels an echo component based on the received signal x [n], the sent input signal z [n] and the residual signal e [n]. The ER 711 produces a sent output signal s' [n] as a result of the echo reduction (n=0, 1, ..., N−1).

The ELE 711h is provided by the POW 111d with the smoothed received power spectrum $|X_S[f, \omega]|^2$, provided by the POW 111e with the smoothed sent power spectrum $|Z_S[f, \omega]|^2$ and provided by the POW 111f with the smoothed residual power spectrum $|E_S[f, \omega]|^2$. The ELE 711h is provided by the ECLE 712 with the echo cancellation level ECL [f, ω] and provided by the FDTD 711j with a frequency-domain double talk flag ERstate [f, ω]. The ELE 711h produces a smoothed echo level $|Y_S[f, \omega]|^2$.

The ST 711h is provided by the POW 111e with the sent power spectrum $|Z_S[f, \omega]|^2$ and provided by the POW 111f with the residual power spectrum $|E_S[f, \omega]|^2$. The ST 711h subtracts the residual power spectrum $|E_S[f, \omega]|^2$ from the sent power spectrum $|Z_S[f, \omega]|^2$ for each frame f and for each frequency bin ω. The ST 711h produces a signal, $|Z_S[f, \omega]|^2 - |E_S[f, \omega]|^2$, as a result of subtraction.

The ELECTRL 711h2 is provided by the POW 111d with the smoothed received power spectrum $|X_S[f, \omega]|^2$, provided by the POW 111e with the smoothed sent power spectrum $|Z_S[f, \omega]|^2$ and provided by the POW 111f with the smoothed residual power spectrum $|E_S[f, \omega]|^2$. The ELECTRL 711h2 is provided by the ECLE 712 with the echo cancellation level ECL [f, ω] and provided by the FDTD 711j with the frequency-domain double talk flag ERstate [f, ω]. The ELECTRL 711h2 provides the VGA 711h3 with a variable gain $G_1$ [f, ω] and provides the VGA 711h4 with a variable gain $G_2$ [f, ω].

Specifically speaking, the ELECTRL 711h2 at first produces following three parameters, $G_{HZ}$, $G_{HE}$ and $G_{HZE}$, according to Eqs. 52-1 to 52-3 in a single talk condition, which interference eliminator that the frequency-domain double talk flag ERstate [f, ω] indicates no occurrence of double talk contributing to accurate estimation of the echo level.

$$G_{HZ} = \frac{|Z_S[f, \omega]|^2}{|X_S[f, \omega]|^2} \qquad \text{(Eq. 52-1)}$$

$$G_{HE} = \frac{|E_S[f, \omega]|^2}{|X_S[f, \omega]|^2} \qquad \text{(Eq. 52-2)}$$

$$G_{HZE} = \frac{|E_S[f, \omega]|^2}{|Z_S[f, \omega]|^2 - |E_S[f, \omega]|^2} \qquad \text{(Eq. 52-3)}$$

There are defined three functions of the echo cancellation level ECL [f, ω], i.e., $F_{HZ}$ (ECL [f, ω]), $F_{HE}$ (ECL [f, ω]) and $F_{HZE}$ (ECL [f, ω]), each of which values no less than zero and no more than one under control of the ELECTRL 711h2. If the echo cancellation level ECL [f, ω] is inadequate, the ELECTRL 711h2 lets $F_{HZ}$(ECL [f, ω]) and $F_{HZE}$(ECL [f, ω]) be small or near zero and lets $F_{HE}$ (ECL [f, ω]) be near one so that the echo level estimation is less affected by the residual power spectrum $|E_S[f, \omega]|^2$.

If the echo cancellation level ECL [f, ω] is adequate, the ELECTRL 711h2 lets $F_{HZ}$ (ECL [f, ω]) be small or near zero and lets $F_{HE}$ (ECL [f, ω]) and $F_{HZE}$ (ECL [f, ω]) be near one so as to use the residual power spectrum $|E_S[f, \omega]|^2$ with confidence. The ELECTRL 711h2 may determine whether the echo cancellation level ECL [f, ω] is adequate based on a same condition as that of the CTRL 611k of the sixth embodiment.

The ELECTRL 711h2 gives a value of the variable gain $G_1$ [f, ω] according to Eq. 53-1. The ELECTRL 711h2 gives a value of the variable gain $G_2$ [f, ω] according to Eq. 53-2.

$$G_1[f,\omega] = F_{HZ}(E\ C\ L[f,\omega]) \cdot G_{HZ} + F_{HE}(E\ C\ L[f,\omega]) \cdot G_{HE} \qquad \text{(Eq. 53-1)}$$

$$G_2[f,\omega] = F_{HZE}(E\ C\ L\ [f,\omega]) \cdot G_{HZE} \qquad \text{(Eq. 53-2)}$$

The VGA 711h3 is provided by the POW 111d with the smoothed received power spectrum $|X_S[f, \omega]|^2$ and provided by the ELECTRL 711h2 with the variable gain $G_1$ [f, ω]. Multiplying $|X_S[f, \omega]|^2$ and $G_1$ [f, ω], the VGA 711h3 amplifies or attenuates the received power spectrum $|X_S[f, \omega]|^2$.

The VGA 711h4 is provided by the ST 711h1 with the signal $|Z_S[f, \omega]|^2 - |E_S[f, \omega]|^2$ and provided by the ELECTRL 711h2 with the variable gain $G_2$ [f, ω]. Multiplying $|Z_S[f, \omega]|^2 - |E_S[f, \omega]|^2$ and $G_2$ [f, ω], the VGA 711h3 amplifies or attenuates the signal $|Z_S[f, \omega]|^2 - |E_S[f, \omega]|^2$.

The ADD 711h5 is provided by the VGA 711h3 with $|X_S[f, \omega]|^2$ multiplied by $G_1$ [f, ω] and provided by the VGA 711h4 with $|Z_S[f, \omega]|^2 - |E_S[f, \omega]|^2$ multiplied by $G_2$ [f, ω]. The ADD 711h5 produces the smoothed echo level $|Y_S[f, \omega]|^2$. Specifically speaking, the ADD 711h5 adds $|X_S[f, \omega]|^2$ multiplied by $G_1$ [f, ω] and $|Z_S[f, \omega]|^2 - |E_S[f, \omega]|^2$ multiplied by $G_2$ [f, ω] to produce the echo level $|Y [f, \omega]|^2$ according to Eq. 54-1 for each frame f and for each frequency bin ω.

Smoothing the echo level $|Y [f, \omega]|^2$, the ADD 711h5 produces the smoothed echo level $|Y_S [f, \omega]|^2$ according to Eq. 54-2, where αY[ω] is preferably from 0.7 to 0.99. The ADD 711h5 may output the echo level |Y [f, ω]|² without smoothing, as a matter of course.

$$|Y[f,\omega]|^2 = G_1[f,\omega] \cdot X_S[f,\omega]|^2 + G_2[f,\omega] \cdot (|Z_S[f,\omega]|^2 - |E_S[f,\omega]|^2)$$ (Eq. 54-1)

$$|Y_S[f,\omega]|^2 = \alpha_Y[\omega] \cdot |Y[f,\omega]|^2 + (1-\alpha_Y[\omega]) \cdot |Y_S[f-1,\omega]|^2$$ (Eq. 54-2)

The FDTD 711j is provided by the POW 111d with the smoothed received power spectrum |X_S [f, ω]|², provided by the ELE 711h with the smoothed echo level one frame ago, |Y_S [f−1, ω]|², and provided by the POW 111f with the smoothed received power spectrum |E_S [f, λ]|². The FDTD 711j produces the frequency-domain double talk flag ERstate [f, ω] indicating whether double talk occurs.

Specifically speaking, the FDTD 711j determines occurrence of double talk if a value on a left-hand side of Eq. 55 is greater than a threshold β_Y[ω] on a right-hand side of Eq. 55, where β_Y[ω] is preferably from 1.0 to 20.

$$\frac{||E_S[f,\omega]|^2 - |Y_S[f-1,\omega]|^2|}{|X_S[f,\omega]|^2} > \beta_Y[\omega]$$ (Eq. 55)

Figure 37:
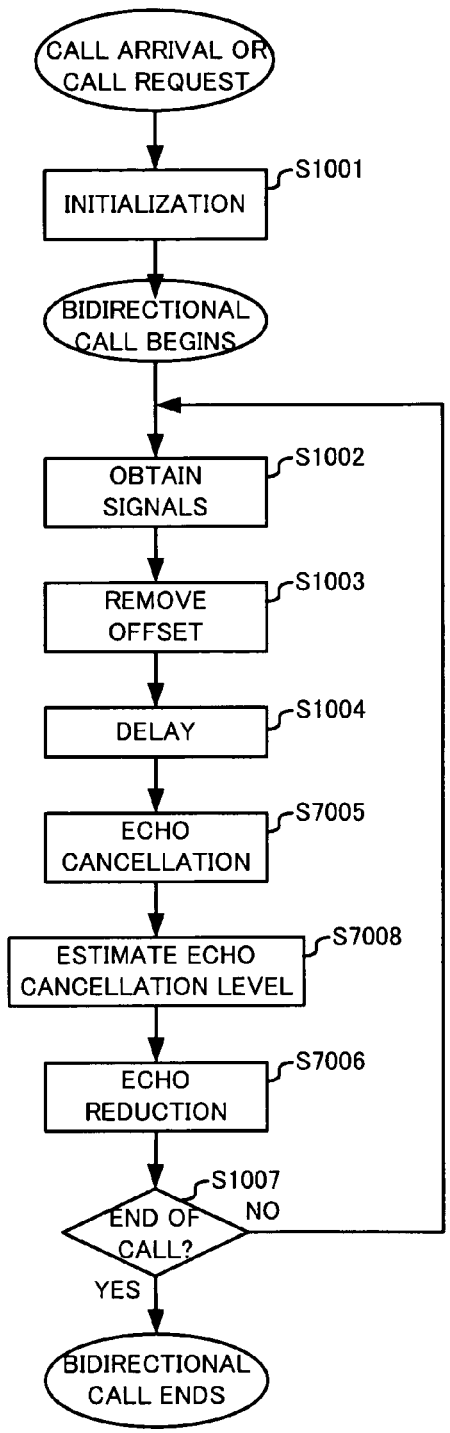
FIG. 37 is a flow chart of operation of the communication apparatus of the seventh embodiment.

A flow of operation of the communication apparatus of the seventh embodiment will be described with reference to FIGS. 37 to 39. FIG. 37 is a flow chart showing the flow as a whole. Each of steps shown in FIG. 37 being a same as the corresponding one shown in FIG. 5, the flow chart of the first embodiment, is given the same reference numeral and its explanation is omitted.

Following the step S1004 and being provided with the delayed received input signal x [n-D] and the offset-removed sent input signal z [n], the EC 710 performs echo cancellation (step S7005).

Being provided by the HPF 109 with the sent input signal z [n] and provided by the ST 610g with the time-domain residual signal e [n], the ECLE 712 estimates the echo cancellation level of the EC 710, ECL [f, ω] (step S7008).

Being provided with the delayed received input signal x [n-D] and the offset-removed sent input signal z [n], and provided by the EC 710 with the residual signal e [n] as a result of the echo cancellation, the ER 711 performs echo reduction, i.e., nonlinear echo cancellation (step S7006). The communication apparatus then determines whether the call reaches an end at the step S1007.

Figure 38:
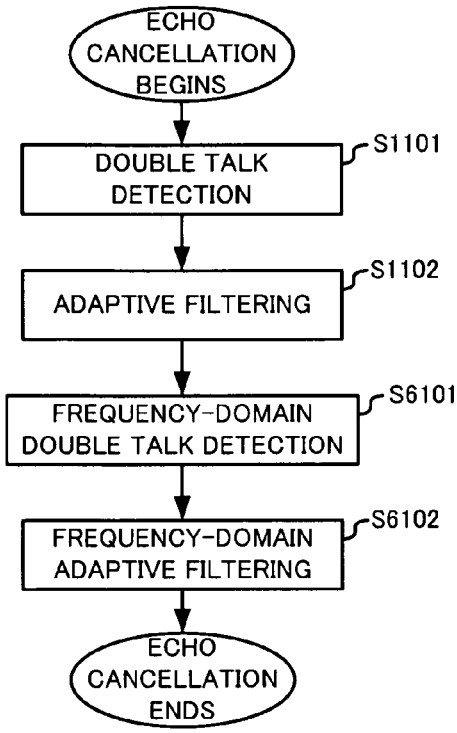
FIG. 38 is a flow chart of operation of the echo canceller of the seventh embodiment.

FIG. 38 is a flow chart of the echo cancellation process of the EC 710 of the seventh embodiment. Each of steps shown in FIG. 38 being a same as the corresponding one shown in FIG. 6 or FIG. 29, the flow chart of the EC 110 of the first embodiment or of the EC 610 of the sixth embodiment, respectively, is given the same reference numeral and its explanation is omitted.

At first in FIG. 38, the EC 710 performs double talk detection at the step S1101 and adaptive filtering at the step S1102. The ST 110b subtracts the echo replica signal y' [n] provided by the ADF 110a from the sent input signal z [n] so as to produce a residual signal e_TDAF [n]. The EC 710 then performs frequency-domain double talk detection (step S6101) and frequency-domain adaptive filtering (step S6102). Subtracting the echo replica signal y'_FADF [n] provided by the FDADF 610e from the residual signal e_TDAF [n], the ST 610g produces the residual signal e [n] (step S6102). The EC 710 then ends the echo cancellation process.

Figure 39:
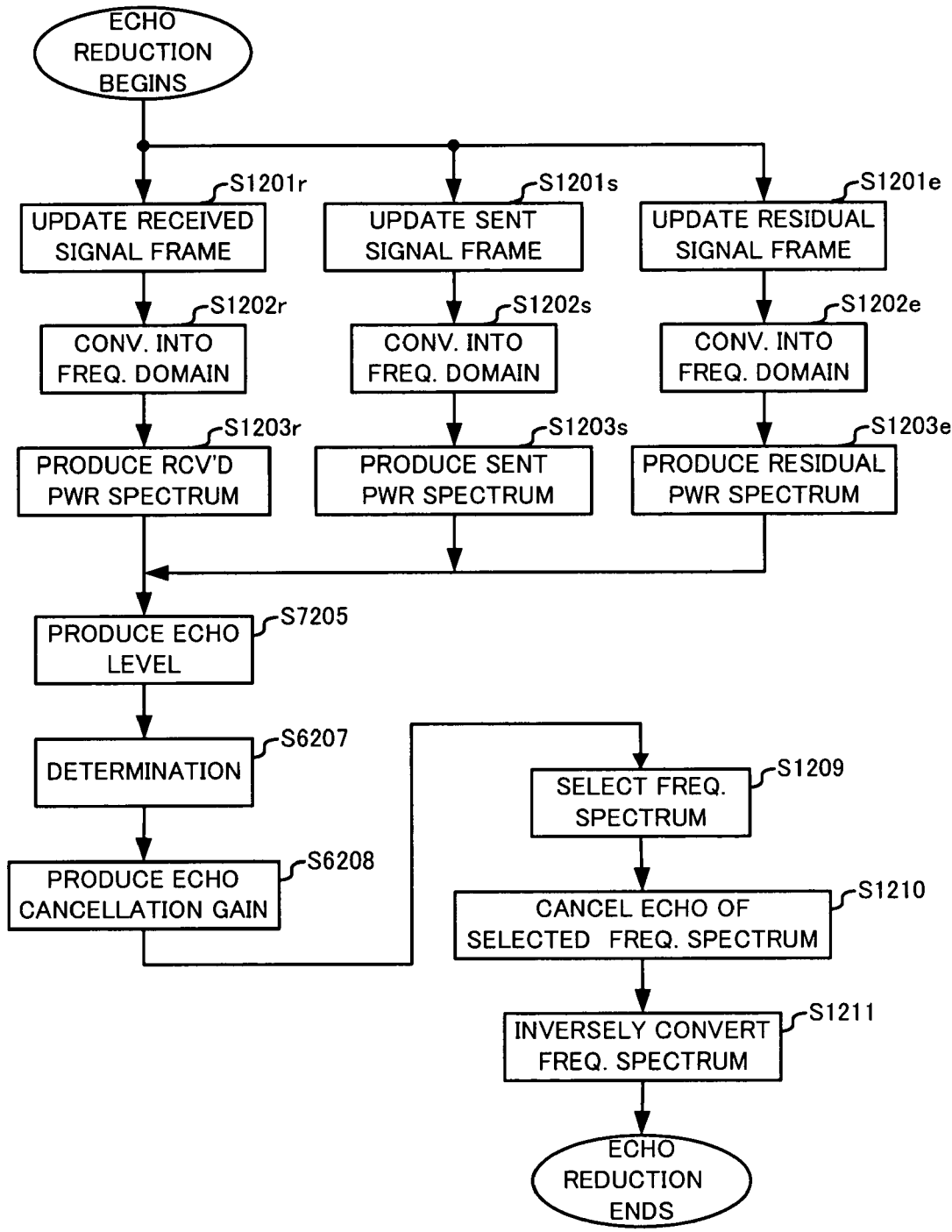
FIG. 39 is a flow chart of operation of the echo reduction unit of the seventh embodiment.

FIG. 39 is a flow chart of the echo reduction process of the ER 711 of the seventh embodiment. Each of steps shown in FIG. 39 being a same as the corresponding one shown in FIG. 7 or FIG. 30, the flow chart of the EC 110 of the first embodiment or of the ER 611 of the sixth embodiment, respectively, is given the same reference numeral and its explanation is omitted.

After one of the steps S1203r, S1203s and S1203e, the FDTD 711j produces the frequency-domain double talk flag ERstate [f, ω] indicating whether double talk occurs. The ELE 711h is provided with the received power spectrum |X_S [f, ω]|², the sent power spectrum |Z_S [f, ω]|², the residual power spectrum |E_S [f, ω]|², the echo cancellation level ECL [f, ω] and the frequency-domain double talk flag ERstate [f, ω]. The ELE 711h produces the smoothed echo level |Y_S [f, ω]|² (step S7205).

After the steps S6207, S6208, S 1209 and S1210, the IFT 111p inversely converts the frequency spectrum selected by the SEL 111L into the time domain (step S1211), and ends the echo reduction process.

In the above description, the ER 711 is of a frequency domain type performing FFT and operates on a frequency bin-by-frequency bin basis. A method of grouping the frequency bins for the FFT and operating on a group-by-group basis may be implemented. The ER 711 may be implemented as a frequency domain type like a bandwidth division filter like a filter bank.

According to the seventh embodiment described above, the ECLE 712 and the CTRL 111k may detect a frequency bin where the echo cancellation level of the EC 710 is inadequate. The SEL 111L and the GCAL 611n can vary weighting put on the EC 710 and on the ER 711 for each frequency bin so that the communication apparatus of the seventh embodiment can be robust against variation of echo path loss and can produce the sent output signal of high quality.

7A Variation of the Seventh Embodiment

A variation of the seventh embodiment will be described as follows. A communication apparatus of the variation of the seventh embodiment includes an echo canceller 710r (hereinafter shortened as the EC 710r) instead of the ER 710 of the seventh embodiment. The communication apparatus of the variation of the seventh embodiment includes an echo reduction unit 711r (hereinafter shortened as the ER 711r) instead of the ER 711 of the seventh embodiment. The communication apparatus of the variation of the seventh embodiment includes an echo cancellation level estimator 712r (hereinafter shortened as the ECLE 712r) instead of the ECLE 712 of the seventh embodiment.

The communication apparatus of the variation of the seventh embodiment includes a sent input signal buffer 713 (hereinafter shortened as the BUFF 713), a received input signal buffer 714 (hereinafter shortened as the BUFF 714) and a delay unit 702r (hereinafter shortened as the DL 702r).

Figure 40:
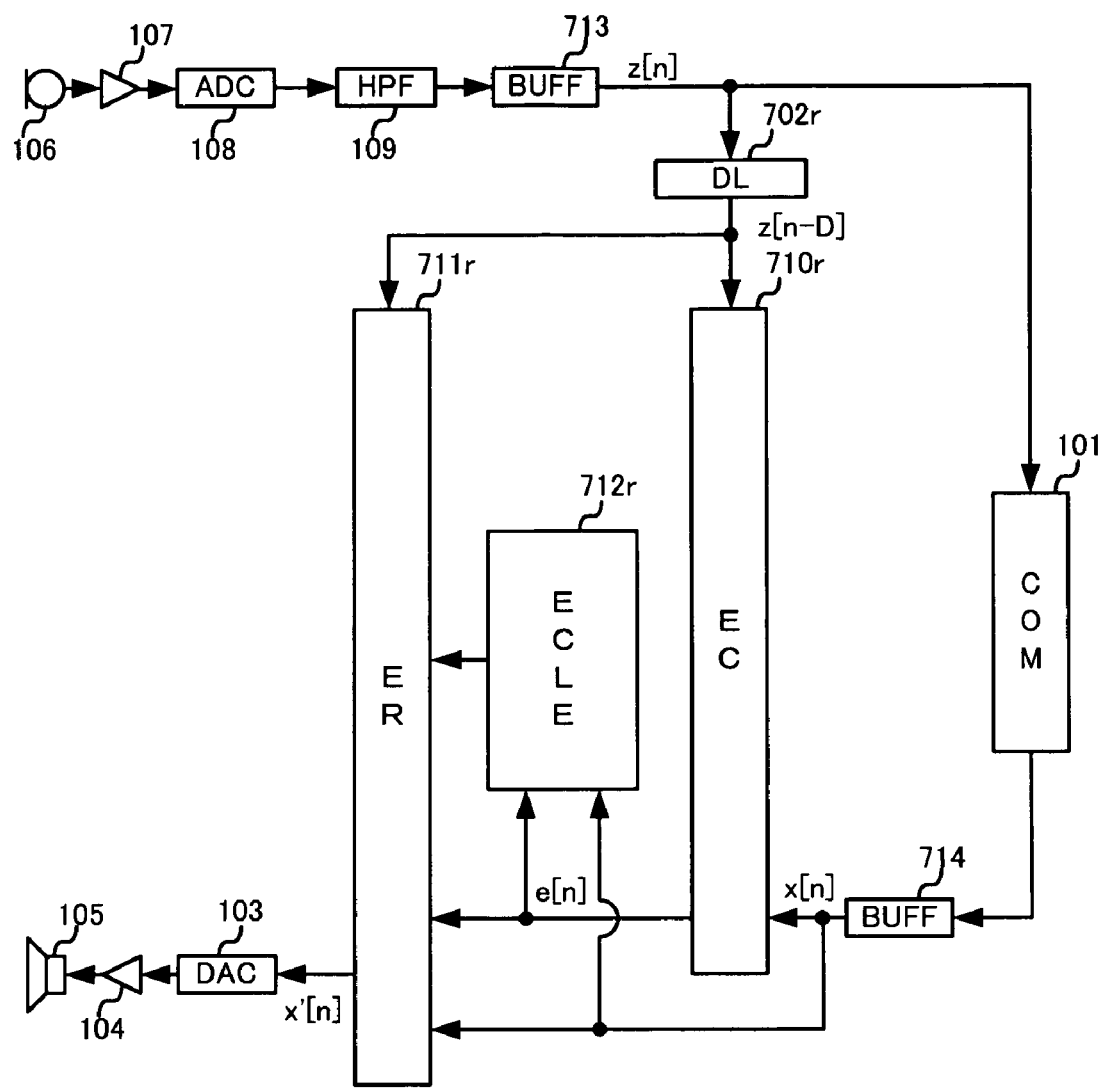
FIG. 40 is a block diagram of a communication apparatus of a variation of the seventh embodiment.

The communication apparatus of the seventh embodiment is configured, as shown in FIG. 33, to cancel the echo caused by the received output signal acoustically coupled to the sent input-signal with reference to the received input signal. The communication apparatus of the variation of the seventh embodiment is configured, as shown in FIG. 40, to cancel an echo caused by a sent output signal acoustically coupled to the received input signal at a far end (not shown) with reference to, the sent output signal.

Each of remaining portions of the communication apparatus of the variation of the seventh embodiment is a same as the corresponding one of the communication apparatus of the seventh embodiment given the same reference numeral, and its explanation is omitted.

The BUFF 713 and the BUFF 714 are configured so that the echo generated at the far end may be canceled due to synchronization according to the method of echo cancellation disclosed in Japanese Patent Publication (Kokai), No. 2004-56453, or according to a method of estimating a delay by using cross correlation between the sent input signal and the received input signal.

The DL 702r, the EC 710r, the ER 711r and the ECLE 712r operate in a manner similar to the DL 102, the EC 710, the ER 711 and the ECLE 712 of the seventh embodiment, respectively. The communication apparatus of the variation of the seventh embodiment may thus be configured to cancel the echo generated at the far end.

In the embodiments described above, processes for reducing at least an echo component included in a signal are referred to as "echo cancellation", "echo reduction", "echo suppression" or "echo and noise reduction". In the embodiments described above, the processes for reducing at least a noise component included in a signal is called "noise reduction" or "echo and noise reduction". These terms of the reference have been adopted as they are generally used, and the present invention is not strictly bound by difference of what these terms of the reference mean.

In the embodiments described above, the above processes are specifically represented by following verbs, i.e., to cancel, to suppress or to attenuate. These verbs have been adopted as they are generally used, and the present invention is not strictly bound by difference of what these verbs mean.

A combination of those processes may be implemented within the scope of the present invention.

The present invention may be applied to a communication apparatus that may be used for voice calls, like a telephone, a cellular phone, an interphone, a hands-free phone and a personal handy-phone. The present invention may be applied to communication software that may be used for voice calls, like VoIP software. The present invention may be applied to a communication system like a VoIP system and a TV conference system.

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. A communication apparatus configured to process an input signal including an echo component and a noise component, comprising:
    a first interference eliminator configured to reduce the echo component from the input signal so as to produce an intermediate signal;
    a selector configured to select one of the input signal and the intermediate signal; and
    a second interference eliminator configured to reduce at least one of the echo component and the noise component from the input signal if the input signal is selected by the selector, and to reduce at least one of the echo component and the noise component included in the intermediate signal if the intermediate signal is selected by the selector.

2. The communication apparatus of claim 1, further comprising:
    an estimator configured to estimate an echo cancellation level of the first interference eliminator by using at least one of an internal condition of the first interference eliminator, the input signal and the intermediate signal,
    wherein the selector is configured to select one of the input signal and the intermediate signal based on the echo cancellation level.

3. The communication apparatus of claim 1, further comprising:
    a first estimator configured to estimate an echo cancellation level of the first interference eliminator by using at least one of an internal condition of the first interference eliminator, the input signal and the intermediate signal,
    a second estimator configured to estimate a level of at least one of the echo component and the noise component included in at least one of the input signal and the intermediate signal, and
    a reduction controller configured to produce a reduction level based on at least one of the echo cancellation level estimated by the first estimator and the level of one of the echo component and the noise component estimated by the second estimator,
    wherein the selector is configured to select one of the input signal and the intermediate signal based on the echo cancellation level, and the second interference eliminator is configured to reduce one of the echo component and the noise component according to the reduction level.

4. The communication apparatus of claim 1, further comprising:
    a first estimator configured to estimate an echo cancellation level of the first interference eliminator by using at least one of an internal condition of the first interference eliminator, the input signal and the intermediate signal,
    a second estimator configured to estimate a level of one of the echo component and the noise component included in the input signal so as to produce a first reduction level, and to estimate a level of one of the echo component and the noise component included in the intermediate signal so as to produce a second reduction level, and
    a reduction controller configured to select one of the first reduction level and the second reduction level based on the echo cancellation level,
    wherein the selector is configured to select one of the input signal and the intermediate signal based on the echo cancellation level, and the second interference eliminator is configured to reduce one of the echo component and the noise component according to the one of the first reduction level and the second reduction level selected by the reduction controller.

5. The communication apparatus of claim 1, further comprising:
    a first estimator configured to estimate an echo cancellation level of the first interference eliminator by using at least one of an internal condition of the first interference eliminator, the input signal and the intermediate signal,
    a second estimator configured to estimate a level of one of the echo component and the noise component included in the input signal so as to produce a first reduction level, and to estimate a level of one of the echo component and the noise component included in the intermediate signal so as to produce a second reduction level, and
    a reduction controller configured to select the first reduction level if the selector selects the input signal, and to select the second reduction level if the selector selects the intermediate signal,
    wherein the selector is configured to select one of the input signal and the intermediate signal based on the echo cancellation level, and the second interference eliminator is configured to reduce one of the echo component and the noise component according to the one of the first reduction level and the second reduction level selected by the reduction controller.

6. The communication apparatus of claim 1, further comprising:
- a first estimator configured to estimate an echo cancellation level of the first interference eliminator by using at least one of an internal condition of the first interference eliminator, the input signal and the intermediate signal, and
- a second estimator configured to estimate at least one of the echo component and the noise component included in at least one of the input signal and the intermediate signal so as to produce a reduction level,
- wherein the second estimator is configured to estimate an echo or noise level based on at least one of the echo cancellation level and the reduction level, and
- wherein the selector is configured to select one of the input signal and the intermediate signal based on the echo cancellation level, and the second interference eliminator is configured to reduce one of the echo component and the noise component by using the echo or noise level estimated by the second estimator.

7. The communication apparatus of claim 1, further comprising:
- a first estimator configured to estimate an echo cancellation level of the first interference eliminator by using at least one of an internal condition of the first interference eliminator, the input signal and the intermediate signal,
- a second estimator configured to estimate a first echo or noise level by estimating one of the echo component and the noise component included in the input signal, and to estimate a second echo or noise level by estimating one of the echo component and the noise component included in the intermediate signal, and
- an additional selector configured to select one of the first echo or noise level and the second echo or noise level based on the echo cancellation level,
- wherein the selector is configured to select one of the input signal and the intermediate signal based on the echo cancellation level, and the second interference eliminator is configured to reduce one of the echo component and the noise component by using the one of the first echo or noise level and the second echo or noise level selected by the additional selector.

8. The communication apparatus of claim 1, further comprising:
- a first estimator configured to estimate an echo cancellation level of the first interference eliminator by using at least one of an internal condition of the first interference eliminator, the input signal and the intermediate signal,
- a second estimator configured to estimate at least one of the echo component and the noise component included in at least one of the input signal and the intermediate signal so as to produce a reduction level,
- a third estimator configured to estimate an acoustic coupling level so as to estimate one of the echo component and the noise component included in the input signal and included in the intermediate signal,
- a corrector configured to correct the acoustic coupling level estimated by the third estimator based on at least one of the echo cancellation level and the reduction level, and
- a fourth estimator configured to estimate an echo or noise level by using the acoustic coupling level corrected by the corrector,
- wherein the selector is configured to select one of the input signal and the intermediate signal based on the echo cancellation level, and the second interference eliminator is configured to reduce one of the echo component and the noise component by using the echo or noise level estimated by the fourth estimator.

9. The communication apparatus of claim 1, further comprising:
- a first estimator configured to estimate an echo cancellation level of the first interference eliminator by using at least one of an internal condition of the first interference eliminator, the input signal and the intermediate signal,
- a second estimator configured to estimate a first acoustic coupling level so as to estimate one of the echo component and the noise component included in the input signal,
- a first corrector configured to correct the first acoustic coupling level estimated by the second estimator based on the echo cancellation level,
- a third estimator configured to estimate a first echo or noise level by using the first acoustic coupling level corrected by the first corrector,
- a fourth estimator configured to estimate a second acoustic coupling level so as to estimate one of the echo component and the noise component included in the intermediate signal,
- a second corrector configured to correct the second acoustic coupling level estimated by the fourth estimator based on the echo cancellation level,
- a fifth estimator configured to estimate a second echo or noise level by using the second acoustic coupling level corrected by the second corrector, and
- an additional selector configured to select one of the first echo or noise level and the second echo or noise level based on the echo cancellation level,
- wherein the selector is configured to select one of the input signal and the intermediate signal based on the echo cancellation level, and the second interference eliminator is configured to reduce one of the echo component and the noise component by using the one of the first echo or noise level and the second echo or noise level selected by the additional selector.

10. The communication apparatus of claim 1, further comprising:
- a first estimator configured to estimate an echo cancellation level of the first interference eliminator by using at least one of an internal condition of the first interference eliminator, the input signal and the intermediate signal,
- a second estimator configured to estimate a level of at least one of the echo component and the noise component included in at least one of the input signal and the intermediate signal, and
- a reduction controller configured to estimate a reduction level based on at least one of the echo cancellation level estimated by the first estimator and the level of one of the echo component and the noise component estimated by the second estimator,
- wherein the reduction controller includes an echo or noise estimator configured to estimate an echo or noise level of at least one of the echo component and the noise component included in at least one of the input signal and the intermediate signal, a gain generator configured to generate a reduction gain by using the echo or noise level, and a gain corrector configured to correct the reduction gain based on the echo cancellation level, the reduction level being equal to the reduction gain corrected by the gain corrector,
- wherein the selector is configured to select one of the input signal and the intermediate signal based on the echo cancellation level, and the second interference eliminator is configured to reduce one of the echo component and the noise component according to the reduction level.

11. The communication apparatus of claim 1, further comprising:
an estimator configured to estimate an echo cancellation level of the first interference eliminator by using at least one of an internal condition of the first interference eliminator, the input signal and the intermediate signal,
a first echo or noise estimator configured to estimate a first echo or noise level by estimating one of the echo component and the noise component included in the input signal,
a second echo or noise estimator configured to estimate a second echo or noise level by estimating one of the echo component and the noise component included in the intermediate signal,
a gain generator configured to generate a first reduction gain by using the first echo or noise level, and to generate a second reduction gain by using the second echo or noise level,
a gain corrector configured to correct the first reduction gain and the second reduction gain based on the echo cancellation level, and
an additional selector configured to select one of the first reduction gain and the second reduction corrected by the gain corrector,
wherein the selector is configured to select one of the input signal and the intermediate signal based on the echo cancellation level, and the second interference eliminator is configured to reduce one of the echo component and the noise component according to the one of the first reduction gain and the second reduction gain selected by the additional selector.

12. The communication apparatus of claim 1, wherein the selector is configured to select one of the input signal and the intermediate signal for each frequency bin.

13. The communication apparatus of claim 1, further comprising:
an estimator configured to estimate an echo cancellation level of the first interference eliminator for each frequency bin by using at least one of an internal condition of the first interference eliminator, the input signal and the intermediate signal,
wherein the selector is configured to select one of the input signal and the intermediate signal based on the echo cancellation level for each frequency bin.

14. The communication apparatus of claim 1, further comprising:
a first estimator configured to estimate an echo cancellation level of the first interference eliminator for each frequency bin by using at least one of an internal condition of the first interference eliminator, the input signal and the intermediate signal,
a second estimator configured to estimate a level of at least one of the echo component and the noise component included in at least one of the input signal and the intermediate signal, and
a reduction controller configured to estimate a reduction level based on at least one of the echo cancellation level estimated by the first estimator and the level of one of the echo component and the noise component estimated by the second estimator for each frequency bin,
wherein the selector is configured to select one of the input signal and the intermediate signal based on the echo cancellation level for each frequency bin, and the second interference eliminator is configured to reduce one of the echo component and the noise component according to the reduction level for each frequency bins bin.

15. A communication apparatus configured to process an input signal including an echo component and a noise component, comprising:
a first interference eliminator configured to reduce the echo component so as to produce an intermediate signal;
an estimator configured to estimate a level of at least one of the echo component and the noise component included in the input signal so as to produce a first reduction level, and to estimate a level of at least one of the echo component and the noise component included in the intermediate signal so as to produce a second reduction level;
a second interference eliminator configured to reduce at least one of the echo component and the noise component included in the input signal according to the first reduction level so as to produce a first output signal, and to reduce at least one of the echo component and the noise component included in the intermediate signal according to the second reduction level so as to produce a second output signal; and
a selector configured to select and output one of the first output signal and the second output signal.

16. The communication apparatus of claim 15, further comprising:
an additional estimator configured to estimate an echo cancellation level of the first interference eliminator by using at least one of an internal condition of the first interference eliminator, the input signal and the intermediate signal,
wherein the selector is configured to select and output one of the first output signal and the second output signal based on the echo cancellation level.

17. The communication apparatus of claim 15, further comprising:
an additional estimator configured to estimate an echo cancellation level of the first interference eliminator by using at least one of an internal condition of the first interference eliminator, the input signal and the intermediate signal,
wherein the estimator is configured to estimate a first echo or noise level included in the input signal and a second echo or noise level included in the intermediate signal based on the echo cancellation level,
wherein the estimator is configured to estimate the first reduction level by using the first echo or noise level, and to estimate the second reduction level by using the second echo or noise level, and
wherein the selector is configured to select and output one of the first output signal and the second output signal based on the echo cancellation level.

18. The communication apparatus of claim 15, further comprising:
an additional estimator configured to estimate an echo cancellation level of the first interference eliminator by using at least one of an internal condition of the first interference eliminator, the input signal and the intermediate signal,
a first acoustic estimator configured to estimate a first acoustic coupling level and a second acoustic coupling level,
a corrector configured to correct the first acoustic coupling level and the second acoustic coupling level based on the echo cancellation level, and
a second acoustic estimator configured to estimate a first echo or noise level included in the input signal by using the first acoustic coupling level corrected by the corrector, and to estimate a second echo or noise level included in the intermediate signal by using the second acoustic coupling level corrected by the corrector, wherein the estimator is configured to estimate the first reduction level by using the first echo or noise level, the estimator is configured to estimate the second reduction level by using the second echo or noise level, and the selector is configured to select and output one of the first output signal and the second output signal based on the echo cancellation level.

19. The communication apparatus of claim 15, further comprising:

an additional estimator configured to estimate an echo cancellation level of the first interference eliminator by using at least one of an internal condition of the first interference eliminator, the input signal and the intermediate signal, an echo or noise estimator configured to estimate a first echo or noise level included in the input signal and a second echo or noise level included in the intermediate signal, a gain generator configured to generate a first reduction gain by using the first echo or noise level, and to generate a second reduction gain by using the second echo or noise level, and a gain corrector configured to correct the first reduction gain based on the echo cancellation level so as to estimate the first reduction level, and to correct the second reduction gain based on the echo cancellation level so as to estimate the second reduction level, wherein the selector is configured to select and output one of the first output signal and the second output signal based on the echo cancellation level.

20. A communication apparatus configured to process an input signal including an echo component and a noise component, comprising:

a interference eliminator configured (i) to reduce the echo component included in the input signal so as to produce an intermediate signal, (ii) to estimate a first reduction level by estimating at least one of the echo component and the noise component included in the input signal, (iii) to estimate a second reduction level by estimating at least one of the echo component and the noise component included in the intermediate signal, (iv) to reduce the input signal according to the first reduction level, (v) to reduce the intermediate signal according to the second reduction level, and (vi) to select and output one of the input signal reduced according to the first reduction level and the intermediate signal reduced according to the second reduction level.

* * * * *